United States Patent
Bradley et al.

(10) Patent No.: US 7,466,883 B2
(45) Date of Patent: Dec. 16, 2008

(54) OPTICAL SWITCHES AND ROUTERS AND OPTICAL FILTERS

(75) Inventors: Kenneth Bradley, Hinsdale, IL (US); Ward Lopes, Chicago, IL (US)

(73) Assignee: Arryx, Inc., Chicago, IL (US)

(*) Notice: Subject to any disclaimer, the term of this patent is extended or adjusted under 35 U.S.C. 154(b) by 0 days.

(21) Appl. No.: 11/403,941

(22) Filed: Apr. 14, 2006

(65) Prior Publication Data

US 2006/0193557 A1    Aug. 31, 2006

Related U.S. Application Data

(62) Division of application No. 10/734,790, filed on Dec. 12, 2003, now abandoned.

(51) Int. Cl.
G02B 6/26 (2006.01)
G02B 6/32 (2006.01)

(52) U.S. Cl. .............. 385/30; 385/35; 385/31

(58) Field of Classification Search ............. 385/30, 385/31, 35
See application file for complete search history.

(56) References Cited

U.S. PATENT DOCUMENTS

| | | | |
|---|---|---|---|
| 4,720,160 A | | 1/1988 | Hicks, Jr. |
| 6,052,495 A | | 4/2000 | Little et al. |
| 6,101,300 A | * | 8/2000 | Fan et al. ............ 385/27 |
| 6,195,187 B1 | * | 2/2001 | Soref et al. ............ 398/9 |
| 2001/0004411 A1 | * | 6/2001 | Yariv ............ 385/28 |
| 2002/0037132 A1 | * | 3/2002 | Sercel et al. ............ 385/30 |
| 2002/0039470 A1 | * | 4/2002 | Braun et al. ............ 385/50 |
| 2003/0185490 A1 | * | 10/2003 | Lopes et al. ............ 385/16 |

FOREIGN PATENT DOCUMENTS

| | | |
|---|---|---|
| JP | 58-502112 | 12/1983 |
| JP | 05-323390 | 7/1993 |
| WO | WO 83/02168 | 6/1983 |
| WO | WO 83/02168 A | 6/1983 |
| WO | WO 99/39223 | 8/1999 |
| WO | WO 00/029886 | 5/2000 |
| WO | WO 00/29886 A | 5/2000 |
| WO | WO 01/040757 | 6/2001 |

OTHER PUBLICATIONS

Ming Cai et al., "Highly efficient optical power transfers to whispering-gallery modes by use of a symmetrical dual-coupling configuration," Optics Letters, Feb. 15, 2000.

* cited by examiner

Primary Examiner—K. Cyrus Kianni
(74) Attorney, Agent, or Firm—Jean C. Edwards, Esq; Akerman Senterfitt

(57) ABSTRACT

Our invention relates generally to an optical switch (31) and an optical router (10) to rapidly route signals from particular channels (22, 24) within an optical band by using optical switches (20) which utilize a controlled whispering gallery mode (WGM) resonance of dielectric microspheres (S1, S2, S3) to optically switch signals. Another invention relates to optical filters which use a WGM resonate structure (150) to isolate and switch specific optical signals between waveguides (F1, F2). In other inventions, the filter (100) is switched "on/off" by signal loss within a WGM resonate structure (150) which disrupts the WGM resonance; the filter (100) isolates and switches a specific wavelength signal from among a group of signals of different wavelengths; and is switched "off" by adjusting the index of refraction of the resonate structure to become substantially similar to the index of refraction of the surrounding medium.

15 Claims, 24 Drawing Sheets

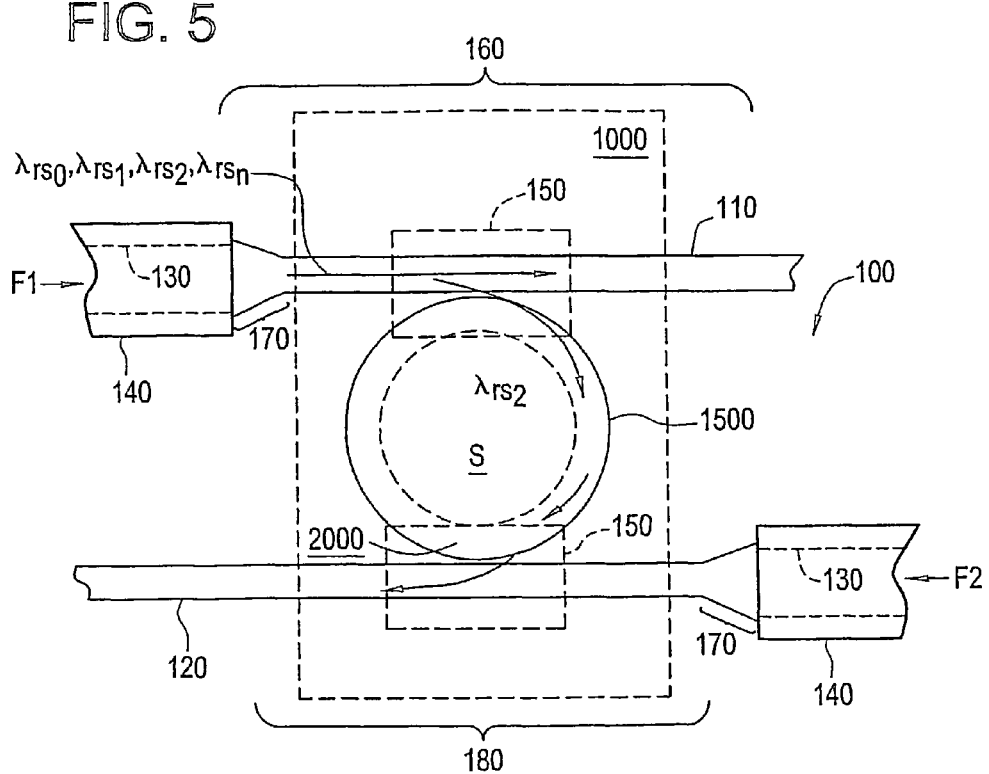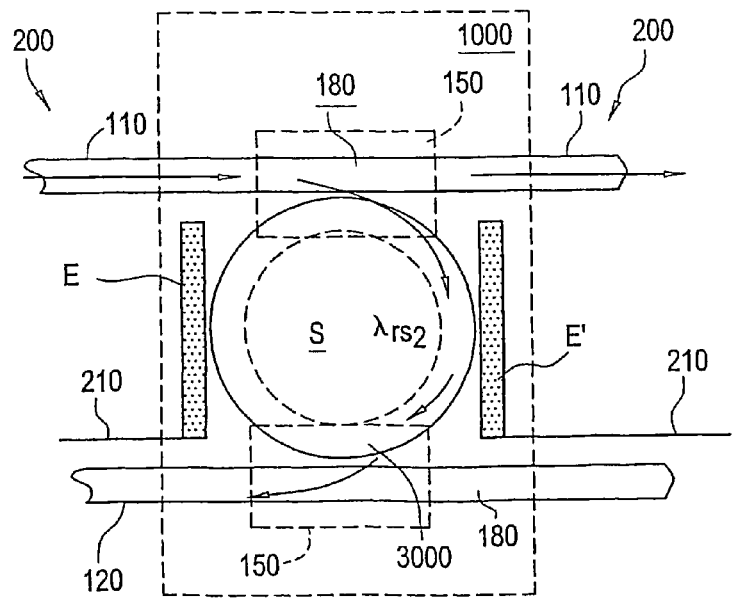

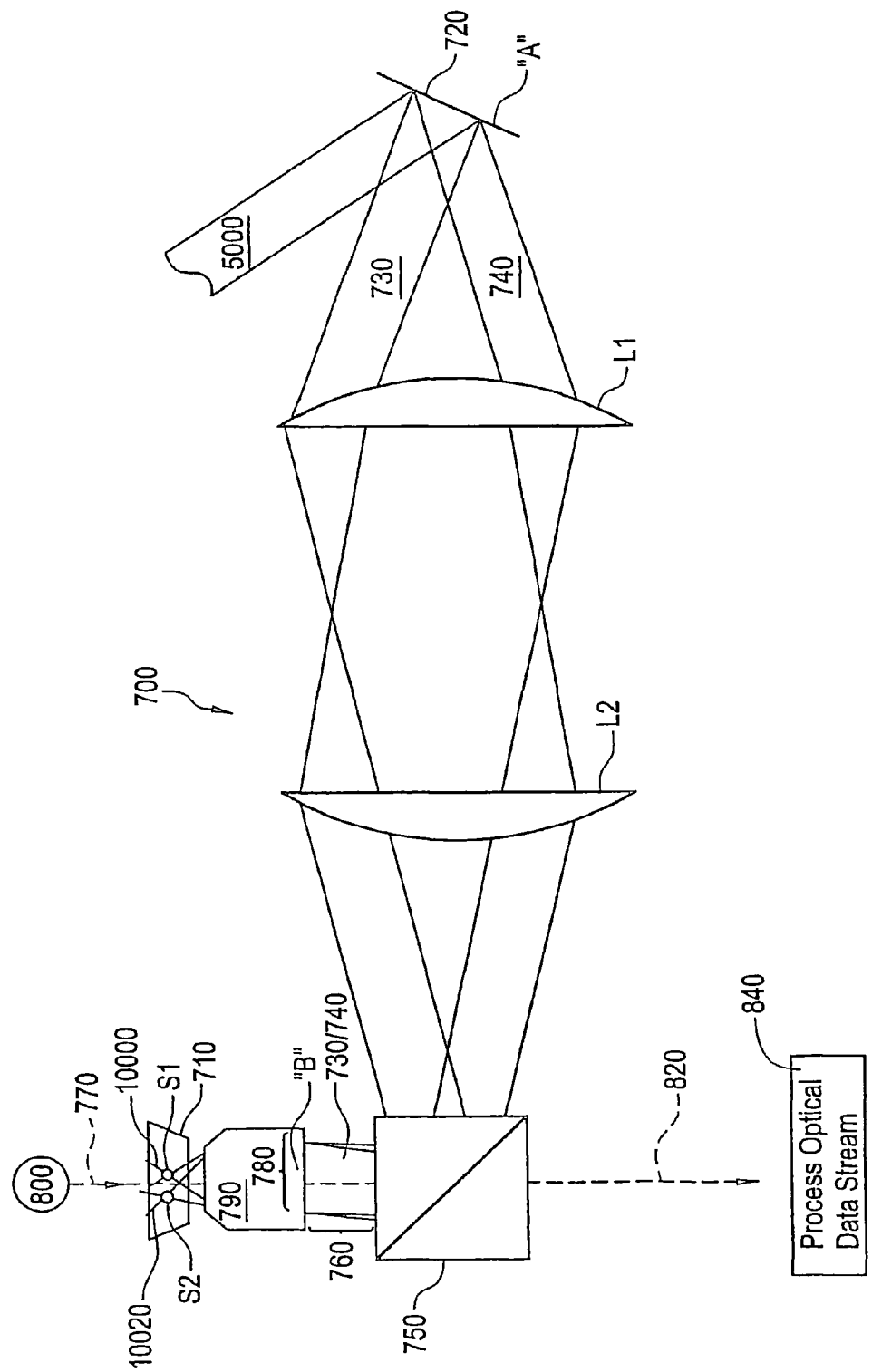

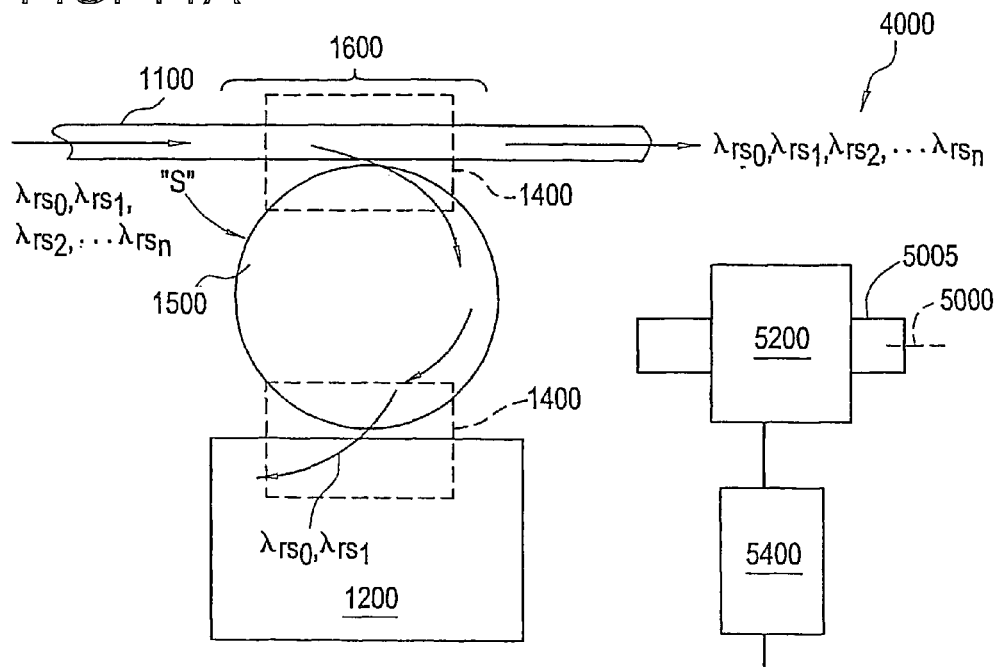
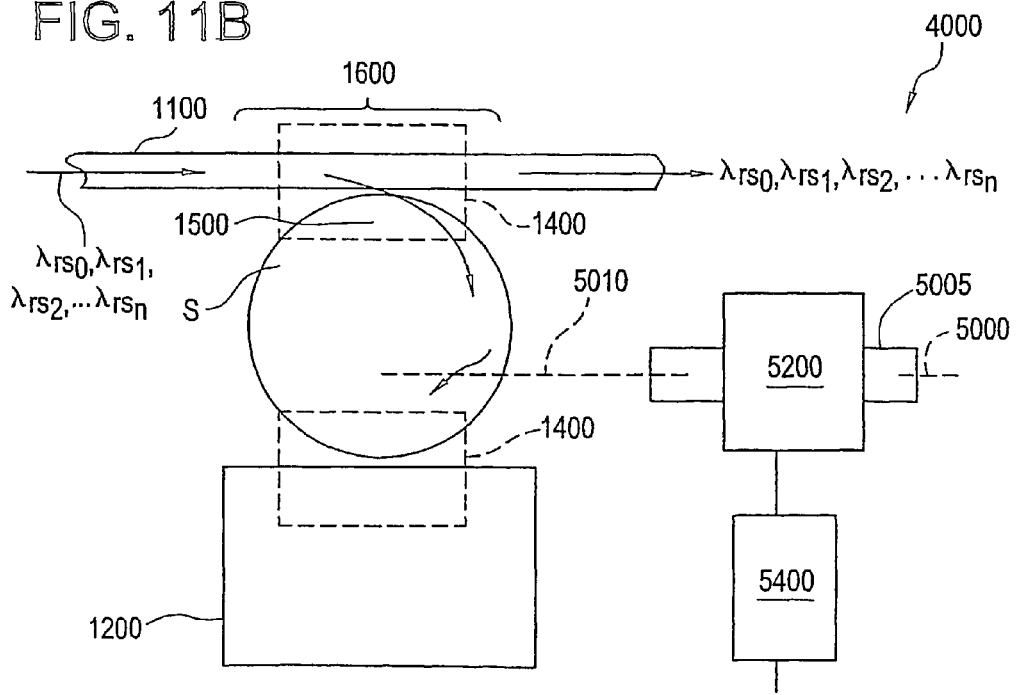

FIG. 26

| Dia. Microsphere (MS) 1 | Wavelength in C band MS will resonate in WGM for (microns) |
|---|---|
| 200 microns | |
| | 1.562981 |
| | 1.560394 |
| | 1.557815 |
| | 1.555244 |
| | 1.552682 |
| | 1.550128 |
| | 1.547583 |
| | 1.545046 |
| | 1.542517 |
| | 1.539996 |
| | 1.537484 |
| | 1.53498 |
| | 1.532484 |

| Dia. Microsphere (MS) 2 | Wavelength in C band MS will resonate in WGM for (microns) |
|---|---|
| 199.6721 microns | |
| | 1.563011 |
| | 1.560419 |
| | 1.557836 |
| | 1.555261 |
| | 1.552694 |
| | 1.550136 |
| | 1.547587 |
| | 1.545046 |
| | 1.542513 |
| | 1.539988 |
| | 1.537472 |
| | 1.534964 |
| | 1.532464 |

| Dia. Microsphere (MS) 3 | Wavelength in C band MS will resonate in WGM for (microns) |
|---|---|
| 20 microns | |
| | 1.545046 |

# OPTICAL SWITCHES AND ROUTERS AND OPTICAL FILTERS

CROSS-REFERENCE TO RELATED APPLICATIONS

The present application is a divisional application of U.S. patent application Ser. No. 10/734,790, filed Dec. 12, 2003 now abandoned, the contents of which are herein incorporated by reference.

This is a PCT Application which claims priority to U.S. application Ser. No. 09/886,698, filed Jun. 20, 2001, U.S. application Ser. No. 10/118,532, filed Apr. 8, 2002, U.S. application Ser. No. 10/118,531, filed Apr. 8, 2002, U.S. application Ser. No. 10/118,709, filed Apr. 8, 2002, and U.S. application Ser. No. 10/118,760, filed Apr. 8, 2002, the entire contents of which are herein incorporated by reference.

BACKGROUND OF THE INVENTION

Throughout this application various publications are noted. The disclosures of these publications in their entireties are hereby incorporated by reference in this application in order to more fully describe the state of the art to which this invention pertains.

1. Field of the Invention

The present application discloses one or more inventions. The inventions relate generally to optical switching, and in particular, one invention relates to methods, devices and systems to optically switch a specific channel of light between optical fibers. Other inventions generally relate to the "on/off" switching of optical filters, which are specific for a signal in one wavelength or in one channel within a band of signals or band of channels, respectively.

2. Description of the Related Art

Dielectric microspheres are known in the art. It has been shown that a microsphere of the appropriate proportions can form a wavelength specific connection from one optical fiber to another by virtue of the dielectric microsphere's resonance in a whispering gallery mode (WGM) for the specific wavelength, or for a group of specific wavelengths of light which are the resonate frequencies. The WGM may be used to switch light transmission from one optical fiber to another. Depending on the placement of the microsphere and nature of the optical fibers, fairly high coupling efficiency and light transfer may be achieved. This is disclosed in "Highly Efficient Optical Power Transfer to Whispering Gallery Modes by Use of a Symmetrical Dual Coupling Configuration", Ming, Cai and Kerry, Vahala, Opt. Lett 25, No. 4, 260 (2000).

Wavelength Division Multiplexing (WDM) is a technique which has been used to enhance the signal capacity of a single mode optical fiber by simultaneously transmitting multiple discreet wavelengths of light, referred to as "channels" in a single band. The wavelengths in each channel are separated by a pre-determined spacing, usually on the order of hundreds of GHZ. Dense Wavelength Division Multiplexing (DWDM) systems are characterized by closer spacing between the respective wavelengths comprising the channels thereby allowing for a greater number of channels within the same band in the same optical fiber as compared to WDM.

The speed of routing from one optical fiber to another is limited by the rate at which the optical switching occurs. In the past, switches which convert the optical data to electronic data have been a "bottleneck" in the system. Those acquainted with optical switching will recall that much interest has been shown in achieving the goal of a direct optical to optical switch which would eliminate the bottleneck caused by the optical to electronic conversions of the past. A variety of devices have been developed in pursuit of achieving this goal.

Common to many optical to optical switches and optical routers is an all or nothing functionality by which the entire signal, within a channel, is switched or not switched. While useful for small or local networks, especially those networks with easily controlled light sources (lasers), in larger or less controlled environments, an optical router must be able to accept signals from a variety of sources and seamlessly multiplex despite difference in the quality of the signals. Optical switches lacking the ability to monitor, equalize and/or groom the channels in nanoseconds or even picoseconds (which is "real time" for optical transmissions). This may yield turbidity within a band resulting in unbalanced light transmissions (signals) from channel to channel which in turn may cause noise, loss of part of a signal or channels to drop out.

Accordingly, applicants have identified a need for an optical switch and router that operate in "real time" (which is in the order of nanoseconds or picoseconds) for light transmission. Applicants have also identified a need for an optical router of "real time" optical switches which can monitor, groom, and/or balance a channel relative to the other channels in an optical band.

Further, with respect to the general field of dielectrics, it has been described by Grier & Dufresne in U.S. Pat. No. 6,055,106 that small dielectric particles may be contained in one or more optical traps. As stated above, optical trapping is known and can be used to contain and manipulate small particles in the submicron to hundreds of micron range.

Depending on the placement of a WGM microsphere, the nature of the optical fibers, and the diameter or taper of the optical fibers, high efficiency of light transfer may be achieved for the resonate frequencies. See, "Highly efficient optical power transfer to whispering-gallery modes by use of a symmetrical dual coupling configuration", Ming Cai and Kerry Vahala Opt. LETT 25, No. 4, 260 (2000); "Phase-matched excitation of whispering-gallery-mode resonances by a fiber taper", J. C. Knight, G. Cheung F. Jacques, and T. A. Berks, Opt. LETT 22, No. 15, 1129 (1997). Particular attention should be paid to FIG. 2, and "Time-domain observation of optical pulse propagation in whispering-gallery modes of glass spheres", R. W. Shaw, W. B. Whitten, M. D. Barnes, and J. M. Ramsey, Opt. LETT. 23, No. 16, 1301 (1998).

In determining Q for a silica microsphere, physical factors which reduce Q below the limit defined by material losses $Q^{-1}{}_{mat}$ are the losses attributable to $Q^{-1}{}_{cont}$, $Q^{-1}{}_{rad}$ and $Q^{-1}{}_{s.s}$. Wherein $Q^{-1}{}_{cont}$ are those losses due to surface contaminants, $Q^{-1}{}_{rad}$ are those losses attributable to the smallness of the diameter of the microsphere and $Q_{ss}$ represents losses due to scattering caused by surface imperfections. Measurements of losses indicate that if the diameter of a microsphere divided by the wavelength of light it was resonating for is $\geq 15$ then $Q^{-1}{}_{rad}$ is $>10^{11}$. Additionally, for microspheres larger than 100 microns in diameter $Q^{-1}{}_{s.s}$ is $<<1\times10^{-10}$. "Ultimate Q of optical microsphere resonators" M. L. Gorodetsky, A. A. Savchenkov, and V. S. Ilchenko Opt. LETT 21, No. 7, 453-455.

It has been described by Knight that a microsphere coupled to an optical fiber with a stripped off polymer coating (cladding) over a region of the optical fiber, which has been drawn out in a tapered waist region, can achieve high coupling efficiency in the waist region. Coupling is to the evanescent tail of a signal, extending out into the free space along the region of the optical fiber surrounding the taper. Knight reported a coupling efficiency of a microsphere resonator at a tapered waist region with measurements of Q as high as $5*10^7$.

One method to taper an optical fiber is to apply heat to an optical fiber and cladding above their respective melting temperatures so that it will stretch, and apply a stretching force. U.S. Pat. No. 5,729,643 issued to Hmelar.

With respect to WDM, as stated above, the wavelengths in each channel are separated by a pre-determined spacing usually in the order of hundreds of GHz and with transmission rates up to about 10 Gb/s. DWDM systems are characterized by closer spacing in the order of 50 to 12.5 GHz between the respective channels. The closer spacing allows for a greater number of channels within the same band in the same waveguide as compared to WDM, for example 320 DWDM channels at 10 Gb/s yields a 3200 Gb/s fiber capacity as compared to 80 channels at 10 Gb/s which yields an 800 Gb/s fiber capacity.

In addition to WDM and DWDM, optical networks may increase fiber capacity with time division multiplexing (TDM). TDM can achieve a 3200 Gb/s fiber capacity by combining less channels and faster transmission rates. For example, 80 channels at 40 Gb/s yields the 3200 Gb/s fiber capacity and maintains greater channel spacing by reducing the Bit periods. However, reduction of the Bit period from 10 Gb/s to 40 Gb/s reduces the window through which to measure waveform from 100 picoseconds to leave only a 25 picosecond window. *Photonics Spectra* September 2001, "*Faster vs. Denser: Networks Reach Another Crossroads*", by Daniel C. McCarthy. Therefore, in WDM, DWDM or TDM optical networks picoseconds switching is "optical real time".

Accordingly, there exists a need for an optical filter which has the ability to select and switch at least one specific wavelength light signal from among a group of wavelength light signals within an optical transmission band in "optical real time"; and which can filter out in "optical real time" specific wavelength light signals, from among all the different wavelength light signals which may be found within the channels of an optical transmission band.

SUMMARY OF THE INVENTION

This application discloses one or more inventions.

One invention provides novel and improved methods, systems and devices to rapidly (in the range of nanoseconds and event picoseconds) switch a signal between optical fibers by coupling a dielectric microsphere, via whispering gallery mode resonance (WGM) between optical fibers. A selected signal from a particular channel within an optical band can be selectively switched by controlling a plurality of the optical switches. All references made hereinafter to microsphere(s) shall refer to dielectric microsphere(s).

In all the embodiments of this invention which are shown, the optical router is formed of a series of the optical switches. Common to the optical switches is a microsphere in proximity to the unclad or thinly clad regions of a pair of optical fibers. To switch the signal of a particular channel (wavelength of light) between optical fibers, the evanescent waves emanating from the electromagnetic fields associated with the signal traveling in an optical band. A particular channel couples with, and resonates across, a wavelength specific microsphere via the WGM of the microsphere to switch the signal to another optical fiber.

In one embodiment of the optical router, each microsphere forming an optical switch has a steady state index of refraction "n" and will resonate in WGM for a specific wavelength of light (channel).

The switching is accomplished by controlling the steady state index of refraction "n" of the microsphere. A microsphere is positioned between optical fibers, with substantially similar indexes of refraction at a region of thinned or removed cladding, suitable optical fibers include those tapered optical fibers identified by Cai & Vahala. A pair of electrodes, placed on either side of each microsphere, can be used to apply a voltage across the microsphere. When an adequate voltage is applied across the electrode pair the steady state index of refraction "n" of the microsphere is altered by the polarizing effect of the voltage on the substrate of the microsphere. The polarization changes the dielectric constant of the substrate which in turn alters the steady state index of refraction "n" of the microsphere. In the case where the steady state index of refraction "n" of the microsphere is substantially similar to the index of refraction of the optical fibers the voltage will cause the steady state index of refraction "n" of the microsphere to become sufficiently dissimilar from the index of refraction of the optical fibers thereby tending to preclude WGM resonance.

To switch a particular optical switch within the optical router the voltage across a selected electrode pair need only be briefly interrupted (in the order of a few nanoseconds to a few picoseconds) to allow the signal to resonate across the microsphere and pass from one optical fiber to another. Accordingly, an optical router useful for WDM, DWDM and wavelength division de-multiplexing is achieved.

Conversely, by selecting a microsphere with a steady state index of refraction "n" dissimilar to the index of refraction of the optical fibers and applying sufficient voltage across the selected electrode pair to alter the steady state index of refraction "n" of the microsphere to be substantially similar to the index of refraction of the optical fibers WGM resonance of the microsphere is enabled via the application of the voltage.

Adjustment of the voltage may also provide for a controllable index of refraction of "n±x," for the microsphere, wherein as "x" approaches zero the efficiency of the transfer of signal approaches the microsphere's maximum coupling efficiency which may be useful for applications such as channel equalizing, grooming and power balancing.

In another embodiment of the optical router, a plurality of wavelength specific microspheres are provided, each with a light activated material, such as a dye, integrated within their substrate. To form the optical router, a series of optical switches, each one containing a known microsphere selected to resonate in WGM for a specific channel, are positioned in close proximity to an unclad or thinly clad region in each of two optical fibers.

Each optical switch operates by controlled irradiation of the microsphere with an appropriately intense beam of light. The irradiation activates the light activated material and depending on the selection of the light activated material and microsphere substrate, the irradiation will either change the dielectric constant of the light activated material and affect the average dielectric constant of the microsphere, or affect the dielectric constant of the light activated material and the substrate, thereby altering the dielectric constant of the microsphere. In either case, the change in the dielectric constant will alter the steady state index of refraction "n" of the microsphere.

If the steady state index of refraction "n" of the microsphere is substantially similar to the index of refraction of the optical fibers, the irradiation can be used to alter the steady state index of refraction "n" to become dissimilar to that of the optical fibers and disrupt the WGM resonance. A practical application of such a microsphere would be to maintain an appropriately intense beam of light directed at the microsphere until switching of the channel corresponding to that microsphere is required. A brief interruption in the intense beam of light will result in switching. On the other hand, if the steady state index of refraction "n" of the microsphere is dissimilar to the index of refraction of the optical fibers, a brief pulse of irradiation can be used to alter the index of refraction "n" of the microsphere to become substantially similar to the index of refraction of the optical fibers and thereby switch the channel by enabling the WGM resonance.

In either case, by pulsing the intense beam of light, "on" or "off" in the range of nanoseconds to picoseconds, switching can occur in nanoseconds or picoseconds. One pulse mechanism which operates in the nanosecond and picosecond range is passing the intense beam of light through a Mach-Zender interferometer.

Moreover, adjustment of the intensity of the intense beam of light, in either case, may also provide for a controllable index of refraction of "n±x," for the microsphere, wherein as "x" approaches zero, the efficiency of the transfer of signal approaches the microsphere's maximum obtainable coupling efficiency which may be useful for applications such as channel equalizing, grooming and power balancing.

In another embodiment of an optical router, each microsphere comprising a specific optical switch has a steady state index of refraction "n" which always corresponds to the index of refraction of the optical fibers. Optical switching occurs when the selected microsphere is physically contained within an optical trap and moved towards the unclad or thinly clad regions of two optical fibers. At some proximity from the optical fibers the evanescent wave associated with the signal of the selected channel will resonate across the surface of the selected microsphere and switch signal one optical fiber to another optical fiber. When the switching is completed, the optical trap is withdrawn and the microsphere ceases to couple to the fibers.

Adjustment of the proximity of the microsphere to the stripped or thinly clad region of the optical fibers may provide a controllable index of refraction of "n±x" for the microsphere, wherein as "x" approaches zero, the efficiency of the transfer of signal approaches the microsphere's maximum obtainable coupling efficiency which may be useful for applications such as channel equalizing, grooming and power balancing.

In each embodiment the switching and/or routing of the selected wavelength of light signal from one optical fiber to another is dependent on the propagation of an evanescent wave corresponding to a microsphere which acts in a WGM for the selected wavelength of signal. The switching "on" or "off" of the microsphere is either by physical movement or by altering the microsphere's steady state index of refraction "n".

Yet other inventions disclosed in this application relate to methods, apparatuses, and systems, to filter at least one specific wavelength light signal from among a group of light signals within the different channels of an optical transmission band in "optical real time".

In one of the inventions, the optical filter uses a WGM resonate structure to filter out a specific wavelength light signal or a group of specific wavelength light signals, and a WGM control, or signal loss central to switch "on/off" the optical filter. If a WGM control is used to switch the optical filter "on/off", it is performed by blending the WGM resonate structure into the medium surrounding it without optical/ electrical conversion. Further, a single small WGM resonate structure is used to resonate in WGM for which the only resonate signal "RS" is within the optical transmission band being filtered.

In another of the inventions, the optical filter is formed by placing a WGM resonate structure proximate to both an input waveguide from which it can receive input light signal transmissions and an output waveguide to receive the filtered light signal transmission. The optical filter is switched "on/off" by controlled signal absorbtion within a WGM resonate structure.

In yet another of the inventions, the optical filter is formed by connecting two or more subfilters, each containing a resonate structure. The optical filter is placed proximate to an input waveguide from which it can receive input light signal transmissions. The filter can provide an output consisting of a specific wavelength light signal transmission to an output waveguide. The optical filter of this invention may be always "on" or switched "on/off".

Specifically, the first subfilter structure is the "gate keeper" and the second is the "isolator". Both the isolator and the gate keeper contain resonate structures which can resonate in WGM for a specific group of wavelengths of light known as resonate signals "RS" (See the table shown in FIG. 27). The filter results from having but a single RS, within an optical transmission band, common to the gate keeper and the isolator.

All references made herein to resonant structures shall be understood to include those structures constructed of a dielectric material including all materials with a non-zero dielectric constant which are not conductors. Preferably the selected dielectric material is non-magnetic. In some instances, depending on the parameters of the system, one of the two or more resonate structures may be a resonate cavity. For simplicity, and not as a limitation, microspheres are described and shown as the resonate structure in the detailed descriptions. However, it should be understood that any suitable resonate structure is anticipated and combinations of different and varying structures constructed of any suitable material and in differing and varying numbers than those depicted are also anticipated.

All references made hereinafter to waveguides shall be understood to be any structure adapted for transmitting an optical signal in a longitudinal direction which provided for limited loss of the optical signal during transmission. Waveguides shall be understood to be any structure adapted for the propagation of light signals in a longitudinal direction. A waveguide, as used herein, is a structure which provides an evanescent wave, corresponding to the propagating light waves.

A specific size resonate structure will resonate in WGM for a specific group of RS which corresponds to its effective size "$d_e$". Effective size is a function of actual distance the light must travel to complete a round trip within the resonate structure, represented as "d", multiplied by the index of refraction of the resonate structure "$n_{rs}$". This relationship of d to $d_e$ is described in the first equation:

$$d_e = n_{rs} * d \qquad \text{Equation 1}$$

For a dielectric microsphere resonate structure, the wavelengths of each RS which a resonate structure (such as a gate keeper or isolator) constructed of a specific size dielectric microsphere will resonate for in WGM can be found by dividing the effective distance the light will travel in the microsphere by a non-zero integer "q" as shown in the second equation:

$$d_e/RS = q$$

and $d_e/q = RS$         Equation 2

Accordingly, the group of wavelengths of light ($\lambda_0, \lambda_1, \lambda_2, \ldots \lambda_n$) which are the RS can be calculated. Further, as the fixed diameter of a resonate structure is reduced the number of RS are reduced (see table in FIG. 27). The cost of this reduction in RS is to increase the signal losses due to $Q^{-1}$ rad. However, by surrounding the resonate structure with the appropriate medium signal losses due to $Q^{-1}$ rad may be reduced. The appropriate medium should be one which has an index of refraction "$n_{medium}$" which is adequately distinct from $n_{rs}$ to establish the condition of total internal reflection at the interface between the resonate structure and the medium.

Therefore, after identifying the signals within an optical telecommunications band (in an input waveguide) for which optical switching may be required (to an output waveguide), the appropriate WGM resonate structures to switch the identified signals can be selected to construct an optical filter. A group of "n" such optical filters may be combined to multiplex (MUX) or demultiplex (DE different wavelength optical signals, within different channels of an optical transmission band from a single waveguide to one or more other waveguides or vice versa, thereby optically cross connecting waveguides. Further, a group of "n" such optical filters may be combined to demultiplex a group of "n" signals from an input waveguide to one or more of "m" output waveguides. Additionally, a group of "n" filters can be used to multiplex the signals within "m" input waveguides into a single output waveguide.

In one of the inventions the optical filter may be always "on", or switched "on/off". "On/off" switching may be through one of two WGM controls or through a controlled signal loss. The controlled signal loss may be achieved by altering the imaginary portion "$i\epsilon_2$" of the dielectric constant of the resonate structure $\epsilon_{rs}$ (see below).

In one of the inventions, the optical filter is switched "on/off" through a WGM control. The WGM control as illustrated is applied to several configurations in the detailed description of the preferred embodiments. The methodology of the WGM control is applicable to dielectric resonate structures in general. Accordingly, application of the WGM controls to other dielectric resonate structures, which support WGM resonance for signals within an optical transmission or optical telecommunication band, is within the intended scope of the inventions.

In either the always "on" or the switched "on/off" case the selected resonate structure should have a minimum "Q" (quality factor) adequate to discern the separate channels as spaced in the optical transmission or telecommunication band supplying the signals to be filtered.

Examples of commonly referenced channel spacing structures found in a TDM, WDM and DWDM are as great as several hundred GHz or as narrow as 12.5 GHz. For 100 GHz spacing the minimum Q needed to maintain channel separation is about 2000. For 50 GHz spacing the minimum Q is about 4000 and for 12.5 GHz channel spacing the minimum Q is about 16,000.

"On/Off" Switching Control Through the WGM Control Cases

The first WGM control is used to switch "on/off" the filter through an adjustment of $n_{rs}$ to establish conditions which either support or do not support WGM resonance for the desired RS.

Mechanisms for adjusting $n_{rs}$ include polarization of the resonant structure by an applied voltage or current causing a linear electro-optic effect or by an applied beam of light causing an optical effect. Those skilled in the art will recall that a dielectric structure has a dielectric constant "$\epsilon$". The dielectric constant of a resonate structure "$\epsilon_{rs}$" can be described as the sum of a "real" portion "$\epsilon_1$" and an imaginary portion "$i\epsilon_2$" as described in the third equation.

$$\epsilon_{rs} = (\epsilon_1 + i\epsilon_2)$$         Equation 3

For those instances wherein $i\epsilon_2$ is small and remains unchanged, the index of refraction of the resonate structure $n_{rs}$ is known to be proportional to the square root of the "real" portion of the resonate structure dielectric constant $\sqrt{\epsilon_1}$. Accordingly, $n_{rs}$ can be altered through a controlled change of $\epsilon_1$ achieved by polarization. Further, from the first equation it is known that when "d" remains fixed and $n_{rs}$ changes, $d_e$ will change. Further, from the second equation it is known that the RS are a function of $d_e/q$ and if $d_e$ changes, a corresponding change in RS the resonate structure will resonate in WGM.

$\epsilon_1$ can also be controlled by coating to the resonate structure with an optically active material such as molecules of liquid crystal, organic photorefractive polymers, GaAs, Nitrabenzene and $LiNbO_3$ which, upon application of a predetermined linear electro optic effect or optical effect, will alter the index of refraction of the coating material which, for purposes of effecting WGM resonance in a resonate structure, is the index of refraction of that portion of the resonate structure which is involved in the WGM resonance. A group of filters can be combined to multiplex or demultiplex a band of optical signals via optical cross sections.

The second WGM control is used to switch "on/off" the optical filter based on an adjustment of $n_{rs}$ of the resonate structure relative to the index of refraction of a medium "$n_{medium}$" surrounding at least one resonate structure waveguide interface, or at least that portion of the resonate structure at a region where coupling occurs, to establish conditions which either interrupt or encourage signal coupling or the coupling of light transmissions between the resonate structure or subfilters and the input and/or the output waveguide(s).

The mechanisms for adjusting the $n_{rs}$ is the same type of linear electro optic effects and/or optical effects used in the first WGM control. However, the adjustment in the $n_{rs}$ is to effectively blend the resonate structure into the medium.

The third WGM control is used to switch "on/off" the filter through an adjustment of the index of refraction of at least one of the resonate structures. The index of refraction of the resonate structure within the gate keeper subfiter, denoted "$n_{rs}^{(gate\ keeper)}$" and the index of refraction of the resonate structure within the isolator subfilter denoted "$n_{rs}^{(isolator)}$" establishes conditions which either support or do not support WGM resonance for at least the desired RS.

If, for example, the adjusted $n_{rs}$ corresponds to an $n_{rs}$ which supports WGM resonance for RS which are outside the telecommunications band or for a group of RS with no common signal between the gate keeper and isolator, the signal will not switch through the optical filter. However, if the adjusted $n_{rs}$ supports WGM resonance for RS within the telecommunications band, one of which is also a RS of the gate keeper and isolator, the common RS will switch through the filter.

Mechanisms for adjusting $n_{rs}^{(gate\ keeper)}$ or $n_{rs}^{(isolator)}$ include polarization of the resonant structure by an applied voltage or current causing a linear electro-optic effect or by an applied beam of light causing an optical effect.

The fourth WGM control is used to switch "on/off" the optical filter based on an adjustment of $n_{rs}^{(gate\ keeper)}$ or $n_{rs}^{(isolator)}$ relative to the index of refraction of a medium "$n_{medium}$" surrounding at least one resonate structure waveguide interface, to establish conditions which either interrupt or encourage signal coupling between the subfilters and the input and/or the output waveguide(s). The mechanisms for adjusting the $n_{rs}$ is the same type of linear electro optic effects and/or optical effects used in the first WGM control. However, the adjustment in the $n_{rs}$ is to effectively blend the resonate structure into the medium.

"On/Off" Switching Control Through Signal Loss

When a light signal is within a WGM resonate structure controlled signal loss may be achieved, as noted in Equation 3, by altering the imaginary portion "$i\epsilon_2$" of the dielectric constant of the resonate structure.

The mechanism of signal loss is to alter $i\epsilon_2$, through the absorption of signal (light) by triggering the action of light absorbing material within the substrate of resonate structure. The attenuation mechanism may take place in concert with optical switching, or separate therefrom. By controlling only the imaginary portion "$i\epsilon_2$" of "$\epsilon_{rs}$", and because the geometrical configuration of the resonant structure is unchanged, the resonant structure will continue to support the same RS. However, internal to the resonant structure, an absorption mechanism converts the RS mode light to other forms of energy besides the specific mode of the RS which it previously supported.

"On/off" switching of the filter through signal loss via the control of $i\epsilon_2$ does not require a change in signal coupling the RS. Therefore, the dynamics of the coupling of the resonate structure to the light transmissions (signals) at the resonate structure-waveguide interface need not be altered.

The light absorbing material may be dihydroindolizines, diarylimylenes, ScGe, bis-Mienylperfluorocyclopentenes, spiropyrens, fulgides, quantum dots, doped semi-conductor nanoclusters, PDLC, dyes, semi conductor nanoclusters, electrochromic nanocrystals, semi conductors, (nanocrystals have been shown to exhibit controlled IR light/signal absorption in response to an applied potential) "*Electrochromic Nanocrystal Quantum Dots*", Congjun Wang, Moonsub Shim, Philippe Guyot-Sionnest, *SCIENCE* Vol. 291 page 2390 Mar. 23, 2001) or photochromic compounds such as photochromic bisthienylethene which can be incorporated into the substrate of the resonate structure and selectively activated by applying the appropriate quantity and/or quality of a trigger light or energy to cause absorption of signal. "*Optical properties and dynamics of a photochromic bisthienylethene in solution and in a polymer film*", J. C. Owrutsky, H. H. Nelson, A. P. Baronavski, O-K. Kim, G. M. Tsivgoulis, S. L. Gilat and J.-M. Lehn *Chemical Physical Letters* 293 555-563. (1998).

The resonate structures described herein may be as small as a few microns. One method for positioning these small resonate structures is through the generation and control of movable of optical traps (as described by Grier et al in U.S. Pat. No. 6,055,106) which can trap, contain, position and hold small dielectric particles.

The above inventions may be employed in any application where the signal transmitted by the resonant structure is to be controlled thereby. For example, in an assay format, the resonant structure may be manufactured or modified post-manufacture by coating with a binding agent which binds to an analyte to be detected in a sample. In this invention, the presence of the analyte is detected by a change in frequency, attenuation or destruction of the resulting signal which comes about because of the binding of the analyte to the binding agent on the resonant structure upon exposure to the sample. Such a change in frequency, attenuation or destruction of the resulting signal may also be accomplished in a biological assay by competing away an analyte bound to a binding agent on the resonant structure prior to exposure to the sample. Examples of binding agent/analyte pairs include antigen/antibody, antibody/antigen, ligand/receptor, receptor/ligand, and nucleic acid/nucleic acid. Complexing agents, chelating agents and chemical bonding agents may also be employed.

Other features and advantages of the present invention will be set forth, in part, in the descriptions which follow and the accompanying drawings, wherein the preferred embodiments of the present invention are described and shown, and, in part, will become apparent to those skilled in the art upon examination of the following detailed description taken in conjunction with the accompanying drawings, or may be learned by practice of the present invention. The advantages of the present invention may be realized and attained by means of the instrumentalities and combinations particularly pointed out in the appendant claims.

BRIEF DESCRIPTION OF THE DRAWINGS

FIG. 5 illustrates a component view of an optical switch and filter according to another invention.

FIG. 6 illustrates a component view of an electronically gated optical switch and filter.

FIG. 10 illustrates an optical trapping system to manipulate optical switch components.

FIG. 11A illustrates a component view of an optical filter according to another invention.

FIG. 11B illustrates a component view of an optical filter according to another invention.

FIG. 26 is a table showing a relationship between microsphere diameter and WGM resonate signals.

DETAILED DESCRIPTION OF THE PREFERRED EMBODIMENTS

Figure 1:
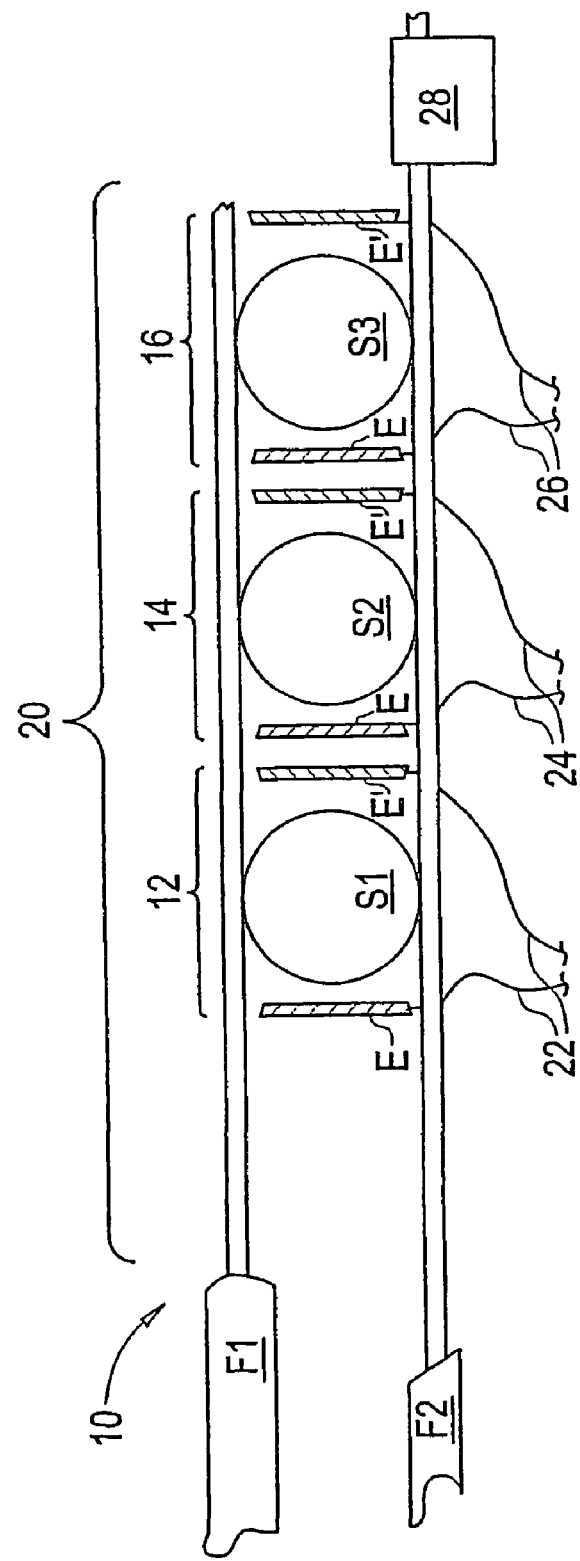
FIG. 1 illustrates a component view of an optical router according to one invention.

Certain terminology will be used in the following specification for convenience and reference, and not as a limitation. Brief definitions are provided below:

A. An "evanescent wave" refers to a wave that occurs when a wave enters a region in which it cannot propagate. Typically such waves are characterized by an amplitude which decreases exponentially with distance into the region in which the wave cannot propagate.

B. "WGM" refers to the whispering gallery mode, which is a property of resonate structures that can be used to form a wavelength specific optical conduit between one or more optical fibers and the resonate structure via evanescent waves.

C. "Beamlet" refers to a sub-beam of light or other source of energy that is generated by directing a light or other source of energy, such as that produced by a laser or collimated output from a light emitting diode, through a medium which diffracts it into two or more sub-beams. An example of a beamlet would be a higher order laser beam diffracted off of a grating.

D. "Phase profile" refers to the phase of light or other source of energy in a cross-section of a beam or a beamlet.

E. "Phase patterning" refers to a patterned phase shift imparted to a beam of light, or a beamlet which alters its phase profile, including, but not limited to, phase modulation, mode forming, splitting, diffracting, converging, diverging, shaping and otherwise steering a beam or a beamlet.

F. An "optical fiber" refers generally to an elongated structure of nominally circular cross section comprised of a "core" of relatively high refractive index material surrounded by a "cladding" of lower refractive index material, adapted for transmitting an optical mode in the longitudinal direction.

G. "WDM" refers generally to wavelength division multiplexing: a system capable of simultaneously transmitting data on several wavelength channels.

H. "DWDM" refers generally to dense wavelength division multiplexing: a system capable of simultaneously transmitting data on several wavelength channels with less spacing between the channels than in a WDM system.

Although dielectric microspheres, which resonate in WGM for a group of resonate signals "RS", are described herein and shown in the figures, the illustrations should not be considered a limitation. Those skilled in the art will recognize that any resonant structure which supports a Q above the minimum Q required to maintain separation of the channels in the optical transmission band (the range of wavelengths in the "C" band are from about 1530 to 1565 nms, and in the "L" band are from about 1570 to 1620 nms) being filtered and/or switched, which may include structures such as stadiums, rings, hoops, oblate and prolate spheroids, or discs could be used in place of, or in conjunction with, dielectric microspheres.

In one invention regarding an optical router, in the preferred embodiments, an optical router is formed of a series of optical switches. Common to the optical switches is the placement of a microsphere in proximity to the unclad or thinly clad regions of a pair of optical fibers to achieve coupling of the microsphere to the optical fibers. To switch the signal from a particular channel (specific wavelength of light), between optical fibers, the WGM resonance of the microsphere for evanescent waves emanating from the electromagnetic fields associated with the signal in the particular channel is controlled either by altering the placement of the microsphere or by altering the steady state index of refraction "n" of the microsphere.

To form the optical router 10 illustrated in FIG. 1, a series of optical switches 14, 16 and 18 are connected across a first and a second optical fiber F1 and F2. The optical router 10, by virtue of the optical switches, is capable of optically routing a number of different channels within an optical band. Each channel contains a signal comprised of a distinct wavelength of light. Hence, the quantity of optical switches within the router 10 will define the number of different channels that router 10 can switch.

Each optical switch 12, 14 and 16 consists of a microsphere S1, S2 or S3 positioned between an electrode pair E & E' and placed in close proximity to a region of thinned or stripped cladding 20 on each optical fiber F1 & F2. Voltage is supplied to each electrode pair E & E' via corresponding pairs of conductive leads 22, 24 and 26 which are attached to a power supply (not shown).

The channel specific functionality of each optical switch derives from the selection of appropriately sized microspheres. Appropriate size refers to the radius of the microsphere wherein π times the radius of the microsphere is approximately an integral ½ wavelength of the wavelength of light the microsphere, with its steady state index of refraction "n" resonates for in WGM. Therefore, each microsphere by virtue of its size can be selected to correspond to a single channel carried within the optical band.

In the embodiment shown in FIG. 1, the microspheres are selected with a steady state index of refraction "n" substantially similar to the index of refraction of the optical fibers F1 & F2. Or, stated in terms of optical switches, each microsphere is switched "on" and will operate in a WGM for an evanescent wave, emanating from an optical fiber, of a channel with a signal corresponding to the wavelength of light the given microsphere resonates for. Therefore, absent an adequate voltage across the electrodes pairs E & E', switching of the signals from three channels, corresponding to the wavelengths of light each microsphere S1, S2 and S3 resonates for, will occur via the WGM resonance of each of the three microspheres S1, S2 and S3.

To achieve selected routing of signals within a channel adequate voltage across each electrode pair E & E' should be maintained until the switching of a specific channel is desired. The effect of applying adequate voltage across the electrode pairs E & E' is to alter the steady state index of refraction "n" of each microsphere S1-S3 by polarizing the substrate forming the microspheres. The polarization will change the dielectric constant of the substrate which in turn alters the steady state index of refraction "n" making it sufficiently dissimilar from the index of refraction of the optical fibers to preclude WGM resonance and switching will not occur.

When switching of a channel is desired, the voltage across a particular electrode pair E & E' surrounding the selected microsphere S1, S2 or S3 is briefly terminated. During that brief termination the index of refraction "n" the microsphere return to its steady state, which is substantially similar to the index of refraction of the optical fibers F1 & F2, thereby switching and routing the appropriate channel.

Conversely, one may select microspheres which have a steady state index of refraction "n" substantially dissimilar to the index of refraction of the optical fibers F1 & F2, whereby the presence of adequate voltage across an electrode pair E & E' alters the index of refraction "n" of the select microsphere to become substantially similar to the index of refraction of the optical fibers F1 & F2, thereby switching and routing the appropriate channel. In either case the switching "on" or "off" of the voltage across the electrodes E & E' can be accomplished in the range of nanoseconds or even picoseconds, providing a system which can route a channel in real time. Any residual light transmission in a switched optical fiber may, as is commonly the case, be removed with an attenuator 28.

For a given channel, adjustment of the voltage may also provide for a controllable index of refraction of "n+x," for the microsphere, wherein as "x" approaches zero, the efficiency of the transfer of signal approaches the microsphere's maximum obtainable coupling efficiency which may be useful for applications such as channel equalizing, grooming and power balancing.

In FIG. 1, for clarity, only three microspheres S1, S2 & S3 are shown and three electrode pairs 22, 24 & 26. However, it should be understood that a plurality of such microspheres and electrodes corresponding to the number of channels the router 10 switches can be provided. It should also be understood, that one skilled in the art may combine both the microspheres which have a steady state index of refraction "n" substantially similar to the optical fibers and those microspheres that have a steady state index of refraction "n" which is dissimilar to the optical fibers into one router without departing from the intended scope of this invention.

Figure 2B:
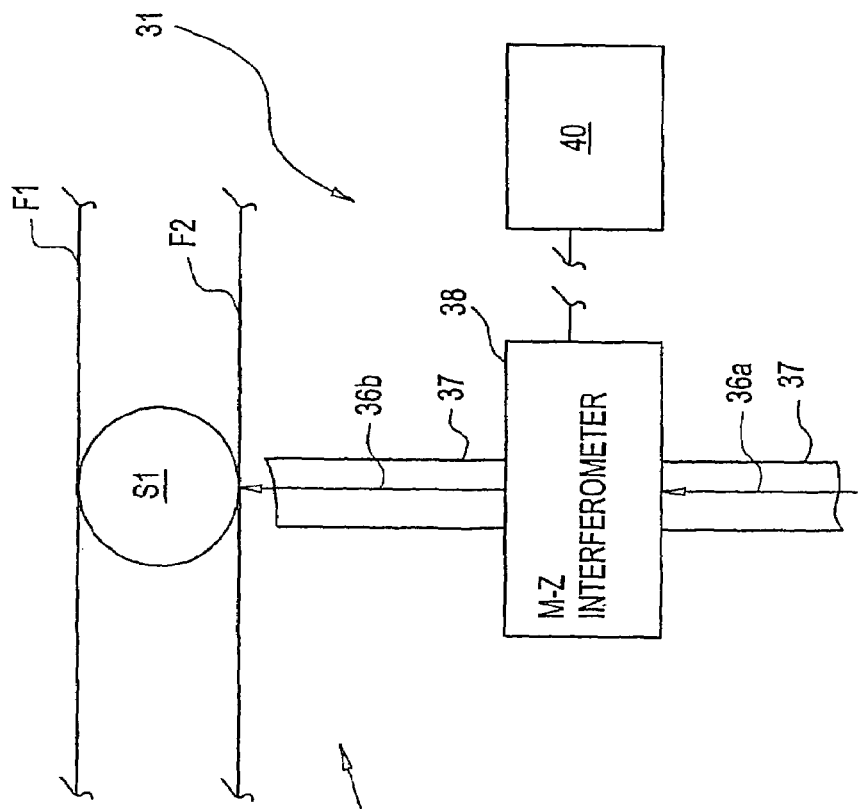
FIG. 2B illustrates a diagram of a component optical switch of the embodiment of FIG. 2A.
Figure 2A:
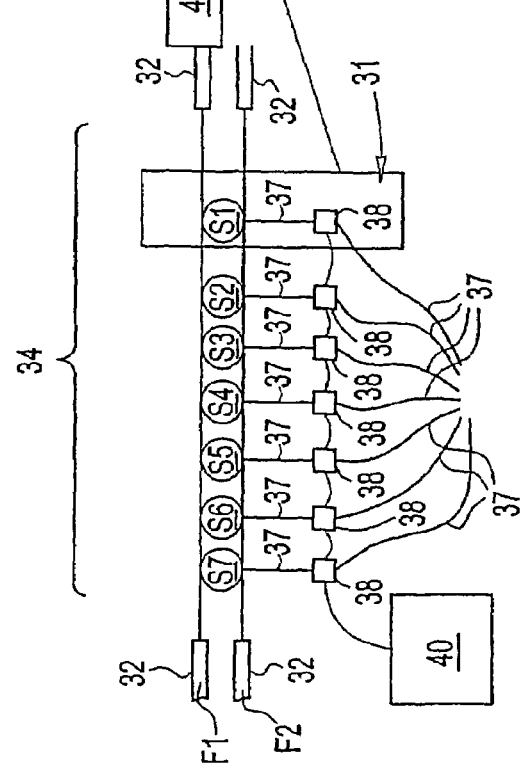
FIG. 2A illustrates an alternate embodiment of an optical router.

Illustrated in FIGS. 2A and 2B is another embodiment of the optical router 30 and optical switches 31. In this embodiment a plurality of microspheres S1-S7 are placed in close proximity to a first optical fiber F1 and a second optical fiber F2. The cladding 32 of the optical fibers F1 & F2 is thinned or removed at the region of close proximity 34. Within the substrate of each microsphere is a light activated material, such as a dye, which can alter the steady state index of refraction "n" of the microspheres when adequately irradiated by an intense beam of light.

Each optical switch operates by the WGM resonance of a microsphere, which may be controlled by altering the index of refraction "n" of the microsphere, such that the evanescent waves emanating from the electromagnetic fields associated with a signal in a particular channel within one optical fiber resonates in WGM across the surface of the selected microsphere to a channel in another the optical fiber.

Depending on the selection of the light activated material and the material comprising the substrate of the microsphere, the irradiation will either change the dielectric constant of the light activated material and thereby effect the average dielectric constant of the microsphere, or the irradiation will effect the dielectric constant of the light activated material and the substrate thereby altering the dielectric constant of the microsphere. In both cases the change in the dielectric constant will alter the steady state index of refraction "n" of the microsphere.

Generally, the size of each microsphere S1-S7 corresponds to the wavelength of light (channel) the microsphere can effectively resonate for in WGM. Therefore, an optical router 30 with seven distinctly sized microspheres forming seven optical switches 31 can route up to seven channels. The exemplary number of microspheres should not be viewed as a limitation on the number of microspheres which may be placed within a router of the invention. Control of the optical routing is accomplished by controlling the optical switches 31, which in turn is accomplished by altering the steady state index of refraction "n" of a selected microsphere within a selected optical switch 31, by either irradiation of the microsphere with an intense beam of light or by briefly terminating such irradiation.

In a "dissimilar" configuration the steady state index of refraction "n" of the microspheres S1-S7 is substantially dissimilar to the index of refraction of optical fibers F1 & F2. To optically couple the given microsphere and thereby switch signal between optical fibers F1 & F2, an adequately intense beam of light directed at the appropriate microsphere in the optical router 30 will alter the steady state index of refraction "n" of the microsphere to become substantially similar to the index of refraction of the optical fibers F1 & F2 thereby switching signal between optical fibers via WGM resonance.

In a "similar" configuration the steady state index of refraction "n" of the microsphere is substantially similar to the index of refraction of optical fibers F1 & F2. To optically couple a given microsphere and thereby switch signal between optical fibers F1 & F2 the adequately intense beam of light directed at the selected microspheres within the router 30 is terminated, thereby allowing the index of refraction "n" of the microsphere to return to its steady state which is substantially similar to the index of refraction of the optical fibers F1 & F2, and switching signal between optical fibers via WGM resonance will occur.

The irradiation of the microspheres S1-S7 within the optical switches 31 of the optical router 30 may be accomplished with a laser beam 36a & 36b passing through an illuminating fiber 37. For each optical switch 31 (FIG. 2B) the laser beam 36a passes through a Mach-Zender interferometer 38 whereby the laser beam 36a is either intensified through constructive interference or weakened through destructive interference. Because the Mach-Zender interferometer 38 operates in a matter of a few nanoseconds or even picoseconds the adequately intense beam of light directed at a selected microsphere can occur or be terminated for a brief period of time, thereby allowing for rapid optical switching and routing. A computer 40 is used to control the Mach-Zender interferometer 38 and to select which microsphere to enable WGM resonance in. Any residual light transmission in a switched optical fiber may, as is commonly the case, be removed with an attenuator 42.

Figure 3B:
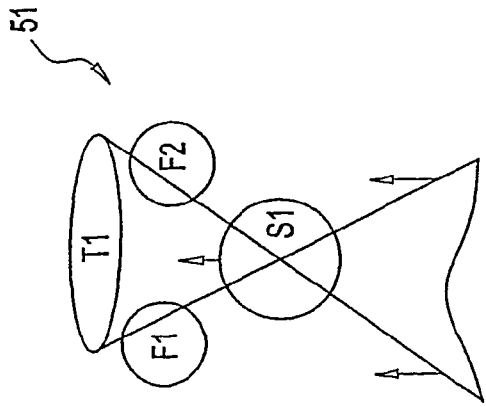
FIG. 3B illustrates a cut away view along the line A-A of the embodiment of FIG. 3A showing an optical switch of the router in the "off" position.
Figure 3C:
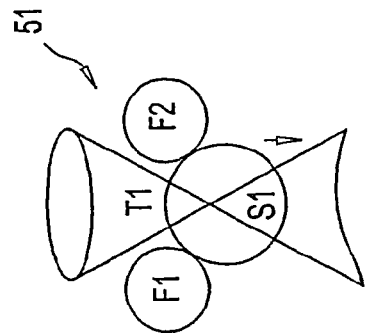
FIG. 3C illustrates a cut away view along the line A-A of the embodiment of FIG. 3A showing an optical switch of the router in the "on" position.
Figure 3A:
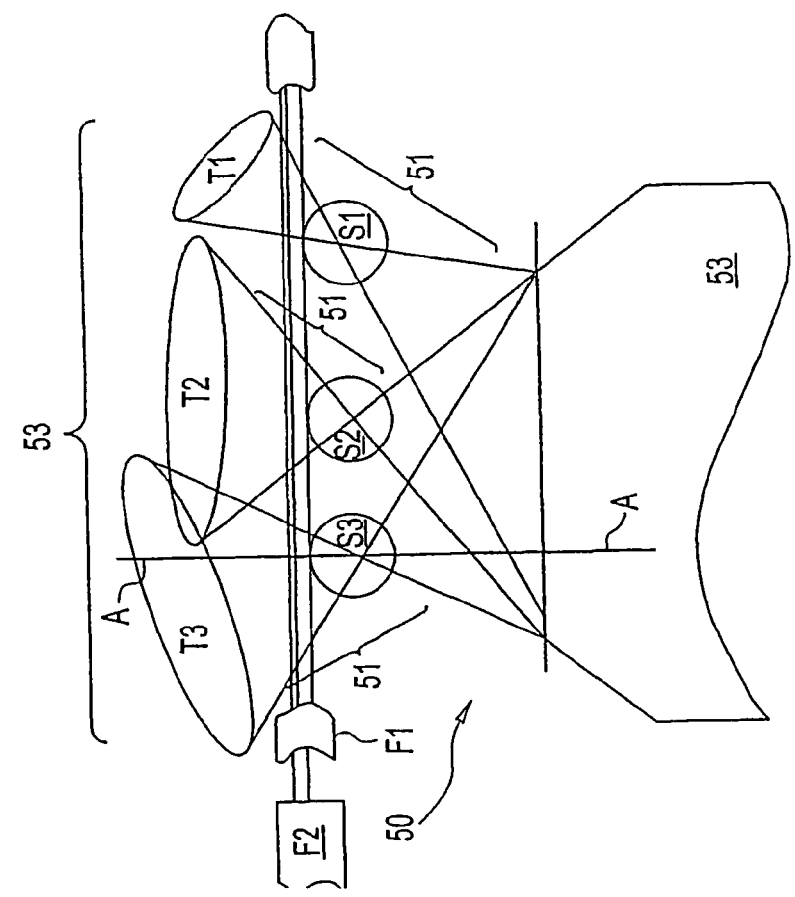
FIG. 3A illustrates a partial perspective view of an alternate embodiment for an optical router.

Monitoring, equalizing, grooming and channel balancing within a given channel may be accomplished by adjusting the intensity of the laser beams 36a or 36b irradiating the microspheres to control the index of refraction of "n±x," for the microsphere, wherein as "x" approaches zero, the efficiency of the transfer of the light within the channel approaches the microsphere's maximum obtainable coupling efficiency Illustrated in FIG. 3A is an optical router, generally designated 50, which contains a series of optical switches 51 each operating by the movement of microspheres S1, S2 or S3 in and out of close proximity with an unclad or thinly clad region 52 of a first and second optical fiber F1 & F2 (FIGS. 3B and 3C). Each microsphere has a steady state index of refraction "n" substantially similar to the index of refraction of the unclad or thinly clad region of the optical fibers F1 & F2 that the optical router 50 switches optical signals between.

Generally, the size of each microsphere S1-S3 corresponds to the wavelength of light (channel) the microsphere can effectively resonate for in WGM. An optical router 50 with three optical switches 51, each with a microsphere of a different size, can route up to three channels. Only three microspheres are shown for clarity, however, it should be understood by those skilled in the art that a greater or lesser number of microspheres of preselected sizes can be selected to form the router without departing from the scope of the invention. The movement of the microspheres S1, S2 or S3 is controlled by containing each microsphere S1, S2 or S3 within an array of independently movable optical traps T1, T2 and T3.

Optical traps are produced by the gradient forces arising form passing beamlets of light through a high numerical aperture focusing lens 52 and converging each beamlet of light. The formation of an array of independently movable optical traps capable of manipulating small particles, such as microspheres is known in the art and therefore only an overview description of such formation is provided.

To route a signal from a channel in the first optical fiber F1 to a channel in the second optical fiber F2 the selected optical switch 51 is activated. To activate an optical switch 51 the selected microsphere S1 initially held remote from the unclad or thinly clad regions 53 of the first and second optical fibers F1 & F2 (FIG. 3B) is moved, with an optical trap, into close proximity (FIG. 3C) to the unclad or thinly clad regions S2 of the first optical fiber and second optical fiber F1 & F2.

Figure 4:
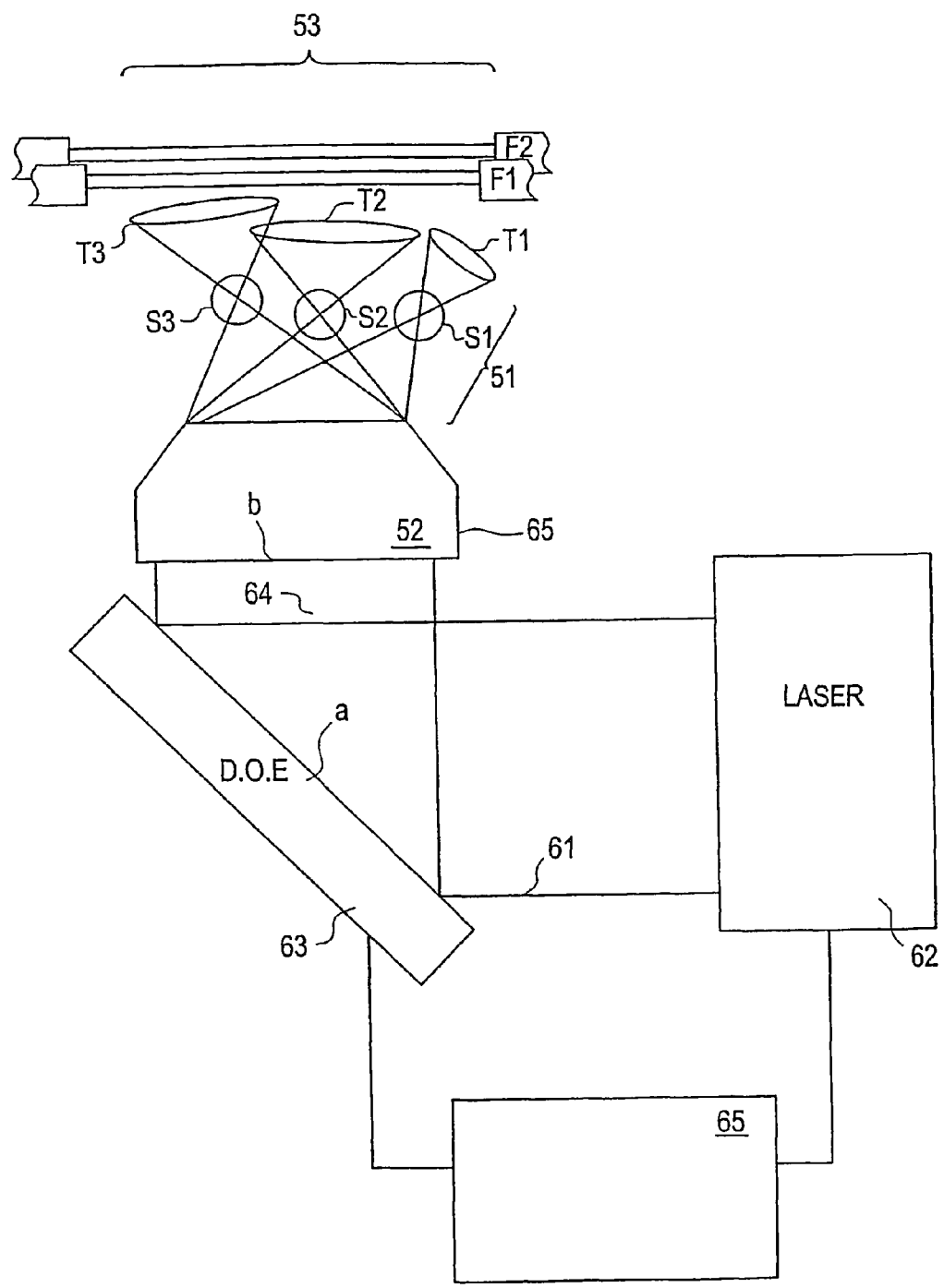
FIG. 4 is a diagram of the optical router and components to generate optical traps of FIG. 3A.

Shown in FIG. 4 is an overview of a system to generate and control the optical traps used to contain the dielectric microspheres S1-S3. The optical traps T1-T3 (FIG. 3A) are formed by passing a collimated light, preferably a laser beam 61, produced by a laser 62 at area 'a' of a beam altering optical element 63. The beam altering optical element diffracts the laser beam 61 into a plurality of beamlets 64 each beamlet passing through area "b" at the back aperture 65 of the focusing lens 52 and containing a microsphere S1-S3.

Any suitable laser can be used as the source of the laser beam 62. Useful lasers include solid state lasers, diode pumped laser, gas lasers, dye lasers, alexanderite lasers, free electron lasers, VCSEL lasers, diode lasers, Ti-Sapphire lasers, doped YAG lasers, doped YLF lasers, diode pumped YAG lasers and, flash lamp-pumped YAG lasers. Diode-pumped Nd:YAG lasers operating between 10 mW and 5 W are preferred.

When the laser beam 61 is directed at the beam altering optical element 63, the beam altering optical element produces the plurality of beamlets 64 by altering phase profile of the laser beam 61. Depending on the number and type of optical traps desired, the alteration may include diffraction, wavefront shaping, phase shifting, steering, diverging and converging.

Suitable beam altering optical elements are characterized as transmissive or reflective depending on how they direct the focused beam of light or energy. Transmissive diffractive optical elements affect the beam of light or energy as it passes therethrough, while reflective diffractive optical elements affect the beam of light or energy as it is reflected.

A beam altering optical element can also be categorized as being static or dynamic. Examples of suitable static beam altering optical elements include those with one or more fixed surface regions, such as gratings, holograms, stencils, light shaping holographic filters, polychromatic holograms, lenses, mirrors, prisms, waveplates and the like.

Examples of suitable dynamic beam altering optical elements having a time dependent aspect to their function include computer generated diffractive patterns, phase shifting materials, liquid crystal phase shifting arrays, micro-mirror arrays, piston mode micro-mirror arrays, spatial light modulators, electro-optic deflectors, accousto-optic modulators, deformable mirrors, reflective MEMS arrays and the like. With a dynamic beam altering optical element, the media which comprises the beam altering optical element can be altered, to change the phase pattern imparted to the laser beam 61 which results in a corresponding change in the phase profile of the laser beam 61, such as diffraction, or convergence.

The beam altering optical element is also useful to impart a particular topological mode to the laser beam 61. Accordingly, one beamlet may be in a Gauss-Laguerre mode while another beamlet in a Gaussian mode.]

Preferred dynamic optical elements include phase-only spatial light modulators such as the "PAL-SLM series X7665", manufactured by Hamamatsu, of Japan or the "SLM 512SA7," manufactured by Boulder Nonlinear Systems of Layafette Colo. These beam altering optical elements are computer 65 controlled to generate the optical traps T1-T3.

Because the steady state index of refraction "n" of each microsphere S1-S3 corresponds to the index of refraction of the optical fibers F1 & F2 optical switching will occur when the selected microsphere S1 is moved close enough to the unclad or thinly clad regions 52 of the optical fibers F1 & F2. At some distance from the optical fibers F1 & F2 the evanescent wave, associated with the signal of the selected channel, will cross the surface of the selected microsphere S1, via WGM resonance, and switch signal between optical fibers F1 & F2. When the switching is completed the optical trap is quickly withdrawn and the microsphere S1 ceases to switch signal.

By adjusting the distance the microsphere S1 from the unclad or thinly region 52 of the optical fibers F1 & F2 a controllable index of refraction of "n±x" for the microsphere may be obtained, wherein as "x" approaches zero the efficiency of the transfer of signal approaches the microsphere's maximum obtainable efficiency which may be useful for applications such as channel equalizing, grooming and power balancing.

In another invention relating to optical filters, FIG. 5 depicts an always "on" optical filter 100. The optical filter 100 is constructed of a dielectric microsphere "S" fixed proximate to an input waveguide 110 and an output waveguide 120, each of which supports signal propagation of a group of signals $\lambda rs_0, \lambda rs_2 \ldots \lambda rs_n$, and provides a corresponding evanescent wave along the waveguide. The dielectric microsphere S will filter a specific wavelength signal corresponding to the resonate signal "RS" ($\lambda rs_2$) it resonates for in WGM. The RS for a specific size microsphere can be obtained from the second equation ($d_e/q=RS$).

Further, as shown in the Table of FIG. 27, by selecting a small diameter microsphere S, the optical filter 100 can be constructed whereby it will only resonate in WGM for a single signal within a telecommunications band at a predetermined channel spacing. Microsphere diameters are preferably between about 29 and 2 microns, more preferably between about 19 and 2 microns and most preferably between about 9 and 2 microns.

The microsphere S affixed within a medium 1000 which has an index of refraction "$n_{medium}$" that is different from the index of refraction of the microsphere S "$n_{rs}^{(microsphere)}$". The difference between the indexes of refraction should be adequate to establish an condition of total internal reflection at the resonate structure-medium interface 1500 formed between the medium and the microsphere S. For microspheres constructed of silica with an index of refraction of 1.52, the media should have an index of refraction of about below 1.52. Suitable media may include plastic, oil, or water.

Establishing the condition of total internal reflection, at the resonate structure-medium interface 1500, is used to increase the Q of a small diameter microsphere by reducing the losses in Q due to due to $Q^{-1}_{rad}$ (which are those losses in Q attributable to the smallness of the diameter of the microsphere).

The input and output waveguides 110 and 120 for the optical filter are constructed from an input and output optical fiber F1 and F2, each of which has a core 130 through which signals travel which is surrounded by a layer of cladding 140. The core 130 is normally constructed of a high index of refraction material such as silicon (Si index 3.5) and the cladding 140 of a low index of refraction material such as silicon oxide ($SiO_2$ index 1.5). Other high index of refraction materials, such as Ge, GaAs, InP, and GaAlA, among others, form the core. The suitable materials are limited only to those which display a longitudinal signal propagation and may include waveguides constructed out of semi-conductor material, or photonic band gap material, or photomic crystal material.

Around the resonate structure-waveguide interfaces 150 the cladding is thinned or stripped forming a region of reduced cladding 160. Further, each optical fiber F1 and F2 is illustrated with the core 130 reduced 170 down to a tapered core 180. It is known that that a reduction in the core 130 into a tapered core 180, with a smaller diameter or waist, can establish a condition wherein the evanescent wave the light signal forms while traveling along the optical fiber can have an extended evanescent tail into the free space surrounding the tapered core 180 The signal amplitude of the evanescent wave available for coupling from the input optical fiber F1 decreases generally exponentially from the distance from the optical fiber the microsphere is fixed to the input optical fiber F1 from which it receive the evanescent tail.

Although tapered fibers are illustrated and preferred, tapering is not a limitation and non-tapered optical fibers or other waveguides may be substituted for the tapered optical fibers. It some cases, depending on the desired signal amplitude for the RS the amount of taper may be varied to support a evanescent wave corresponding to a specific RS amplitude.

Proximate placement of the microsphere S to the input waveguide 110 and secondary structure 120 places the microsphere S in a position to couple a light signal from the input waveguide 110 or to the output waveguide 120. In practice the microsphere S will receive the evanescent wave of its RS, at a resonate structure-waveguide interface 150, emanating from the input waveguide 110 and switch a portion of those RS at a resonate structure-waveguide interface 150 to the output waveguide 120.

The microsphere S may also be coated with an index specific coating 2000 whereby the index of refraction of the index specific coating "$n_{rs}^{(coated\ microsphere)}$" is the effective index of refraction of the microsphere. Suitable coatings include, but are not limited to germanium, silicon, and SiGe.

An optical filter 200 with an electronic control is shown in FIG. 6. The microsphere S is fixed proximate to an input waveguide 110 (which supports a group of optical signals ($\lambda rs_0, \lambda rs_1, \lambda rs_2, \ldots \lambda rs_n$) and an output waveguide 120. The electronic control is formed by placing an electrode pair E & E' conductively linked to a controller (not shown) by conductive leads 210 on opposing surfaces of the microsphere. The electronic control provides an "on/off" function by one of two WGM controls.

The electronic control mechanism, for either the first or second WGM control, is the polarization of the microsphere S. Polarization of the microsphere S can be achieved by a linear electro optic effect. Passing an electrical power (a voltage or current) across an electrode pair E & E' on opposing surfaces of the microsphere and conductively linked to a controller (not shown) by conductive leads 210 may be used to produce such a linear electro optic effect. The linear electro optic effect will polarize the substrate of the microsphere by altering its dielectric constant "$\epsilon_{rs}^{(microsphere)}$". The $\epsilon_{rs}^{(microsphere)}$ has a "real" portion "$\epsilon_1$" and an imaginary portion "$i\epsilon_2$", and is the sum of both portions as shown in the third equation: $\epsilon_{rs}=(\epsilon_1+i\epsilon_2)$.

When $i\epsilon_2$ remains a constant, the index of refraction of the microsphere (resonate structure) $n_{rs}^{(microsphere)}$ is known to be proportional to the square root of the "real" portion of the dielectric constant of the microsphere $\sqrt{\epsilon_1}$. Accordingly, $n_{rs}^{(microsphere)}$ can be altered through the controlled change of $\epsilon_1$ by the linear electro optic effect.

The first WGM control can switch "on/off" the optical filter based on adjustment of the index of refraction of the microsphere "$n_{rs}^{(microsphere)}$" to establish conditions which either support or do not support WGM resonance by the microsphere "S". The polarization adjusts $n_{rs}$ and from the first equation it is known that when "d" remains fixed and the $n^{(microsphere)}_{rs}$ changes, the $d_e$ will change. Further, from the second equation it is known that the RS is a function of $d_e/q$, and if $d_e$ changes, a corresponding change in the RS will occur. Therefore, adjusting the $n_{rs}^{(microsphere)}$ is used to establish conditions to either select an $n_{rs}^{(microsphere)}$ which supports or does not support WGM resonance for the specific RS.

A default "on" optical filter of the first WGM control, occurs when the $n_{rs}^{(microsphere)}$ supports WGM for the specific wavelength RS for which switching is desired. In such a default "on" optical filter, the "off" function is the adjustment of the $n_{rs}^{(microsphere)}$ to no longer support WGM resonance for the specific RS. It is also possible to use this adjustment in the $n_{rs}^{(microsphere)}$ to tune a microsphere and select from a range of different wavelength RS for switching.

Conversely, a default "off" optical filter of the first WGM control occurs when the $n_{rs}^{(microsphere)}$ does not support WGM resonance for a specific RS. In such a default "off" optical filter, WGM resonance for the specific RS is achieved by adjusting the $n_{rs}^{(microsphere)}$ to tune the microsphere to support WGM for a specific wavelength RS.

In either a default "on" or a default "off" optical filter, the adjustment to the $n_{rs}^{(microsphere)}$ is through polarization or through an interruption in polarization.

The "on/off" function of the second WGM control derives from either disrupting or establishing coupling conditions between the microsphere S and the input optical fiber 110 and/or the output waveguide 120 at one or more regions, each forming a resonate structure-waveguide interfaces 150. Polarization of the microsphere S is again used to adjust the $n_{rs}^{(microsphere)}$. However, the adjustment of $n_{rs}$ is relative to the index of refraction of a medium 1000 "$n_{medium}$" surrounding the microsphere S.

When the $n_{rs}^{(microsphere)}$ substantially equals $n_{medium}$ at a resonate structure-waveguide interface 150, the microsphere S at that interface is effectively medium and transparent to all signals. When the $n_{rs}^{(microsphere)}$ does not substantially equal the $n_{medium}$ the microsphere S is distinct from the medium 1000 and switching via WGM resonance from the input waveguide 110 to the output waveguide 120 can occur when RS is provided.

The microsphere S within the electronically controlled optical filter 200 may be coated with an optically active material 3000 such as molecules of liquid crystal, organic photorefractive polymers, GaAs, Nitrabenzene and $LiNbO_3$ . . . in which case the voltage or current passed between the electrode pair 210 and across the microsphere S is used to polarize the optically active coating material 3000 and change the dielectric constant $\epsilon_1^{(coated\ microsphere)}$ of the coated microsphere, which adjusts the index of the coated microsphere "$n_{rs}^{(coated\ microsphere)}$". Accordingly, application of the first or second WGM controls can be applied through adjustment of the $n_{rs}^{(coated\ microsphere)}$. The optically active coating may also be the index specific coating 2000.

Figure 7:
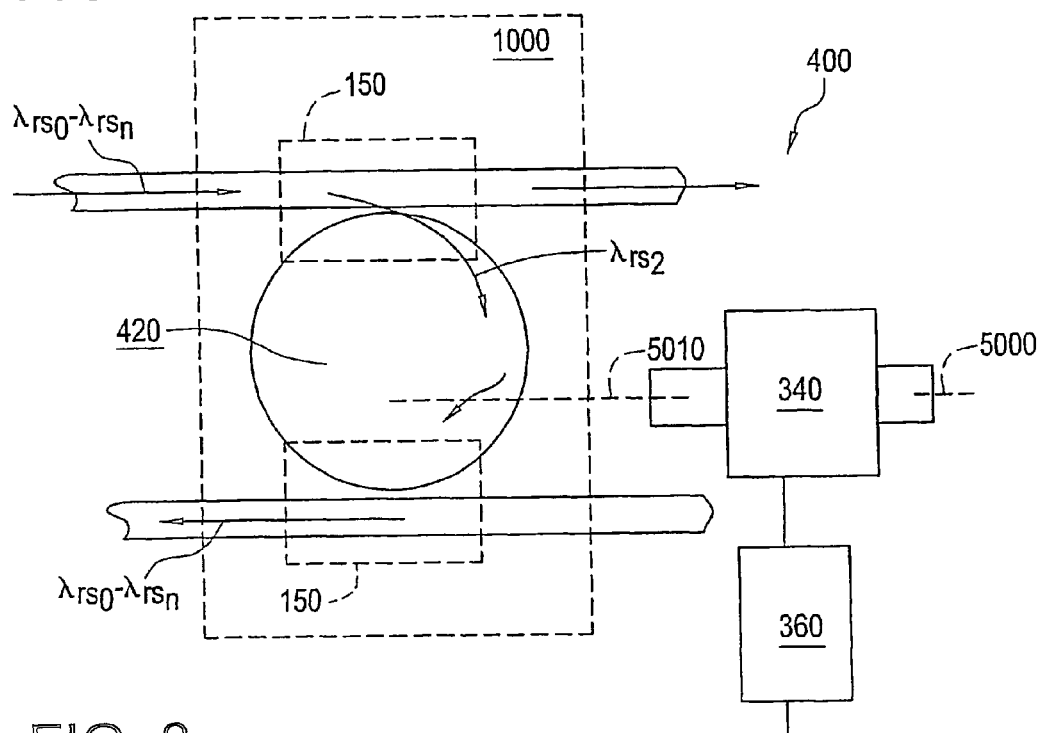
FIG. 7 illustrates a component view an optically gated optical switch and filter.

An optically controlled filter 300 is shown in FIG. 7. As described in reference to FIG. 5, a microsphere "S" which resonates in WGM for a group of RS ($\lambda rs_0, \lambda rs_1, \lambda rs_2$) is fixed proximate to the input waveguide 110 and the output waveguide 120. In this embodiment polarization of the microsphere S is achieved by an optical effect which polarizes the microsphere S by applying an intense beam of light to the microsphere S.

The optical control is formed by directing an intense beam of light, which can be pulsed on or off in "optical real time", from a laser beam 5000 through an illuminating fiber 320 into a Mach-Zender interferometer 340 which produces a modified laser beam 5010 exiting the Mach-Zender interferometer 340. The modified laser beam 5010 is either intensified by the Mach-Zender interferometer 340, through constructive interference or weakened through destructive interference. The Mach-Zender interferometer 340 operates in the picoseconds range and the modified laser beam 5010 directed at the microsphere S can occur or terminate in a similar time interval. A controller such as a computer 360 is used to control the Mach-Zender interferometer 340.

The modified laser beam 5010 polarizes the microsphere S by effecting the "real" portion "$\epsilon_1$" of its dielectric constant "$\epsilon^{(microsphere)}$". Accordingly, when the "imaginary" portion "$i\epsilon_2$" of $\epsilon^{(microsphere)}$ remains constant, the $n_{rs}^{(microsphere)}$, which is proportional to $\sqrt{\epsilon_1}$ can be adjusted through a controlled change of $\epsilon_1$ reduced by an optical effect.

As discussed in detail with respect to the electronically controlled optical filter shown in FIG. 6, the alteration of the $n_{rs}^{(microsphere)}$ provides for the WGM controls which can be used to switch "on/off" the optical filter 300.

The microsphere S within the optical filter 300 may also be coated with an optically active material 3000 in which case the optical effect can be used to apply a WGM control to adjust the $n_{rs}^{(coated\ microsphere)}$ as described in reference to FIG. 6.

Figure 8:
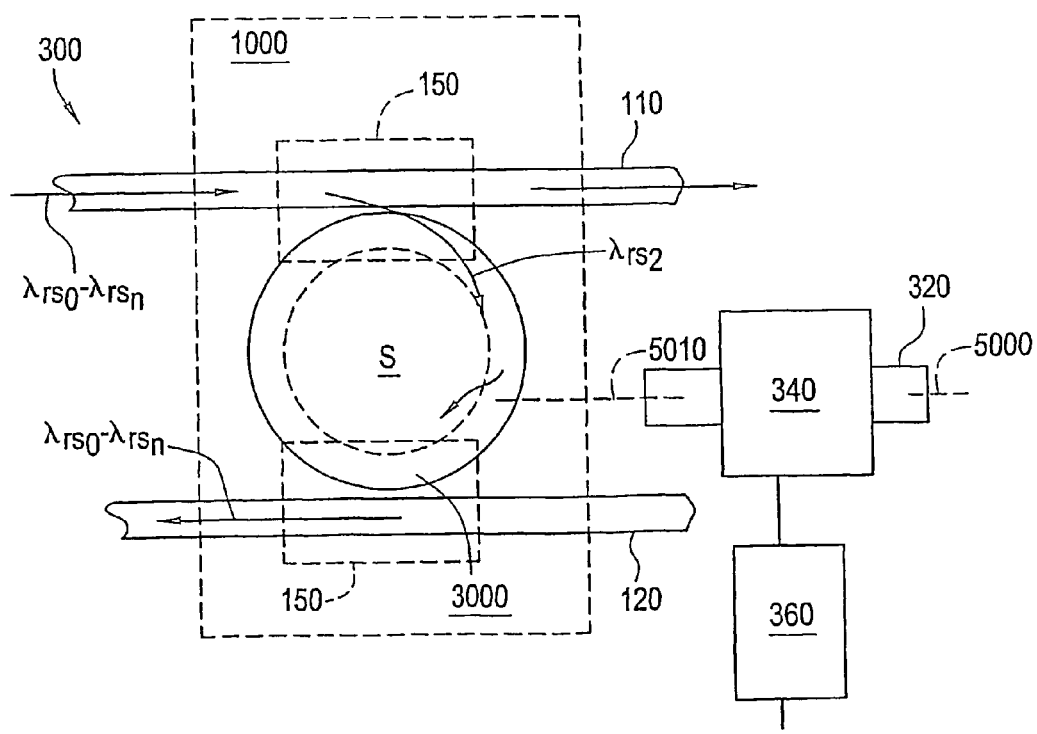
FIG. 8 illustrates a component view of a signal loss optical switch and filter.

Shown in FIG. 8 is a signal loss optical filter wherein a controlled signal loss is used to disrupt the WGM resonance of the microsphere S. To provide for signal loss a triggerable signal absorbing material such as photochromic bisthienylethene 420 is placed within the substrate of the microsphere.

The trigger shown in this embodiment is a modified laser beam 5010 exiting a Mach-Zender interferometer 340 which triggers the signal absorbing material to absorb sufficient light signal to disrupt WGM resonance.

Those skilled in the art will recognize that photochromic bisthienylethene is but one member of a broader group of photochromic materials which may be combined into the substrate of the microsphere S to act as the light absorbing material. Moreover, other materials which have light absorbing properties and can be triggered by a specific quality or quantity of light outside the optical band may be used as the light absorbing material. Other material which can be selectively activated with the appropriate trigger and may include a beam of light, or electrical energy applied to the microsphere, which in turn will pump the signal absorbing material to a higher energy state to provide for its signal absorbing activity include, but are not limited to, semi conductor nanoclusters, electrochromic nanocrystals, quantum dots, doped semi-conductor nanoclusters, PDLC, and semi conductors, and dyes.

Figure 9:
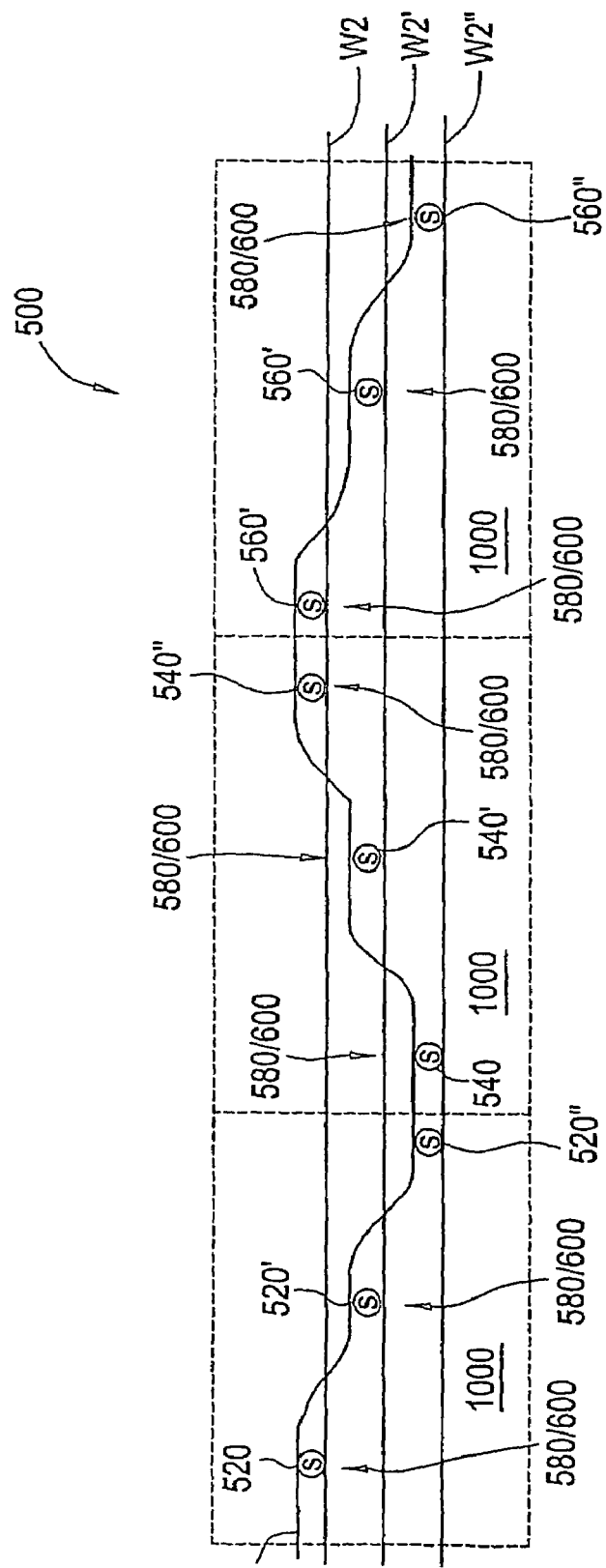
FIG. 9 illustrates a component view of a DEMUX system.

A system comprised of a group of optical filters which optically cross connect waveguides and demultiplex (DEMUX) optical signals is shown in FIG. 9. The DEMUX system 500 is constructed of "n" groups of wavelength specific optical filters. Each of the "n" groups of filters contains "m" redundant optical filters 520, 520' and 520", 540, 540' and 540" and 560, 560' and 560". Each of the "m" redundant filters 520-560" is fixed proximate to the input waveguide W1 through which optical signals of a different wavelength ($\lambda rs_0, \lambda rs_1, \lambda rs_2, \lambda rs_3 \ldots \lambda rs_n$) are supplied. One of the "m" redundant filters from each of the "n" groups is also fixed proximate to one of "m" output waveguides W2, W2' and W2", whereby the optical signals can be multiplexed (MUX) into the output waveguides W2, W2' and W2". The entire DEMUX system is placed in a medium 1000 with a known index of refraction. The optical filters 520-560" may be always "on" and simply cross connect between waveguides.

At least some of the optical filters 520-560" in the DEMUX system 500 may be switched "on/off". Switching "on/off" may be through polarization applied via an electronic or optical control by adjusting the index of refraction of a microsphere S $n_{rs}^{(microsphere)}$ or by a signal loss control. In the case of a signal loss control a trigger, such as an intense beam of light 600 is applied to a microsphere S which contains a triggerable signal absorbing material within its substrate.

Illustrated in FIG. 10 is an overview of a system and method, generally designated 700 to construct an optical switch, or a group of optical filters such as those described in reference to FIG. 9, by using one or more optical traps to place and/or hold the WGM microspheres.

To fabricate an optical filter, movable optical traps 10000 & 10020 are generated within an assembly vessel 710. The assembly vessel should be constructed of a material which is at least partially transparent, and which allows the light used to form optical traps to pass through in the desired location.

The optical traps 10000 & 10020 are used to manipulate small microspheres S1 & S2 and position them to construct an optical filter. Optical traps 10000 & 10020 can be formed by passing a collimated light, preferably a laser beam 5000, to area "A" on a phase patterning optical element 720 which generates beamlets 730 & 740. Each beamlet 730 & 740 created by the phase patterning optical element 720 then passes through transfer optics L1 & L2 onward to a beam splitter 750.

The beam splitter 750 provides two streams of light 760 & 770 oriented in different directions. The first light streams 760 originate from the phase patterning optical element 720 as beamlets 730 & 740 which are redirected by the beam splitter through area "B" at the back aperture 780 of a focusing lens 790 thereby overlapping the beamlets 730 & 740 at the back aperture 780 of the focusing lens. In those embodiments in which the crown section of the beamlets 730 & 740 is less intense at the periphery and more intense at regions inward from the periphery, overfilling the back aperture 780 by less than about 15 percent is useful to form optical traps with greater intensity at the periphery of the optical traps than without overfilling the back aperture 780.

The beamlets 730 & 740 are converged as they pass through the focusing lens 790 to form the optical traps 10000 & 10020 by producing the gradient conditions necessary to contain and manipulate the microspheres S1 & S2 in three-dimensions. Only two sets of microspheres, beamlets, and optical traps are shown for clarity, but it should be understood that a greater or lesser number can be provided depending on the nature, scope, and other parameters of the assay and the capabilities of the system generating the optical traps. Altering the phase patterning optical element alters the phase profile of the beam, which can alter the position of the optical traps.

Any suitable laser can be used as the source of the laser beam 5000. Useful lasers include solid state lasers, diode pumped lasers, gas lasers, dye lasers, alexanderite lasers, free electron lasers, VCSEL lasers, diode lasers, Ti-Sapphire lasers, doped YAG lasers, doped YLF lasers, diode pumped YAG lasers, and flash lamp-pumped YAG lasers. Diode-pumped Nd:YAG lasers operating between 10 mW and 5 W are preferred.

When the laser beam 5000 reflects off the phase patterning optical element 720, the phase patterning optical element produces the beamlets 730 & 740, each having a phase profile. Depending on the number and type of optical traps desired, the phase profile may be altered, the alteration may include diffraction, wavefront shaping, phase shifting, steering, diverging and converging. Based upon the phase profile chosen, the phase patterning optical element can be used to generate optical traps in the form of optical tweezers, optical vortices, optical bottles, optical rotators, light cages, and combinations of two or more of these forms.

Suitable phase patterning optical elements are characterized as transmissive or reflective depending on how they direct the focused beam of light or other source of energy. Transmissive diffractive optical elements transmit the beam of light or other source of energy, while reflective diffractive optical elements reflect the beam.

The phase patterning optical element can also be categorized as having a static or a dynamic surface. Examples of suitable static phase patterning optical elements include those with one or more fixed surface regions, such as gratings, including diffraction gratings, reflective gratings, and transmissive gratings, holograms, including polychromatic holograms, stencils, light shaping holographic filters, polychromatic holograms, lenses, mirrors, prisms, waveplates and the like.

Examples of suitable dynamic phase patterning optical elements having a time dependent aspect to their function include computer generated diffractive patterns, phase shifting materials, liquid crystal phase shifting arrays, micro-mirror arrays, including piston mode micro-mirror arrays, spatial light modulators, electro-optic deflectors, accousto-optic modulators, deformable mirrors, reflective MEMS arrays and the like. With a dynamic phase patterning optical element, the medium which comprises the phase patterning optical element can be altered, to impart a patterned phase shift to the focused beam of light which results in a corresponding change in the phase profile of the focused beam of light, such as diffraction or convergence. Additionally, the medium which comprises the phase patterning optical element can be altered to produce a change in the location of the optical traps. It is an advantage of dynamic phase patterning optical elements, that the medium can be altered to independently move each optical trap.

Preferred dynamic optical elements include phase-only spatial light modulators such as the "PAL-SLM series X7665", manufactured by Hamamatsu, of Japan or the "SLM 512SA7," and "SLM 512SA15" both manufactured by Boulder Nonlinear Systems of Lafayette Colo. These phase patterning optical elements are computer controlled, by encoding a hologram within the medium, to generate the beamlets 10000 & 10020.

The phase patterning optical element is also useful to impart a particular topological mode to the laser light. Accordingly, one beamlet may be formed into a Gauss-Laguerre mode while another beamlet may be formed in a gaussian mode.

Returning to the beam splitter, the beam splitter 750 also provides a second light stream 770 originating from an imaging illumination source 800. The second light stream 770 passes through the working region 710 and the beam splitter 750 and forms an optical data stream 82 which provides information on the position of the microspheres S1 & S2 in the working region 710. The optical data stream can be converted to a video signal, monitored, or analyzed by visual inspection of an operator, spectroscopically, and/or video monitoring. The optical data stream 820 may also be processed 840 by a photodectector to monitor intensity, or any suitable device to convert the optical data stream to a digital data stream adapted for use by a computer.

To contain, position and hold a microsphere in a selected location, an operator and/or the computer can adjust the phase patterning optical element 720 to direct the movement of the optical traps 10000 & 10020 to first acquire the selected microsphere and contain it within an optical trap. An optical trap with a contained microsphere may then be reconfigured as to the position of the microsphere. The optical data stream 820 can be used to identify and/or monitor the position of one or more of the trapped. Based on the positional and identity information the holograph encoded in the medium of the phase patterning optical element 720 can be altered. Such alteration of the holograph can be used to change the type of optical trap as well as the position of the optical trap and a microsphere contained thereby.

In another invention related to optical filters, FIGS. 11A and 11B depict an optically triggered optical switch. The optical switch 4000 is constructed of a dielectric microsphere "S", less than about 200 microns in diameter, fixed at a region proximate to an input waveguide 1100 which supports signal propagation of a group of signals $\lambda rs_0, \lambda rs_1, \lambda rs_2 \ldots \lambda rs_n$, each of which provides a corresponding evanescent wave along the waveguide 1100, and a secondary structure 1200. The secondary structure 1200 should be a structure such as another waveguide, a photonic band gap waveguide, a semi-conductor waveguide, a photonic crystal waveguide, a WGM microsphere or other resonate structure which supports signal propagation. The dielectric microsphere S resonates in WGM for a group of resonate signals "RS" ($\lambda rs_0, \lambda rs_1, \lambda rs_2$) which can be obtained from the second equation ($d_e/q=RS$).

Proximate placement of the microsphere S to the input waveguide 1100 and secondary structure 1200 places the microsphere S in a position to couple a light signal from the input waveguide 1100 or to the secondary structure 1200. In practice the microsphere S will receive the evanescent wave of its RS ($\lambda rs_0$, and $\lambda rs_2$), at a resonate structure-waveguide interface 1400, emanating from the input waveguide 1100 and switch the RS ($\lambda rs_0$, and $\lambda rs_2$) at a resonate structure-waveguide interface 1400 to the secondary structure 1200.

Within the substrate forming the microsphere a triggerable signal absorbing material 1500 (such as photochromic bisthienylethene) is placed. Signal loss can be achieved by altering the imaginary portion of the dielectric constant (i$\epsilon_2$) through the action of the signal absorbing material 1500 triggered by directing an intense beam of light, shown in FIG. 11B at the resonate structure to trigger the action off the signal absorbing material 1500. A laser beam 5000 can be used to provide the intense beam of light. Advantages of the laser beam are that it can be pulsed on or off in "optical real time" (in the order of nanosecond or picoseconds), providing "on/off" switching in the order of nanosecond or picoseconds, by the signal loss caused by triggering the signal absorbing material 1500 to absorb sufficient light signal to disrupt WGM resonance.

The intense beam of light can be produced by a laser beam 5000 passing through an illuminating fiber 5005 into a Mach-Zender interferometer 5200 which produces a modified laser beam 5010 exiting the Mach-Zender interferometer 5200. The modified laser beam 5010 is either intensified by the Mach-Zender interferometer 5200, through constructive interference or weakened through destructive interference. The Mach-Zender interferometer 5200 operates in the picoseconds range and the modified laser beam 5010 directed at the microsphere S can occur or terminate in a similar time interval. A controller such as a computer 5400 is used to control the Mach-Zender interferometer 5200.

Those skilled in the art will recognize that photochromic bisthienylethene is but one member of a broader group of photochromic materials which may be combined into the substrate of the microsphere S to act as the light absorbing material. Moreover, other materials which have light signal absorbing properties and can be triggered by a specific quality or quantity of light outside the optical band may be used as the light absorbing material. Other material which can be selectively activated with the appropriate trigger which may include a beam of light, or electrical energy applied to the microsphere which in turn will pump the signal absorbing material to a higher energy state to provide for its signal absorbing activity include, but are not limited to, semi conductor nanoclusters, electrochromic nanocrystals, semi conductors, quantum dots, doped semi-conductor nanoclusters, PDLC, dihydroindolizines, diarylimylenes, ScGe, bis-Mienylperfluorocyclopentenes, spiropyrens, fulgides, and dyes.

Although a tapered optical fiber is the preferred waveguide 1100, it is not a limitation and non-tapered optical fibers or other waveguides may be substituted for the tapered optical fibers.

The waveguide 1100 is constructed from an input optical fiber which has a core through which signals travel which is surrounded by a layer of cladding. The cladding has an index of refraction sufficiently distinct from the index of refraction of the core to establish a condition of total internal reflection at the core-cladding interface. The core is normally constructed of a high index of refraction material such as silicon (Si index 3.5) and the cladding of a low index of refraction material such as silicon oxide ($SiO_2$ index 1.5). Other high index of refraction materials such as Ge, GaAs, InP, GaAlA, among others form the core. The suitable materials are limited only to those which display a longitudinal signal propagation and may include waveguides constructed out of semiconductor material, or photonic band gap materials.

Around the resonate structure-waveguide interface 1400 with the waveguide the cladding is thinned or stripped forming a region of reduced cladding 1600. It is known that a reduction in the core into a tapered core, with a smaller diameter or waist, can establish a condition wherein the evanescent wave the light signal forms while traveling along the optical fiber can have an extended evanescent tail into the free space surrounding the tapered core.

Although tapered fibers are preferred, tapering is not a limitation and non-tapered optical fibers or other waveguides, including but not limited to semi-conductor waveguides formed from of semi-conductor material and constructed by lithographic methods used in the construction of semi-conductor waveguides, may be substituted for the tapered optical fibers. In some cases, depending on the desired signal amplitude for the RS which continues down the input optical fiber downstream from the optical filter 1600 the amount of taper may be varied to control downstream RS amplitude.

Figure 12:
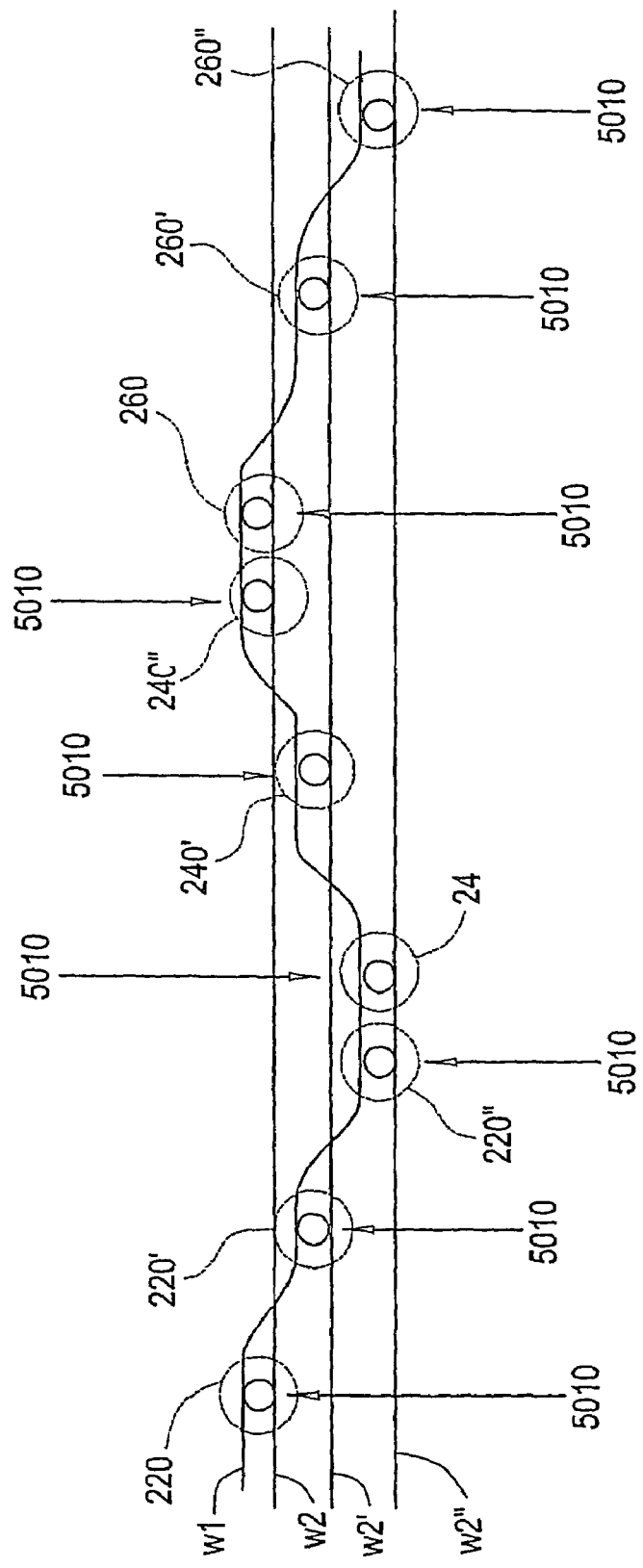
FIG. 12 illustrates a component view of a demultiplexing system.

The group of filters shown in FIG. 12 can be used to demultiplex (DEMUX) different wavelength signals within an optical transmission band. The demultiplexing system 200 shown in FIG. 12 is constructed of "n" groups each containing "m" filters 220, 220', 220", 240, 240', 240" and 260, 260' and 260". Each group of "m" filters is redundant in that it filters for the same wavelength RS. The filters are each fixed proximate to an input waveguide W1, through which optical signals in different channels, each with a different wavelength ($\lambda rs_0$, $\lambda rs_1$, $\lambda rs_2$, $\lambda rs_3$ . . . $\lambda rs_n$ can propagate. The optical signals are then directed by the filters (220-260") to a group of output waveguides W2, W2' and W2" where the optical signals can be multiplexed (MUX) into the output waveguides W2, W2' and W2". The preferred waveguide construction is to use optical fibers with tapered regions of reduced cladding as described in reference to FIG. 11A at resonate structure waveguide interfaces where coupling occurs. The microspheres within each filter contain a triggerable light absorbing material in their substrate. To prevent optical switching from a microsphere to an output waveguide W2, W2' or W2" which is fixed proximate to an intense beam of light, such as a modified laser beam 5010, it is applied as a trigger to the microsphere S for which switching is not desired.

The within system to DEMUX and/or MUX is but one example of a combination of filters used to optically cross connect signals between waveguides. There may be as few as one optical filter in each of the "m" groups. Additional switches may be added. Further, the optical filters of the present invention, which disrupt WGM resonance by signal loss, may be configured in different and various positions without departing from the invention.

Figure 13:
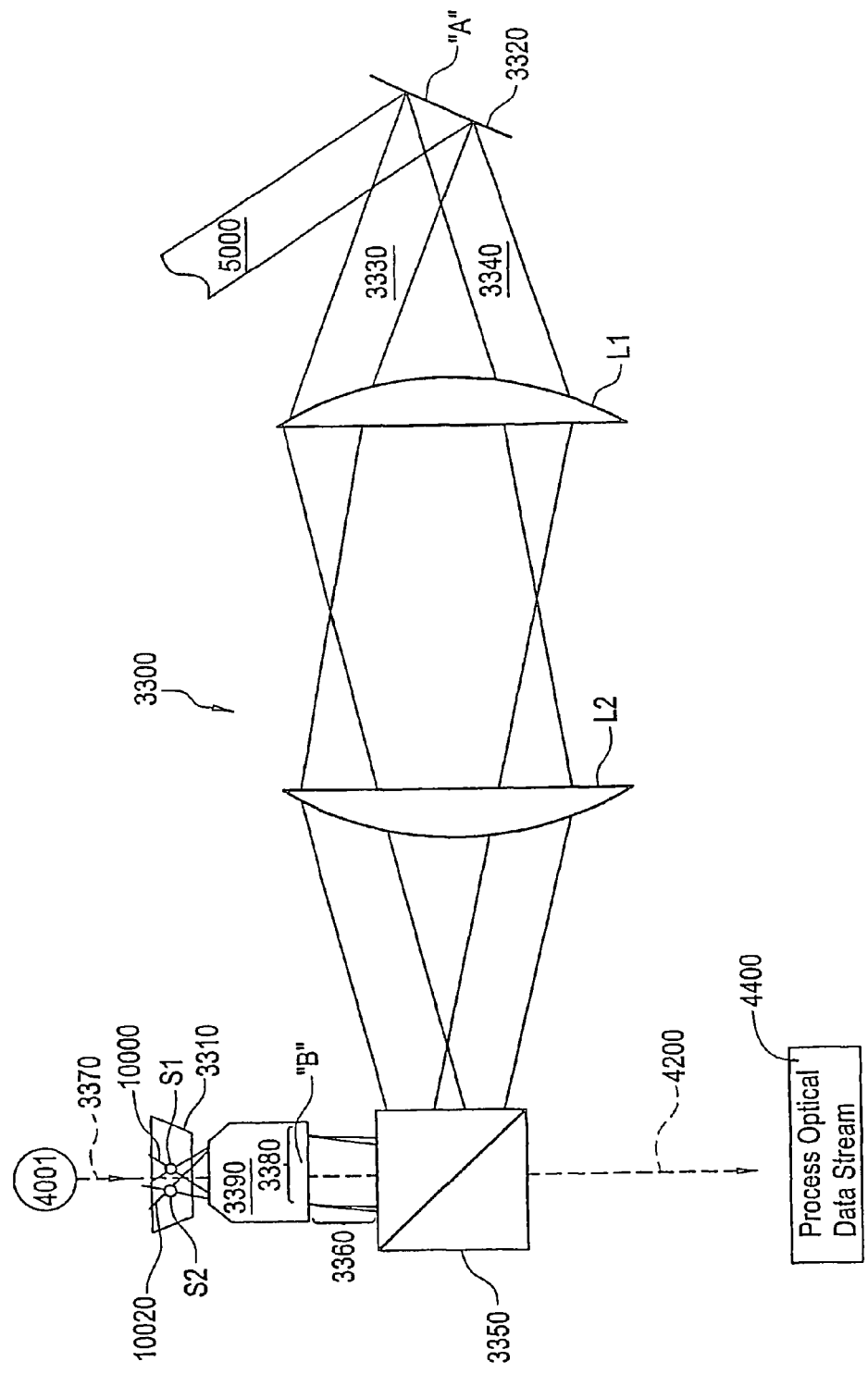
FIG. 13 illustrates an optical trapping system to manipulate optical switch components.

Illustrated in FIG. 13 is an overview of a system and method, generally designated 3300 to construct an optical switch, or a group of optical filters such as those described in reference to FIG. 12, by using one or more optical traps to place and/or hold the WGM microspheres.

To fabricate an optical filter, movable optical traps 10000 & 10020 are generated within an assembly vessel 3310. The assembly vessel should be constructed of a material which is at least partially transparent, and which allows the light used to form optical traps to pass through in the desired location.

The optical traps 10000 & 10020 are used to manipulate small microspheres S1 & S2 and position them to construct an optical filter. Optical traps 10000 & 10020 can be formed by passing a collimated light, preferably a laser beam 5000, to area "A" on a phase patterning optical element 3320 which generates beamlets 3330 & 3340. Each beamlet 3330 & 3340 created by the phase patterning optical element 3320 then passes through transfer optics L1 & L2 onward to a beam splitter 3350.

The beam splitter 3350 provides two streams of light 3360 & 3370 oriented in different directions. The first light streams 3360 originates from the phase patterning optical element 3320 as beamlets 3330 & 3340 which are redirected by the beam splitter 3350 through area "B" at the back aperture 3380 of a focusing lens 3390 thereby overlapping the beamlets 3340 & 3350 at the back aperture 3380 of the focusing lens. In those embodiments in which the non section of the beamlets 3330 & 3340 is less intense at the periphery and more intense at regions inward from the periphery, overfilling the back aperture 3380 by less than about 15 percent is useful to form optical traps with greater intensity at the periphery of each optical trap than without overfilling the back aperture 3380.

The beamlets 3330 & 3340 are converged as they pass through the focusing lens 3390 to form the optical traps 10000 & 10020 by producing the gradient conditions necessary to contain and manipulate the microspheres S1 & S2 in three dimensions. Only two sets of microspheres, beamlets, and optical traps are shown for clarity, but it should be understood that a greater or lesser number can be provided depending on the nature, scope, and other parameters of the assay and the capabilities of the system generating the optical traps. Altering the phase patterning optical element alters the phase profile of the beam, which can alter the position of the optical traps.

Any suitable laser can be used as the source of the laser beam 5000. Useful lasers include solid state lasers, diode pumped lasers, gas lasers, dye lasers, alexanderite lasers, free electron lasers, VCSEL lasers, diode lasers, Ti-Sapphire lasers, doped YAG lasers, doped YLF lasers, diode pumped YAG lasers, and flash lamp-pumped YAG lasers. Diode-pumped Nd:YAG lasers operating between 10 mW and 5 W are preferred.

When the laser beam 5000 reflects off the phase patterning optical element 3320, the phase patterning optical element produces the beamlets 3330 & 3340, each having a phase profile. Depending on the number and type of optical traps desired, the phase profile may be altered, the alteration may include diffraction, wavefront shaping, phase shifting, steering, diverging and converging. Based upon the phase profile chosen, the phase patterning optical element can be used to generate optical traps in the form of optical tweezers, optical vortices, optical bottles, optical rotators, light cages, and combinations of two or more of these forms.

Suitable phase patterning optical elements are characterized as transmissive or reflective depending on how they direct the focused beam of light or other source of energy. Transmissive diffractive optical elements transmit the beam of light or other source of energy, while reflective diffractive optical elements reflect the beam.

The phase patterning optical element can also be categorized as having a static or a dynamic surface. Examples of suitable static phase patterning optical elements include those with one or more fixed surface regions, such as gratings, including diffraction gratings, reflective gratings, and transmissive gratings, holograms, including polychromatic holograms, stencils, light shaping holographic filters, polychromatic holograms, lenses, mirrors, prisms, waveplates and the like.

Examples of suitable dynamic phase patterning optical elements having a time dependent aspect to their function include computer generated diffractive patterns, phase shifting materials, liquid crystal phase shifting arrays, micromirror arrays, including piston mode micro-mirror arrays, spatial light modulators, electro-optic deflectors, accousto-optic modulators, deformable mirrors, reflective MEMS arrays and the like. With a dynamic phase patterning optical element, the medium which comprises the phase patterning optical element can be altered, to impart a patterned phase shift to the focused beam of light which results in a corresponding change in the phase profile of the focused beam of light, such as diffraction or convergence. Additionally, the medium which comprises the phase patterning optical element can be altered to produce a change in the location of the optical traps. It is an advantage of dynamic phase patterning optical elements, that the medium can be altered to independently move each optical trap.

Preferred dynamic optical elements include phase-only spatial light modulators such as the "PAL-SLM series X7665", manufactured by Hamamatsu, of Japan or the "SLM 512SA7," and "SLM 512SA15" manufactured by Boulder Nonlinear Systems of Lafayette Colo. These phase patterning optical elements are computer controlled, by encoding a hologram within the medium, to generate the beamlets 10000 & 10020.

The phase patterning optical element is also useful to impart a particular topological mode to the laser light. Accordingly, one beamlet may be formed into a Gauss-Laguerre mode while another beamlet may be formed in a gaussian mode.

Returning to the beam splitter, the beam splitter 3350 also provides a second light stream 3370 originating from an imaging illumination source 3340. The second light stream 3370 passes through the working region 3310 and beam splitter 3350 and forms an optical data stream 4200 which provides information on the position of the microspheres S1 & S2 in the working region 3310. The optical data stream can be converted to a video signal, monitored, or analyzed by visual inspection of an operator, spectroscopically, and/or video monitoring. The optical data stream 4200 may also be processed 4400 by a photodectector to monitor intensity, or any suitable device to convert the optical data stream to a digital data stream adapted for use by a computer.

To contain, position and hold a microsphere in a selected location, an operator and/or the computer can adjust the phase patterning optical element 3320 to direct the movement of the optical traps 10000 & 10020 to first acquire the selected microsphere and contain it within an optical trap. An optical trap with a contained microsphere may then be reconfigured as to the position of the microsphere. The optical data stream 4200 can be used to identify and/or monitor the position of one or more of the trapped. Based on the positional and identity information the holograph encoded in the medium of the phase patterning optical element 3320 can be altered. Such alteration of the holograph can be used to change the type of optical trap as well as the position of the optical trap and a microsphere contained thereby.

Figure 14:
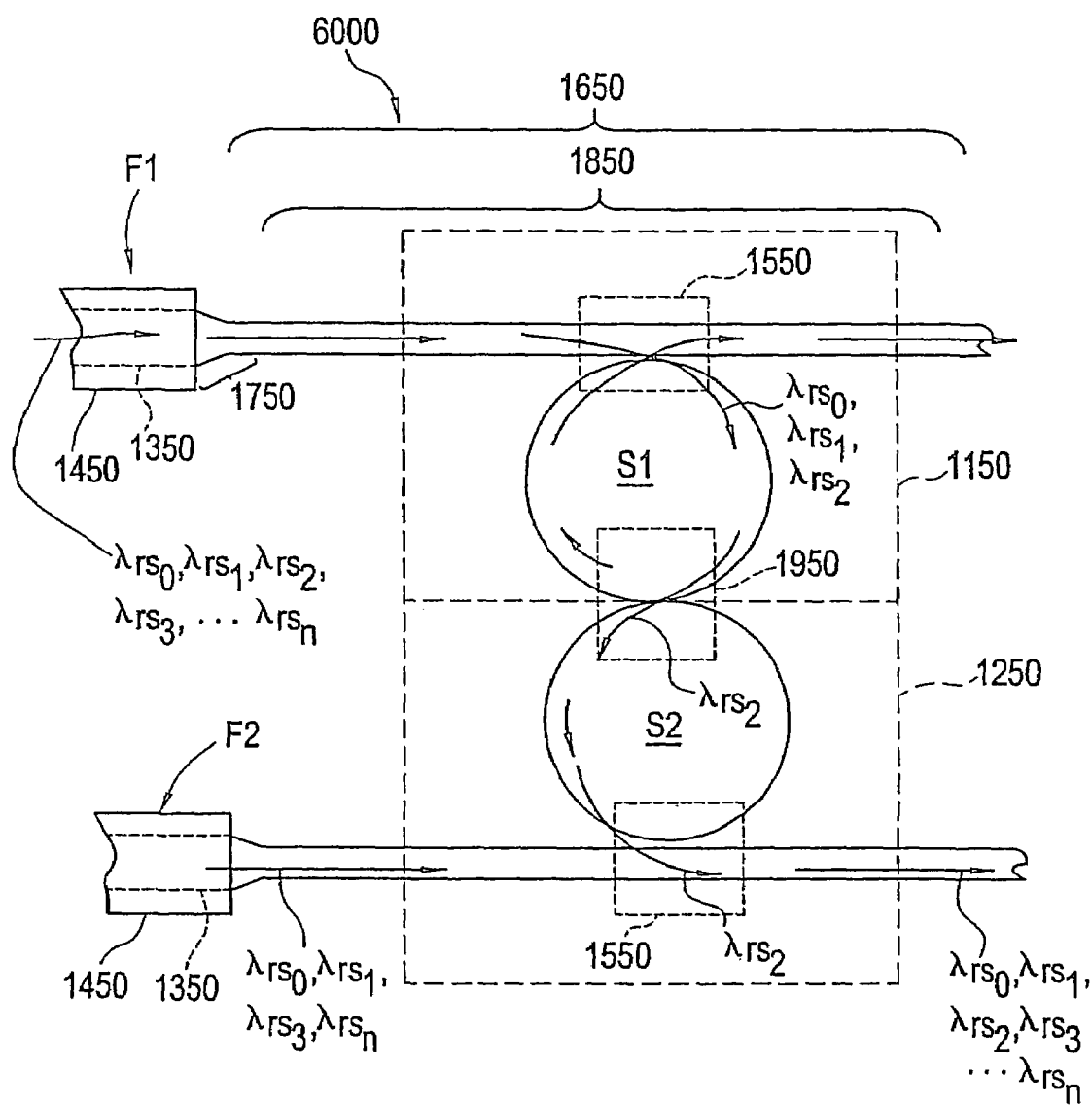
FIG. 14 illustrates a component view of an optical filter according to another invention.

In another invention with respect to optical filters, an always "on" optical filter 6000 is shown in FIG. 14. A pair of subfilters, the first of which is the gate keeper 1150 and the second of which is the isolator 1250, are connected and fixed between an input waveguide W1 and an output waveguide W2.

The gate keeper subfilter contains the isolator dielectric microsphere "S1" and the isolator subfilter contains the gate keeper microsphere "S2". Each microsphere S1 and S2 is fixed at a region proximate to either the input or output waveguide.

Each dielectric microsphere resonates in WGM for a group of resonate signals "RS" ($\lambda rs_0$, $\lambda rs_1$, $\lambda rs_2$) which can be obtained from the second equation ($d_e/q=RS$). The input and output waveguides W1 and W2 for the optical filter of this embodiment are each constructed from an input optical fiber "F1" and output optical fiber "F2". Each optical fiber F1 and F2 has a core 1350 through which signals travel which is surrounded by a layer of cladding 1450. The cladding 1450 has an index of refraction sufficiently distinct from the index of refraction of the core 1350 to establish a condition of total internal reflection at the core-cladding interface. The core 1350 is normally constructed of a high index of refraction material such as silicon (Si index 3.5) and the cladding 1450 of a low index of refraction material such as silicon oxide ($SiO_2$ index 1.5). Other high index of refraction materials such as Ge, GaAs, InP, GaAlA, among others form the core. The suitable materials are limited only to those which display a longitudinal signal propagation and may include waveguides constructed out of semi-conductor material, or photonic band gap materials.

A resonate structure-waveguide interface is formed 1550 an area of thinned or stripped cladding of the optical fiber which forms a region of reduced cladding 1650 where a microsphere "S1" or "S2" is fixed proximate to an optical fiber. Each microsphere S1 and S2 resonates in WGM for a group of resonate signals "RS" ($\lambda rs_0, \lambda rs_1, \lambda rs_2$) which can be obtained from the second equation ($d_e/q=RS$). Proximate placement of the gatekeeper microspheres S1 to the input optical fiber F1 and the isolator microsphere S2 places the gatekeeper microsphere S1 in a position to couple a light signal from the input optical fiber F1 to the isolator microsphere S2.

In this embodiment the input and output optical fibers F1 and F2 are shown tapered. The taper is achieved when the core 1350 of an optical fiber is reduced 1750 down to a tapered core 1850. It is known that that a reduction of the core 1350 into a tapered core 1850, with a smaller diameter or waist, can establish a condition wherein the evanescent wave the light signal forms while traveling along the optical fiber can have an extended evanescent tail into the free space surrounding the tapered core 1850. The signal amplitude of the evanescent wave available for coupling from the input optical fiber F1 decreases generally exponentially from the distance from the optical fiber the microsphere is fixed to the input optical fiber F1 from which it receives the evanescent tail.

Although tapered optical fibers are illustrated and preferred, tapering of the fiber is not a limitation and non-tapered optical fibers or other waveguides may be substituted for the tapered optical fibers. In some cases, depending on the desired signal amplitude for the RS which continues down the input optical fiber F1 downstream from the optical filter 6000 the amount of taper may be varied to support a specific downstream RS amplitude.

Each optical fiber F1 and F2 supports signal propagation of a group of signals $\lambda rs_0, \lambda rs_1, \lambda rs_2 \ldots \lambda rs_n$ which provide the corresponding evanescent wave (and tail of each evanescent wave) extending into the space along the region of reduced cladding 1650.

In the optical filter 6000 the signal passes from the gate keeper subfilter 1150 directly to the isolator subfilter 1250. Hence the gate keeper subfilter 1150 and the isolator subfilter 1250, which are fixed at a region proximate to each other, are directly coupled at a direct subfilter interface 1950 at that proximate region. The microsphere S1 within the gate keeper subfilter 1150 will resonate in WGM for a group of RS ($\lambda rs_0, \lambda rs_1, \lambda rs_2$) while the microsphere S2 within the isolator subfilter 1250 will resonate in WGM for a group of RS ($\lambda rs_2, \lambda rs_7, \lambda rs_9$). Accordingly, because the gate keeper subfilter 1150 and the isolator subfilter 1250 have only a single RS in common ($\lambda rs_2$), the throughput from input optical fiber F1 to output optical fiber F2 is only the single specific light signal ($\lambda rs_2$). Additionally, the single RS ($\lambda rs_2$) in common could be coupled to a secondary structure such as an additional subfilter or other structure which can receive and process an optical signal.

Such an optical filter 6000 may also act as an add switch. Specifically, in the embodiment shown in FIG. 14 the common RS "$\lambda rs_2$" is absent in the output optical fiber F2 upstream from the isolator subfilter 1250. Downstream from the isolator subfilter 1250 the absent RS ($\lambda rs_2$), is within the output optical fiber F2.

The selected microspheres S1 and S2 should have a minimum "Q" (quality factor) which is being a measure of the full width at ½ the maximum spectral frequency for a given signal, adequate to discern the separate channels as spaced in the telecommunications band supplying the signal to be switched. Examples of commonly referenced channel spacing structures found in a TDM, WDM and DWDM are as great as several hundred GHz or as narrow as 12.5 GHz. For 100 GHz spacing the minimum Q needed to maintain channel separation is about 2000. For 50 GHz spacing the minimum Q is about 4000 and for 12.5 GHz channel spacing the minimum Q is about 16,000.

To achieve a Q close to the limit of the material, resonate structure (in this example, a microsphere) losses due to $Q^{-1}_{rad}$ and $Q^{-1}_{ss}$ are minimized by using microspheres with a large diameter, preferably greater than 100 microns, to minimize those losses. Unfortunately, achievement of a high Q by virtue of using microspheres with an adequate diameter to minimize the losses due to $Q^{-1}_{rad}$ and $Q^{-1}_{ss}$ has a drawback—a large diameter microsphere will lead to the possibility that multiple RS can pass through the gate keeper 5150. This drawback is, however, of no consequence when the isolator 5250 is selected to have but one RS in common with the gate keeper.

However, the 100 micron diameter is not a limitation. The actual diameter of a given microsphere should be in part, dependent on the channel spacing, and other variables of the system the filter is operating in. Silica Microsphere's in the 20-400 diameter size range are available from Duke Scientific Corporation of Palo Alto, Calif.

Figure 15:
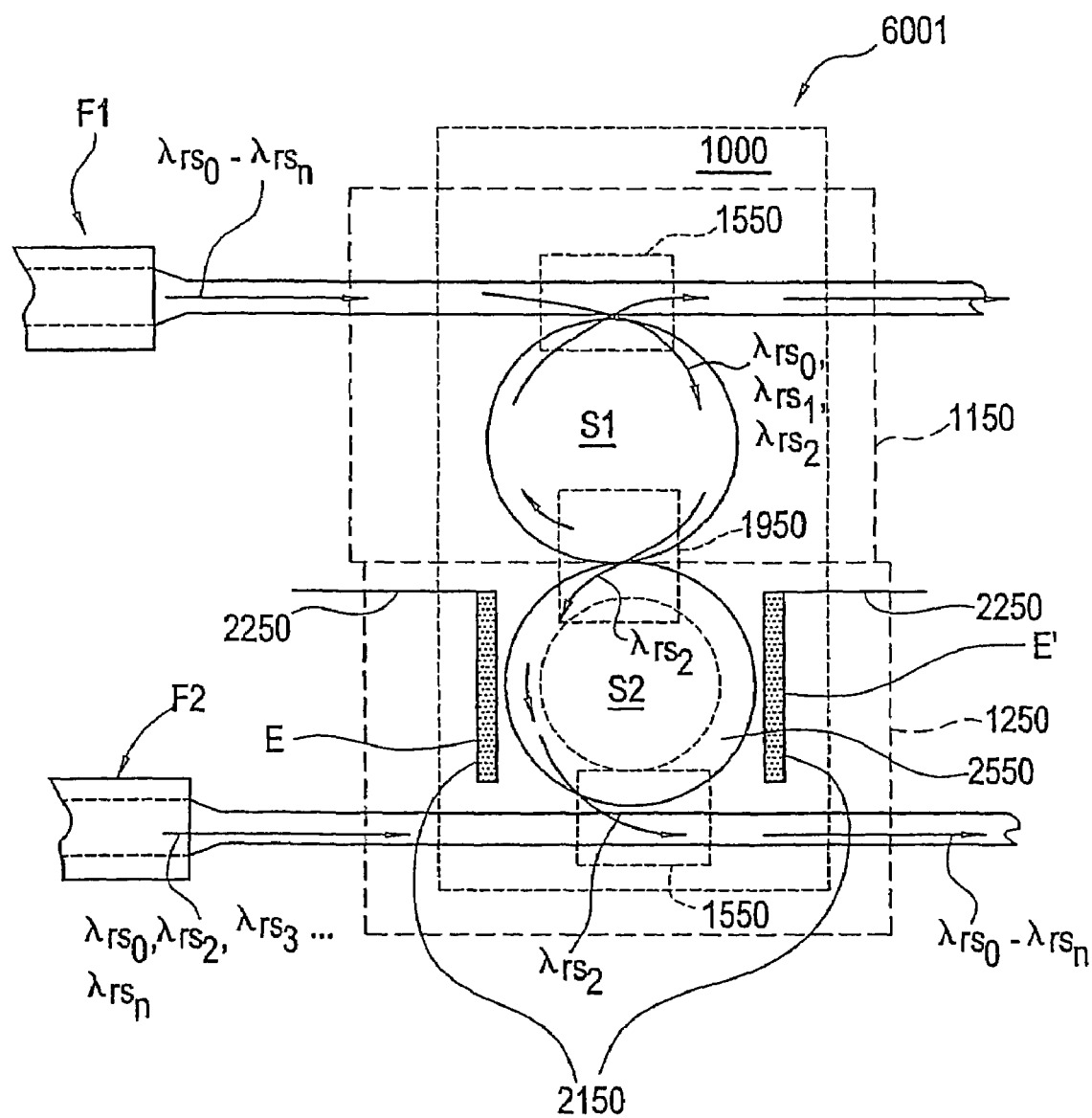
FIG. 15 illustrates a component view of an electronically gated optical filter.
Figure 16:
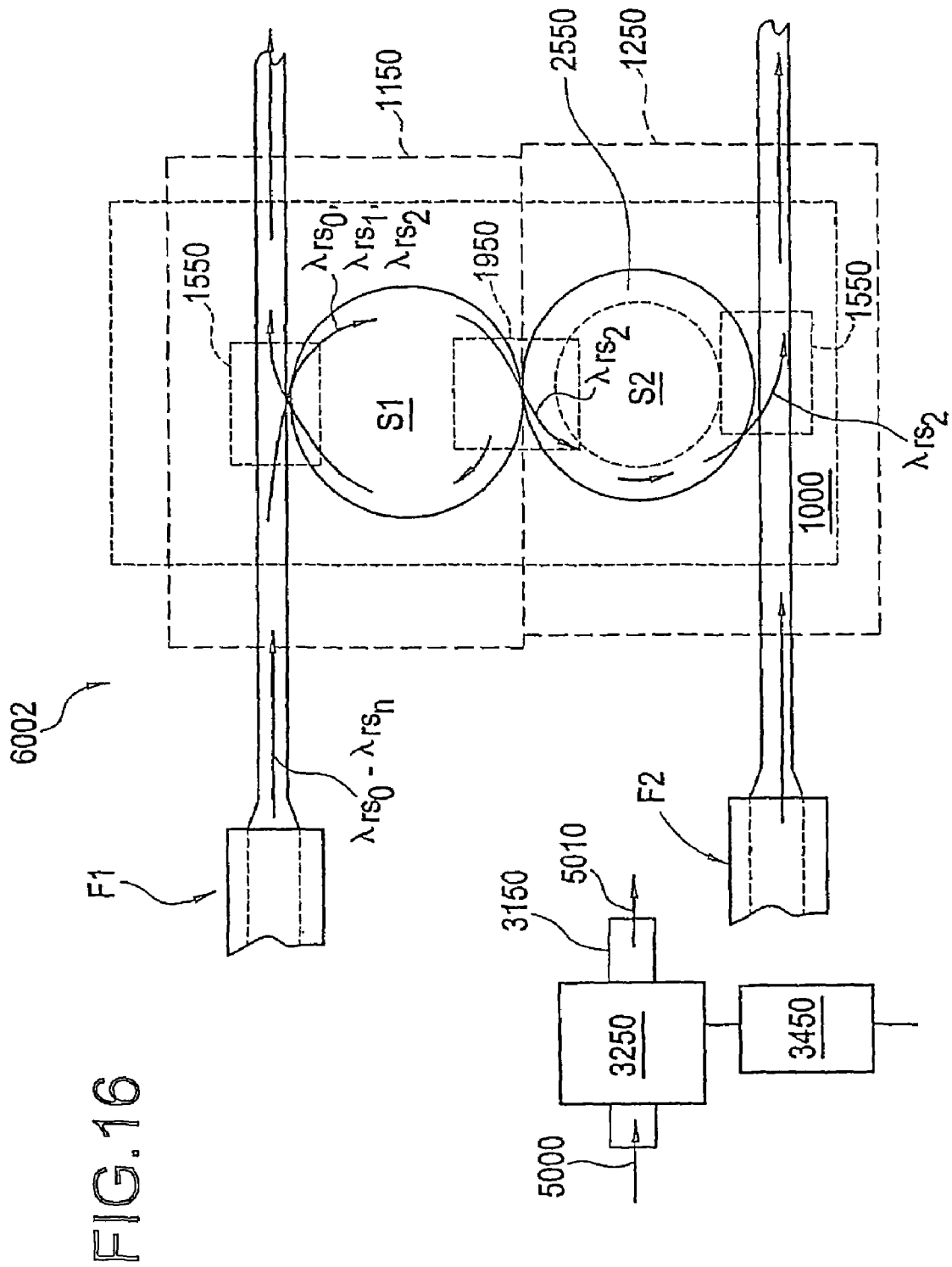
FIG. 16 illustrates a component view an optically gated optical filter.
Figure 17:
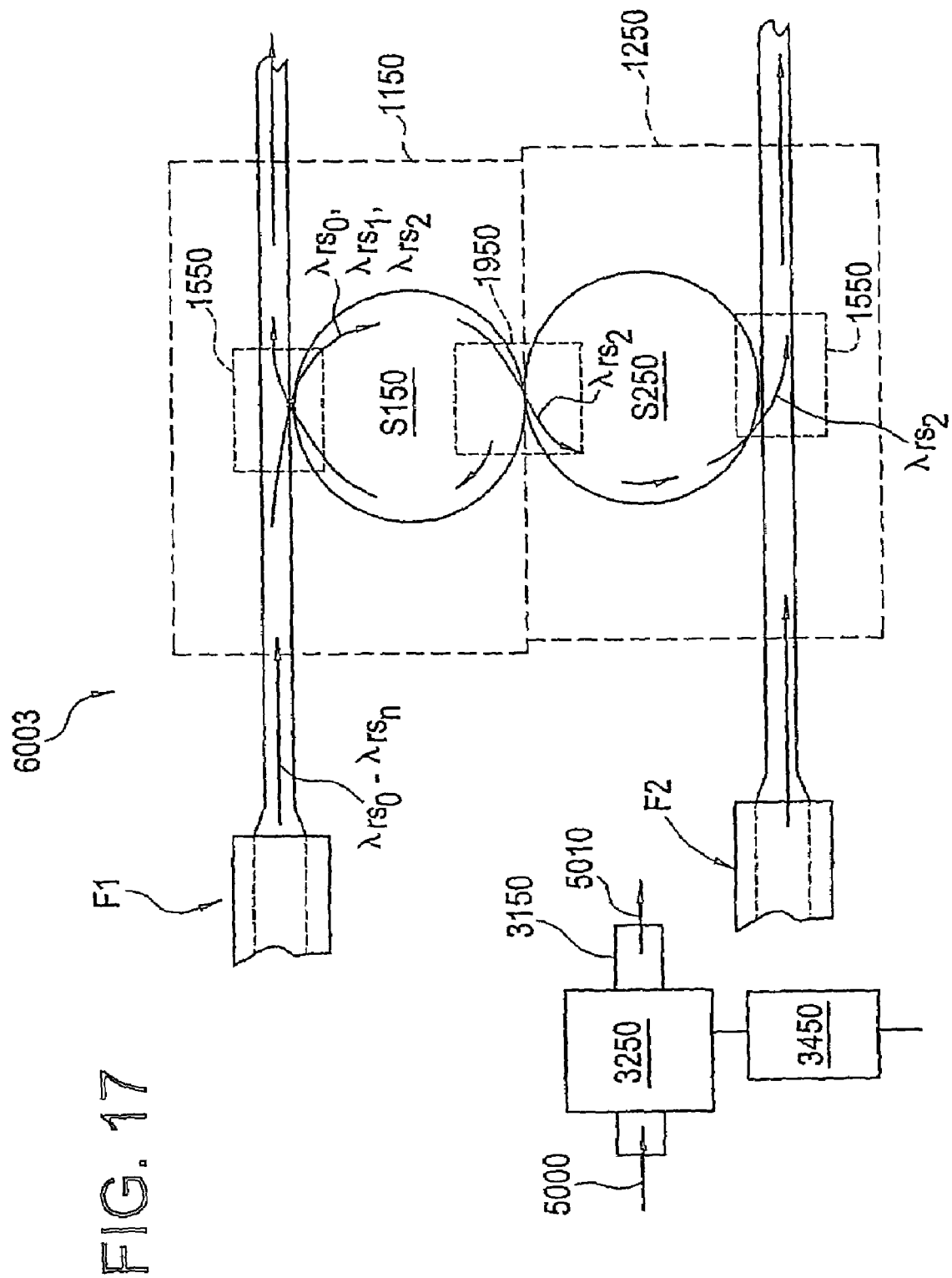
FIG. 17 illustrates a component view of a signal loss switched optical filter.

The "on/off" switched optical filter 6001 shown in FIG. 15 is constructed of the optical filter 6000 of FIG. 14 with at least the isolator 1250 subfilter being electronically controlled 2150.

The electronic gate is formed by placing an electrode pair E & E' conductively linked to a controller (not shown) by conductive leads 2250 on opposing surfaces of the microsphere S2 within the isolator subfilter 1250. The electronic gate provides the "on/off" function by one of two WGM controls.

The electronic control mechanism, for either the first or second WGM control, is the polarization of the microsphere S. Polarization of the microsphere S can be achieved by a linear electro optic effect. Passing electrical power (a voltage or current) across an electrode pair E & E' on opposing surfaces of the microsphere and conductively linked to a controller (not shown) by conductive leads 2250 may be used to produce such a linear electro optic effect. The linear electro optic effect will polarize the substrate of the microsphere by altering its dielectric constant "$\epsilon_{rs}^{(microsphere)}$". The $\epsilon_{rs}^{(microsphere)}$ has a "real" portion "$\epsilon_1$" and an imaginary portion "$i\epsilon_2$", and is the sum of both portions as shown in the third equation: $\epsilon_{rs} = (\epsilon_1 + i\epsilon_2)$.

When $i\epsilon_2$ remains a constant, the index of refraction of the microsphere (resonate structure) $n_{rs}^{(microsphere)}$ is known to be generally proportional to the square root of the "real" portion of the dielectric constant for the microsphere $\sqrt{\epsilon_1}$. Accordingly, $n_{rs}^{(microsphere)}$ can be altered through the controlled change of $\epsilon_1$ by the linear electro optic effect. The ability to adjust the $n_{rs}^{(microsphere)}$ provides the two related, but different, WGM control cases.

The first WGM control can switch "on/off" the filter based on adjustment of the index of refraction of a microsphere "$n_{rs}^{(microsphere)}$" to establish conditions which either support or do not support WGM resonance by the microsphere "S2" for the specific RS which the filter selects. Although FIG. 15 shows the first WGM control applied to the microsphere S2 in the isolator subfilter 1250, that illustration is not a limitation and the WGM control can be applied to the microsphere within either subfilter.

The mechanism of WGM resonance in a microsphere for a specific group of RS is describe by the first and second equations. From the first equation it is known that when "d" remains fixed and the $n_{rs}^{(microsphere)}$ changes, the $d_e$ will change and from the second equation it is known that the RS are a function of $d_e/q$, and if $d_e$ changes (in response to the change in $n_{rs}^{(microsphere)}$, a corresponding change in the RS will occur. Therefore, adjusting the $n_{rs}^{(microsphere)}$ can be used to establish conditions to either select an $n_{rs}^{(microsphere)}$ which supports or does not support WGM resonance for a specific RS.

A default "on" filter of the first WGM control occurs when the $n_{rs}^{(microsphere)}$ supports WGM for a specific RS within the input waveguide F1 for which switching is desired. In such a default "on" optical switch, the "off" function is the adjustment of the $n_{rs}^{(microsphere)}$ to no longer support WGM resonance for the specific RS. It is also possible to use this adjustment in the $n_{rs}^{(microsphere)}$ to tune a microsphere and select from a range of different specific RS for switching. In the simplest case, the adjustment of the $n_{rs}^{(microsphere)}$ tunes the default "on" optical switch away from WGM resonance for the desired RS. While such tuning can be used to select for other RS to switch, in this simplest case, to prevent unintended switching of other signals, the tuning is preferably to RS outside the telecommunications band.

Conversely, a default "off" filter of the first WGM control occurs when the $n_{rs}^{(microsphere)}$ does not support WGM resonance for a specific RS. In such a default "off" optical switch, WGM resonance for the specific RS may be achieved by adjusting the $n_{rs}^{(microsphere)}$ to tune the microsphere to support WGM for the specific RS.

In either a default "on" or a default "off" filter the adjustment to the $n_{rs}^{(microsphere)}$ may be through polarization or through an interruption in polarization.

The "on/off" switching through the second WGM control results from either disrupting or establishing coupling conditions at either the region of the resonate structure waveguide interface 1550 between the microsphere S2 and the input optical fiber F1 or at the region of the direct subfilter interface 1950. Polarization of the microsphere S2 is used to adjust the $n_{rs}^{(microsphere)}$ relative to the index of refraction of a medium 100 "$n_{medium}$" surrounding the microsphere S2. The medium should be non-conductive.

When the $n_{rs}^{(microsphere)}$ substantially equals the $n_{medium}$ at a region of a resonate structure-waveguide interface 1550 or at the region of the direct subfilter interface 1950, the microsphere S2 is effectively medium and transparent to all signals. When the $n_{rs}^{(microsphere)}$ does not substantially equal the $n_{medium}$ at the resonate structure-waveguide and direct subfilter interfaces 1550 and 1950, the microsphere S2 is distinct from the medium and coupling can occur.

The second WGM control may also be used to establish an "on" or "off" default state. A default "on" filter is achieved when the $n_{rs}^{(isolator)}$ is substantially dissimilar to the $n_{medium}$ at the regions of the resonate structure-waveguide interface 15 and at the region of direct subfilter interface 1950. The $n^{rs(isolator)}$ can be adjusted through the application of an electro optic effect via an electrode pair E & E', (described in reference to the first WGM control case), to switch off the subfilter by adjusting the $n_{rs}^{(isolator)}$ to become substantially equal to the $n_{medium}$ at one of the regions of resonate structure-waveguide interfaces 1550 or at the region of direct subfilter interface 1950.

Conversely a default "off" condition is achieved when the $n_{rs}^{(isolator)}$ substantially equals the $n_{medium}$, at a region of resonate structure-waveguide interface 1550 or at a region of direct subfilter interface 1950.

The microsphere S2 within the filter 6001 may also be coated with an optically active material 2550 such as molecules of liquid crystal, organic photorefractive polymers, GaAs, Nitrabenzene and $LiNbO_3$. in which case the voltage or current passed between the electrode pair 2250 and across the microsphere S2 is used to polarize the coating material 2550 and it is the change in the dielectric constant of the coating $\epsilon_1^{(coated\ microsphere)}$ which is the adjustment of the index of refraction "$n_{rs}^{(coated\ microsphere)}$" for purposes of applying a WGM control.

The illustration of the electronic gate 2150 being applied to the isolator subfilter is not a limitation. A switched "on/off" filter may also be achieved by applying the electronic gate to either or both of the subfilters 1150 and 1250.

Shown in FIG. 16 is an embodiment of an "on/off" switched optical filter 6002 with an optical control. The optical gate is formed by directing an intense beam of light to polarize one of the microspheres S1 and S2 within one of the subfilters 1150 and 1250.

An intense beam of light, which can be pulsed on or off in "optical real time", can be a laser beam 5000 passed through an illuminating fiber 3150 into a Mach-Zender interferometer 3250 to produce a modified laser beam 5010 exiting the Mach-Zender interferometer 3250. The modified laser beam 5010 is either intensified by the Mach-Zender interferometer 3250, through constructive interference or weakened through destructive interference. The Mach-Zender interferometer 3250 operates in the picoseconds range and the modified laser beam 5010 directed at the microsphere S2 can occur or terminate in a similar time interval. A computer 3450 is used to control the Mach-Zender interferometer 3250. The modified laser beam 5010 polarizes the microsphere S2 by effecting the "real" portion "$\epsilon_1$" of its dielectric constant "$\epsilon^{(microsphere)}$". Accordingly, when the "imaginary" portion "$i\epsilon_2$" of $\epsilon^{(microsphere)}$ remains constant, the $n_{rs}^{(microsphere)}$ which as previously noted is generally proportional to $\sqrt{\epsilon_1}$, can be adjusted through a controlled change of $\epsilon_1$ by the optical effect.

As discussed in detail with respect to the electronically gated optical switch shown in FIG. 15, the alteration of the $n^{rs(microsphere)}$ can be used to apply one of the two WGM controls. A WGM control can be applied to one or both subfilters 1150 and 1250 via an optical effect to switch "on/off" the filter 6002. When applying the second WGM, the microsphere S2 is placed in a medium 1000.

The microsphere S2 within the optically controlled filter 6002 may also be coated with an optically active material 2550 in which case the optical effect is used to adjust the $n^{rs(coated\ microsphere)}$ as described in reference to FIG. 15. Adjusting the $n_{rs}^{(coated\ microsphere)}$ can therefore be used to apply a WGM control.

A signal loss filter 6003 which can be switched "on/off" with an intense beam of light, such as that produced by the Mach-Zender interferometer 3250 is shown in FIG. 17. The intense beam of light is used to trigger the signal absorbing action of a signal absorbing material (such as photochromic bisthienylethene) 3850 within the microsphere S2. Signal loss can be selectively applied by directing a modified laser beam 5010 exiting the illuminating fiber 3150 of the Mach-Zender interferometer 3250 at the microsphere, which triggers the action of the signal absorbing material 3850 through an adjustment of the "imaginary" portion of the dielectric constant (i$\epsilon_2$) of the microsphere S2.

Those skilled in the art will recognize that photochromic bisthienylethene is but one member of a broader group of photochromic materials which may be combined into the substrate of the microsphere to act as the light absorbing material. Moreover, other materials which have light absorbing properties and can be triggered by a specific quality or quantity of light outside the optical band may be used as the light absorbing material. Other material which can be selectively activated with the appropriate trigger which may include a beam of light, or electrical energy applied to the microsphere which in turn will pump the signal absorbing material to a higher energy state to provide for its signal absorbing activity include, but are not limited to, semi conductor nanoclusters, electrochromic nanocrystals, quantum dots, doped semi-conductor nanoclusters, semi conductors, PDLC, dihydroindolizines, diarylimylenes, ScGe, bis-Mienylperfluorocyclopentenes, spiropyrens, fulgides, and dyes.

Figure 18:
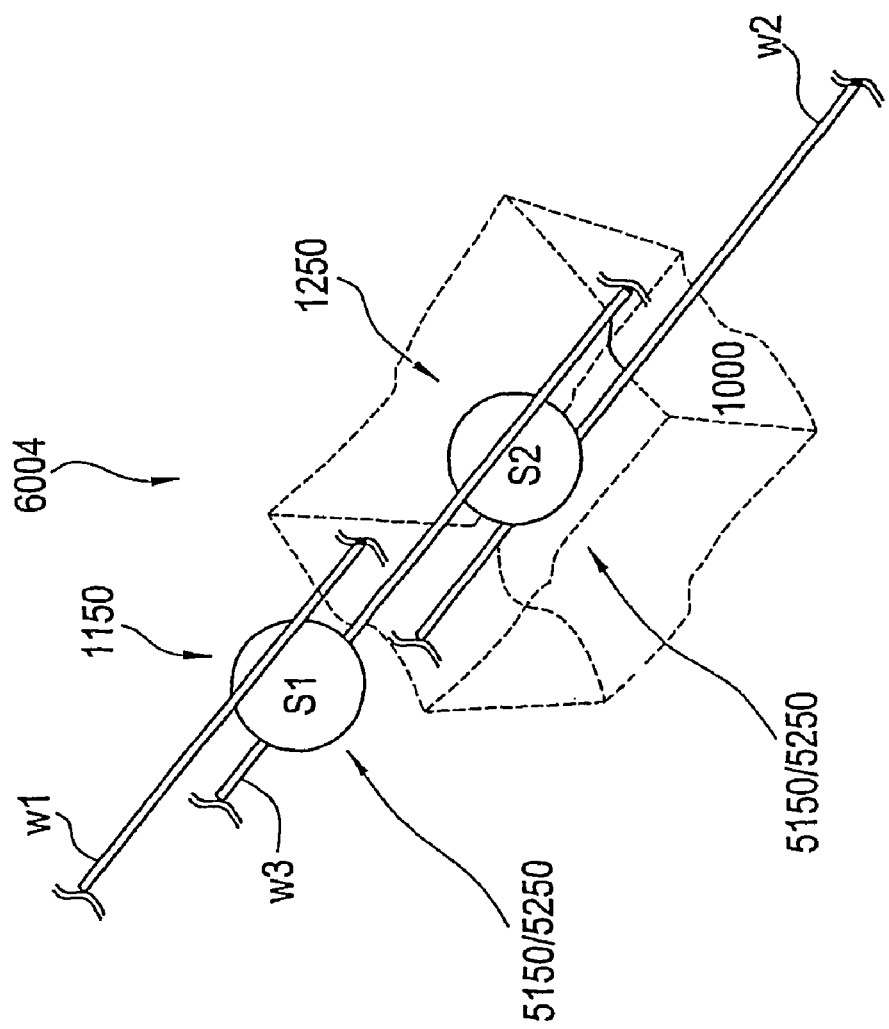
FIG. 18 illustrates a component view of an optical filter with an intermediary optical fiber.

An optical filter 6004 with indirectly coupled subfilters 1150 and 1250 separated by, and fixed proximate to, an intermediary waveguide W3 is shown in FIG. 18. The microsphere S1 within the gate keeper subfilter 1150 is fixed to the intermediary waveguide W3 upstream from the microsphere S2 within the isolator 1250 subfilter. Accordingly, signal coupled from the gate keeper subfilter 1150 to the intermediary waveguide W3 travels to the isolator subfilter 1250.

The input, output and intermediary waveguides W1, W2 and W3 may be constructed from optical fibers. To provide greater amplitude of signal for coupling, the optical fibers may also be tapered. Although tapered fibers are illustrated in FIGS. 14-17, the use of tapered optical fibers is not a limitation and non-tapered optical fibers or other waveguides, including but not limited to semi-conductor waveguides formed from of semi-conductor material and constructed by lithographic methods used in the construction of semi-conductor waveguides, may be substituted for the tapered optical fibers.

In some instances the intermediary waveguide W3 may by constructed of an optical fiber in an end-to-end placement between the microspheres S1 and S2. One or both of the ends of an intermediary optical fiber in an end-to-end placement may be angled. The ends of the optical fiber in an end-to-end placement should be finished to support total internal reflection through which signal can couple to the subfilters.

As described in reference to FIGS. 14-17, the subfilters 1150 and 1250 each contain a microsphere S1 and S2 which resonates in WGM for a specific group of RS. The signal specific optical filter 50 is achieved by selecting a gate keeper subfilter 1150 and an isolator subfilter 1250 with only one RS in common ($\lambda rs_2$) within the channels of the optical telecommunication band supplying the input signals $\lambda rs_0$, $\lambda rs_1$, $\lambda rs_2$, $\lambda rs_3$, ... $\lambda rs_n$.

In practice, the optical filter 6004 may be always "on" or switched "on/off" by the application of the previously discussed WGM controls or by signal loss.

To form a switched "on/off" optical filter utilizing a WGM control, a polarizing energy 5150 is applied to one of the microspheres S1 and S2 within the gatekeeper or isolator subfilter 1150 and 1250. The polarizing energy 5150 may come from the application of an electronic gate (described in reference to FIG. 15) or an optical gate (described in reference to FIG. 16).

As previously discussed the index of refraction of the microsphere "$n_{rs}^{(microsphere)}$" is known to be proportional to the square root of the "real" portion of its dielectric constant $\sqrt{\epsilon_1}$. Therefore, by applying an optical or electro optic effect to a microsphere, the $n_{rs}^{(microsphere)}$ can be adjusted to provide for the two WGM controls.

The first WGM control can switch "on/off" the filter based on adjustment of the index of refraction of a microsphere "$n_{rs}^{(microsphere)}$" to establish conditions which either support or do not support WGM resonance by the microsphere for the specific RS which the filter selects for.

The second WGM control can switch "on/off" the filter based on either disrupting or establishing coupling conditions between a microsphere and a waveguide. Polarization of the microsphere is used to adjust the $n_{rs}^{(microsphere)}$ relative to the index of refraction of a medium 1000 "$n_{medium}$" surrounding the microsphere. When the $n_{rs}^{(microsphere)}$ substantially equals $n_{medium}$ at a coupling region (described in reference to FIG. 15 as a resonate structure-waveguide interface), the microsphere blends into the medium and is transparent to all signals. When the $n_{rs}^{(microsphere)}$ does not substantially equal the $n_{medium}$ the microsphere is distinct from the medium and coupling can occur.

In the case of a signal loss "on/off" filter the signal absorbing action of a signal absorbing material within a microsphere is triggered by application of a trigger energy 5250, such as an intense beam of light, through the previously described adjustment of the "imaginary" portion of the dielectric constant (i$\epsilon_2$) of the microsphere.

Figure 19:
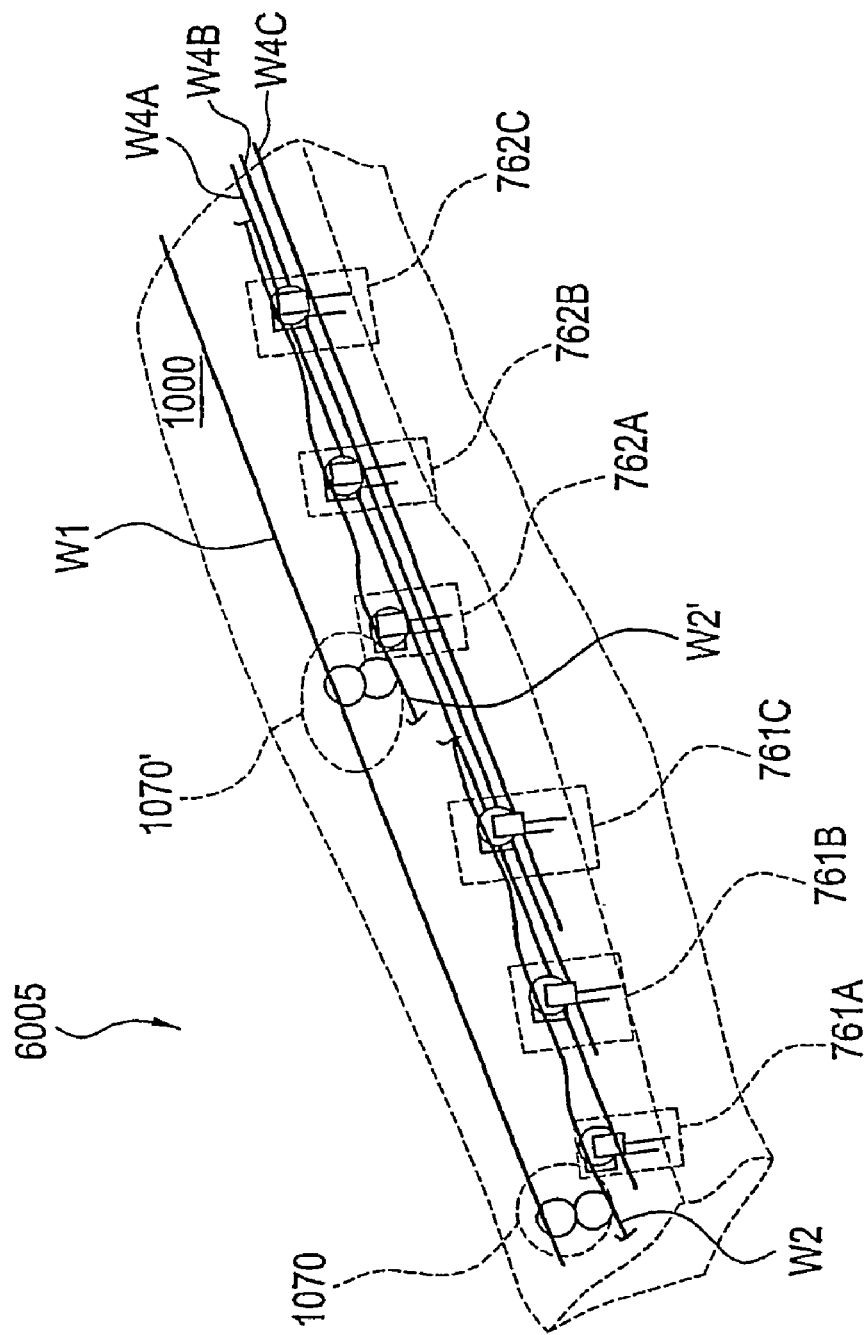
FIG. 19 illustrates a component view of a system of filters used to demultiplex.

A system comprised of a group of optical filters which optically cross connect waveguides and demultiplex (DEMUX) optical signals is shown in FIG. 19. The DEMUX system 6005 is constructed of "n" optical filters 1070 and 1070' fixed at a region proximate to an input waveguide W1 through which optical signals of different wavelengths ($\lambda rs_0$, $\lambda rs_1$, $\lambda rs_2$, $\lambda rs_3$ ... $\lambda rs_n$), within "n" channels are supplied. Each optical filter 1070 and 1070' is also fixed at a region proximate to one of "n" output waveguides W2 and W2'. The most basic DEMUX system optically cross connects a signal between the single input waveguide and the "n" output waveguides W2 and W2'. The optical filters 1070 and 1070' shown in this embodiment are always "on" as described in detail in reference to FIG. 14.

Although directly coupled optical filters such as those described in reference to FIGS. 14-17 are shown, that illustration is not a limitation and the indirectly coupled optical filters 6004 described in reference to FIG. 18 may be substituted for the directly coupled optical filters.

To DEMUX the signals in the "n" channels from the single input waveguide W1 to "m" tertiary waveguides W4A, W4B, or W4C, optical switches 761A, 761B, 761C, 762A, 762B and 762C are placed at the intersections of the output waveguide W2, W2', W2" and the tertiary waveguides W4A, W4B, W4C or W4D. Optical switches 761A, 761B, 761C, 762A, 762B and 762C are preferred to avoid any optical electro optical conversion. Such optical switches may be resonate structures including the group consisting of stadiums, rings, hoops, oblate and prolate spheroids, discs and microspheres plus resonate cavities. However, depending on the performance parameters of the DEMUX system 6005, non-optical switches may be used. The preferred optical switches 761A, 761B, 761C, 762A, 762B and 762C need not have the high "Q" needed to DEMUX closely spaced channels by the group of optical filters 1070 and 1070' because only a single RS is coupled from an optical filter 1070 and 1070' to the appropriate output waveguides W2 and W2'. Accordingly, the plurality of switches 761A, 761B, 761C, 762A, 72B and 762C need not discriminate closely spaced signals.

The microsphere within each of the optical switches 761A, 761B, 761C, 762A, 762B and 62C shown in FIG. 19 are electronically controlled as described in reference to FIG. 15. The illustration of an electronically controlled optical switch is not a limitation. One or more of the optical switches may also be optically controlled as described in reference to FIG. 16 and/or switched "on/off" by signal loss as described in reference to the optical filter shown in FIG. 17. Any of the optical switches 761A, 761B, 761C, 762A, 762B and 762C to which application of the second WGM control is desired should be placed in a medium 1000. Moreover, some of the switches may be always "on", while others are switched "on/off".

A multiplexing (MUX) system results from reversing the direction of signal so that each tertiary waveguides become signal input for one channel and the input waveguide becomes the output waveguide.

Figure 20:
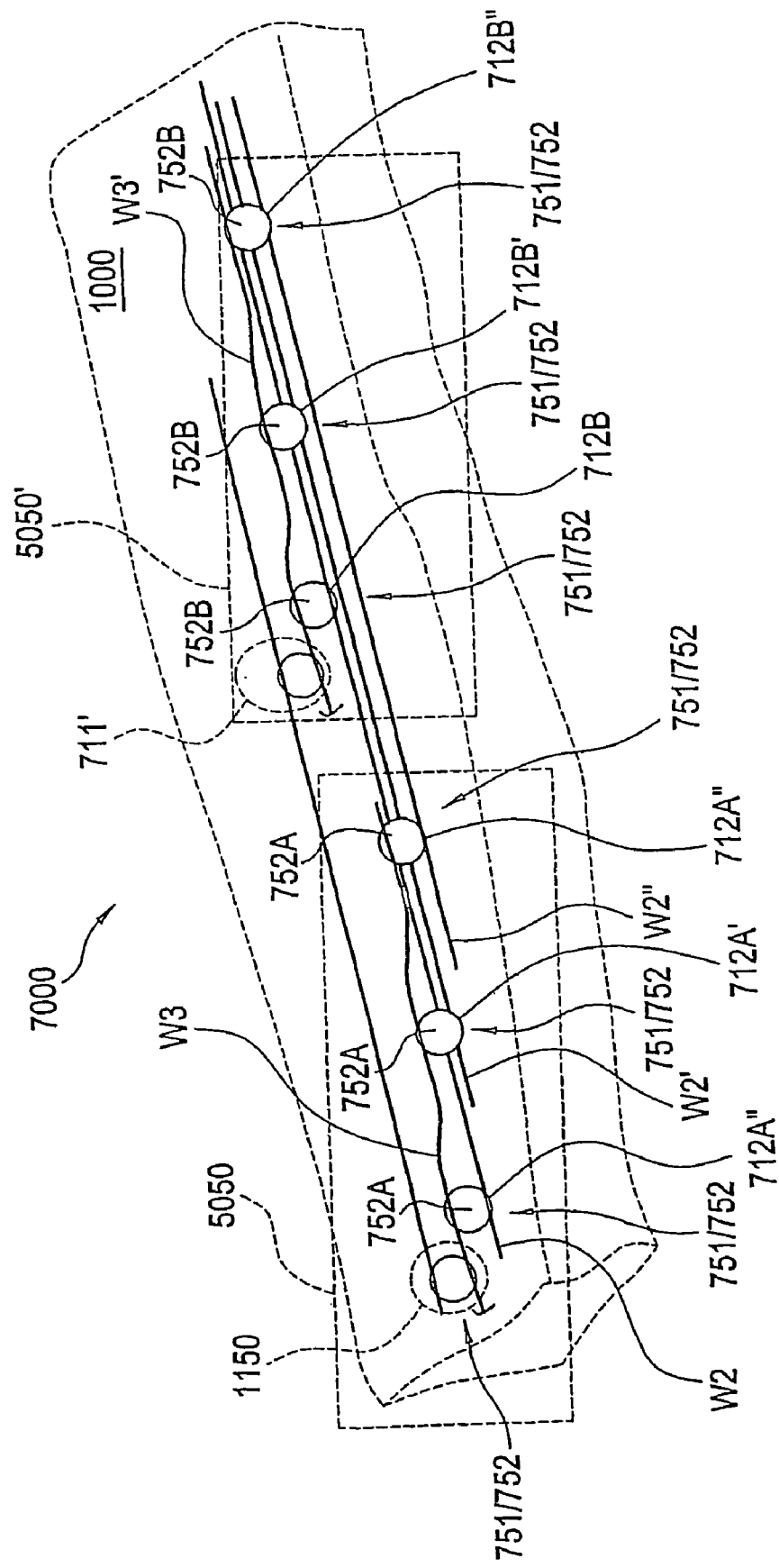
FIG. 20 illustrates a component view of an alternate embodiment of filters used to demultiplex.

Shown in FIG. 20 is a group of "n" optical filters 5050 and 5050' combined to demultiplex (DEMUX). The optical signals from "n" channels into "m" output waveguides W2, W2' and W2". Each optical filter in the DEMUX system 7000 is constructed of a single gate keeper subfilter 711, 711' and 711", which resonates in WGM for a specific group of RS, and is fixed proximate to an input waveguide W1 and an intermediary waveguide W3, W3' and W3".

Fixed proximate to each intermediary waveguide W3 and W3' and downstream from each gate keeper subfilter, are "n" groups of "m" redundant isolator subfilters 712A-A" and 712B-B". Each group of each of "m" redundant isolator subfilters 712A-A" and 712B-B" contains a microsphere S2A and S2B which resonates in WGM for the same specific group of RS, one of which is also an RS of the corresponding gate keeper subfilter 711 or 711'. The signal passes from a gate keeper subfilter 711 or 711' to the appropriate intermediary waveguide W3, W3' or W3" and can couple with the one or more of the microspheres S2A or S2B within the corresponding group of redundant isolator subfilters 712A-A" or 712B-B".

As described in reference to FIG. 18 a polarizing energy 5150 or a trigger energy 5250 may be applied to a subfilter to switch it "on/off" either through one of the WGM controls or through signal loss. If the second WGM control is to be applied, a medium 1000 with a known index of refraction should surround the affected subfilter.

Figure 21:
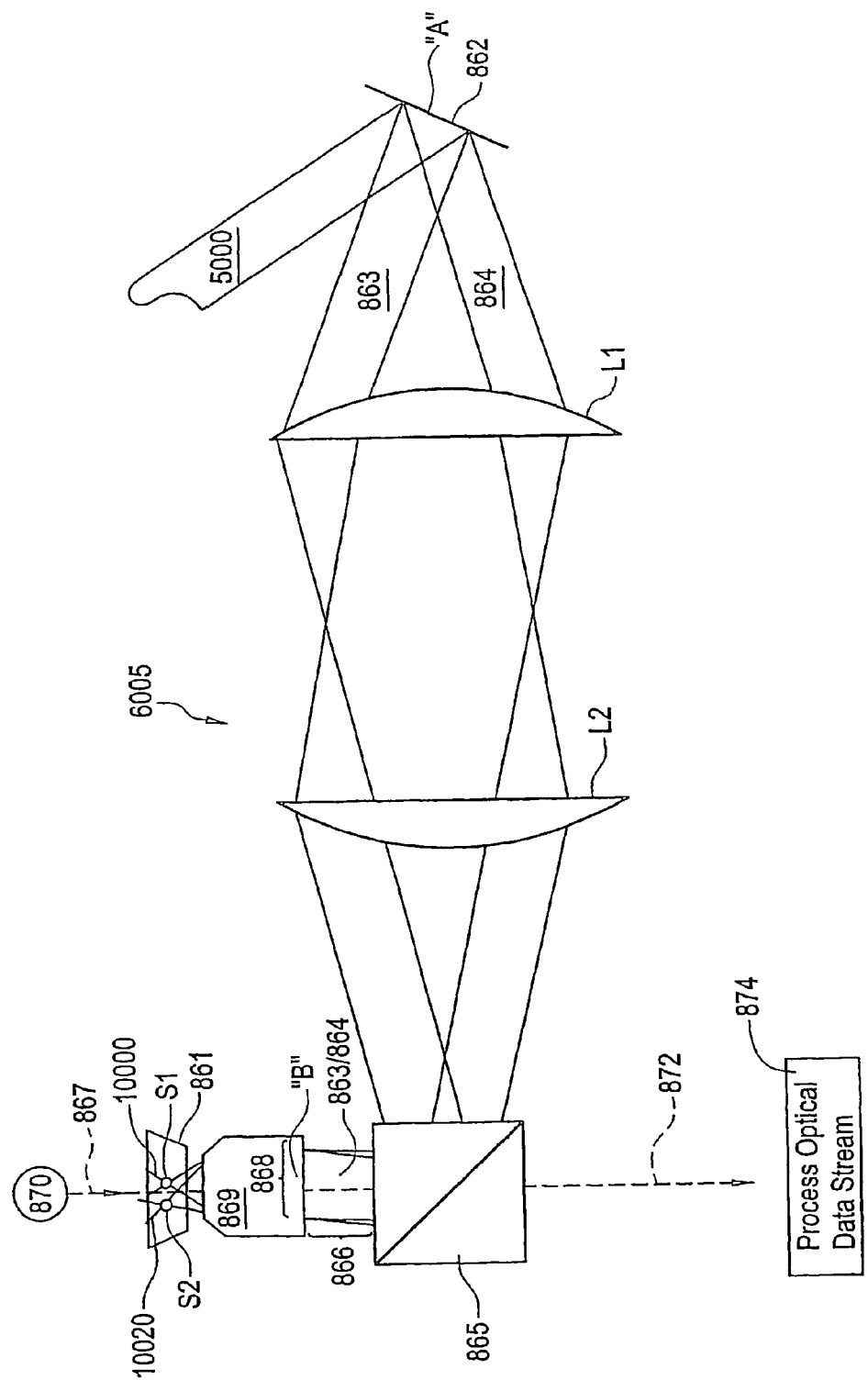
FIG. 21 illustrates an optical trapping system to manipulate optical switch components.

Illustrated in FIG. 21 is an overview of a system and method, generally designated 6006 to construct an optical switch, or a group of optical filters such as those described in reference to FIG. 18, by using one or more optical traps to place and/or hold the WGM microspheres.

To fabricate an optical filter, movable optical traps 1000 & 1001 are generated within an assembly vessel 61. The assembly vessel should be constructed of a material which is at least partially transparent, and which allows the light used to form optical traps to pass through in the desired location.

The optical traps 10000 & 10020 are used to manipulate small microspheres S1 & S2 and position them to construct an optical filter. Optical traps 10000 & 10020 can be formed by passing a collimated light, preferably a laser beam 5000, to a phase patterning optical element 862 which generates beamlets 863 & 864. Each beamlet 863 & 864 created by the phase patterning optical element 862 then passes through transfer optics L1 & L2 onward to a beam splitter 865.

The beam splitter 865 provides two streams of light 866 & 867 oriented in different directions. The first light streams 866 originates from the phase patterning optical element 862 as beamlets 863 & 864 which are redirected by the beam splitter 865 through area "B" at the back aperture 868 of a focusing lens 869 thereby overlapping the beamlets 863 & 864 at the back aperture 868 of the focusing lens. In those embodiments in which the intensity of the beamlets 863 & 864 is less intense at the periphery and more intense at regions inward from the periphery, overfilling the back aperture 868 by less than about 15 percent is useful to form optical traps with greater intensity at the periphery of the optical traps than without overfilling the back aperture 868.

The beamlets 863 & 864 are converged as they pass through the focusing lens 869 to form the optical traps 10000 & 10020 by producing the gradient conditions necessary to contain and manipulate the microspheres S1 & S2 in three dimensions. Only two sets of microspheres, beamlets, and optical traps are shown for clarity, but it should be understood that a greater or lesser number can be provided depending on the nature, scope, and other parameters of the assay and the capabilities of the system generating the optical traps. Altering the phase patterning optical element alters the phase profile of the beam, which can alter the position of the optical traps.

Any suitable laser can be used as the source of the laser beam 5000 Useful lasers include solid state lasers, diode pumped lasers, gas lasers, dye lasers, alexanderite lasers, free electron lasers, VCSEL lasers, diode lasers, Ti-Sapphire lasers, doped YAG lasers, doped YLF lasers, diode pumped YAG lasers, and flash lamp-pumped YAG lasers. Diode-pumped Nd:YAG lasers operating between 10 mW and 5 W are preferred.

When the laser beam 5000 reflects off the phase patterning optical element 62, the phase patterning optical element produces the beamlets 863 & 864, each having a phase profile. Depending on the number and type of optical traps desired, the phase profile may be altered, the alteration may include diffraction, wavefront shaping, phase shifting, steering, diverging and converging. Based upon the phase profile chosen, the phase patterning optical element can be used to generate optical traps in the form of optical tweezers, optical vortices, optical bottles, optical rotators, light cages, and combinations of two or more of these forms.

Suitable phase patterning optical elements are characterized as transmissive or reflective depending on how they direct the focused beam of light or other source of energy. Transmissive diffractive optical elements transmit the beam of light or other source of energy, while reflective diffractive optical elements reflect the beam.

The phase patterning optical element can also be categorized as having a static or a dynamic surface. Examples of suitable static phase patterning optical elements include those with one or more fixed surface regions, such as gratings, including diffraction gratings, reflective gratings, and transmissive gratings, holograms, including polychromatic holograms, stencils, light shaping holographic filters, polychromatic holograms, lenses, mirrors, prisms, waveplates and the like.

Examples of suitable dynamic phase patterning optical elements having a time dependent aspect to their function include computer generated diffractive patterns, phase shifting materials, liquid crystal phase shifting arrays, micromirror arrays, including piston mode micro-mirror arrays, spatial light modulators, electro-optic deflectors, accousto-optic modulators, deformable mirrors, reflective MEMS arrays and the like. With a dynamic phase patterning optical element, the medium which comprises the phase patterning optical element can be altered, to impart a patterned phase shift to the focused beam of light which results in a corresponding change in the phase profile of the focused beam of light, such as diffraction or convergence. Additionally, the medium which comprises the phase patterning optical element can be altered to produce a change in the location of the optical traps. It is an advantage of dynamic phase patterning optical elements, that the medium can be altered to independently move each optical trap.

Preferred dynamic optical elements include phase-only spatial light modulators such as the "PAL-SLM series X7665", manufactured by Hamamatsu, of Japan or the "SLM 512SA7," and "SLM512SA15" manufactured by Boulder Nonlinear Systems of Lafayette Colo. These phase patterning optical elements are computer controlled, by encoding a hologram within the medium, to generate the beamlets 10000 & 10020.

The phase patterning optical element is also useful to impart a particular topological mode to the laser light. Accordingly, one beamlet may be formed into a Gauss-Laguerre mode while another beamlet may be formed in a gaussian mode.

Returning to the beam splitter, the beam splitter 865 also provides a second light stream 867 originating from an imaging illumination source 870. The second light stream 867 passes through the working region 861 and beam splitter 865 and forms an optical data stream 872 which provides information on the position of the microspheres S1 & S2 in the working region 861. The optical data stream can be converted to a video signal, monitored, or analyzed by visual inspection of an operator, spectroscopically, and/or video monitoring. The optical data stream 872 may also be processed 874 by a photodectector to monitor intensity, or any suitable device to convert the optical data stream to a digital data stream adapted for use by a computer.

To contain, position and hold a microsphere in a selected location, an operator and/or the computer can adjust the phase patterning optical element 862 to direct the movement of the optical traps 10000 & 10020 to first acquire the selected microsphere and contain it within an optical trap. An optical trap with a contained microsphere may then be reconfigured as to the position of the microsphere. The optical data stream 872 can be used to identify and/or monitor the position of one or more of the trapped. Based on the positional and identity information the holograph encoded in the medium of the phase patterning optical element 862 can be altered. Such alteration of the holograph can be used to change the type of optical trap as well as the position of the optical trap and a microsphere contained thereby.

Figure 22:
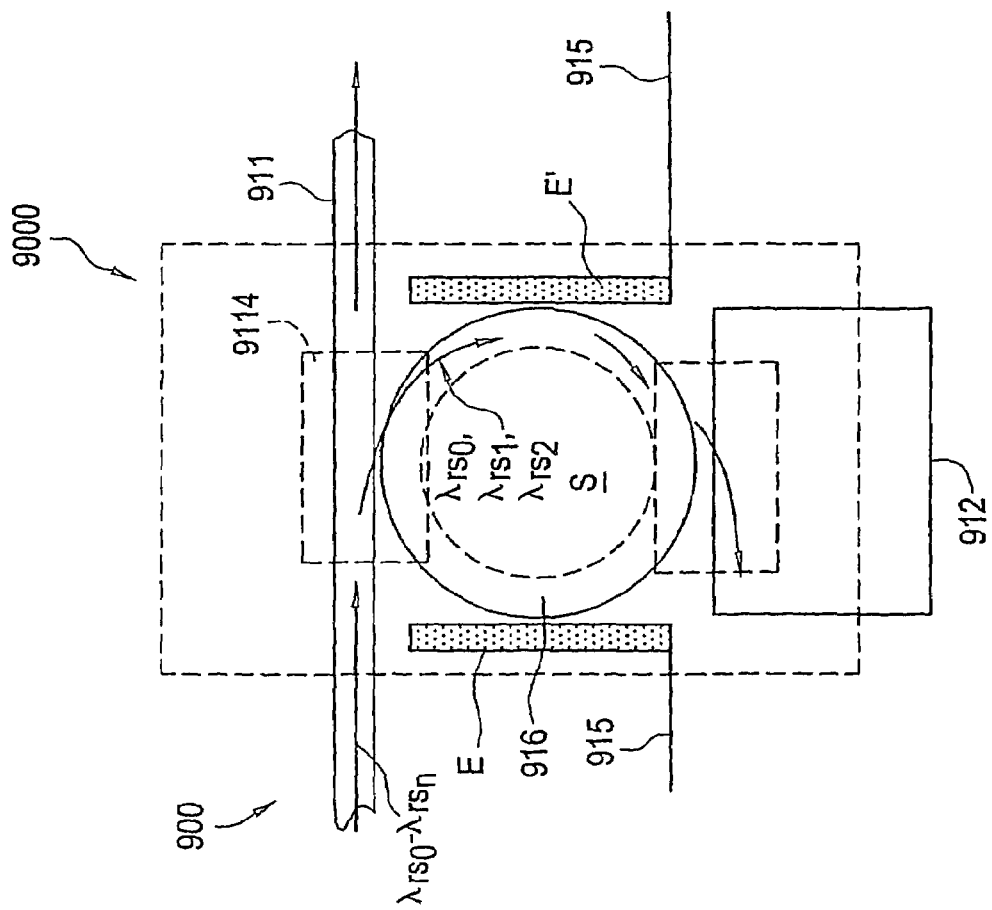
FIG. 22 illustrates a component view of an electronically gated filter according to another invention.

In another of the inventions related to optical filters, FIG. 22 depicts a filter 9000 constructed of a dielectric microsphere "S" fixed at a region proximate to an input waveguide 911 which supports signal propagation of a group of signals $\lambda rs_0, \lambda rs_1, \lambda rs_2 \ldots \lambda rs_n$ each of which provides a corresponding evanescent wave along the waveguide 911, and a secondary structure 912. The secondary structure 912 should be a structure such as another waveguide, a photonic band gap waveguide, a photonic crystal waveguide, a WGM microsphere or other resonate structure which supports signal propagation. The dielectric microsphere S resonates in WGM for a group of resonate signals "RS" ($\lambda rs_0, \lambda rs_1, \lambda rs_2$) which can be obtained from the second equation ($d_e/q=RS$). Shown in FIG. 26 is a table which indicates the RS within the "C" telecommunications optical band of three different diameter microspheres.

Proximate placement of the microsphere S to the input waveguide 911 and secondary structure 912 places the microsphere S in a position to couple a light signal from the input waveguide 911 or to the secondary structure 912. In practice the microsphere S will receive the evanescent wave of its RS, at a resonate structure-waveguide interface 914, emanating from the input waveguide 911 and RS at a resonate structure-waveguide interface 914 to the secondary structure 912.

"On/off" switching of the filter 9000 is controlled with an electronic control formed by placing an electrode pair E & E' conductively linked to a controller (not shown) by conductive leads 915 on opposing surfaces of the microsphere. The electronic gate provides an "on/off" function by a WGM control.

The WGM control mechanism is the polarization of the microsphere S. Polarization of the microsphere S can be achieved by a linear electro optic effect by passing an electrical power (a voltage or current) across the electrode pair E & E' on opposing surfaces of the microspheres. The linear electro optic effect can polarize the substrate of the microsphere by altering its dielectric constant "$\epsilon_{rs}^{(microsphere)}$". The $\epsilon_{rs}^{(microsphere)}$ has a "real" portion "$\epsilon_1$" and an imaginary portion "$i\epsilon_2$", and is the sum of both portions as shown in the third equation: $\epsilon_{rs}=(\epsilon_1+i\epsilon_2)$.

When $i\epsilon_2$ remains a constant, the index of refraction of the microsphere (resonate structure) $n_{rs}^{(microsphere)}$ is known to be proportional to the square root of the "real" portion of the microsphere dielectric constant 41. Accordingly, $n_{rs}^{(microsphere)}$ can be altered through the controlled change of $\epsilon_1$ by the linear electro optic effect.

The WGM control set forth below results from either disrupting or establishing coupling conditions between the microsphere S and the input optical fiber 911 and/or the secondary structure 912 at one or more regions, which are resonate structure-waveguide interfaces 914. Polarization of the microsphere S is used to adjust the $n_{rs}^{(microsphere)}$ relative to the index of refraction of a medium 1000 "$n_{medium}$" surrounding the microsphere S. To provide for the WGM control the medium 1000 should surround at least one of the input waveguide 911 and secondary structure 912 around the resonate structure waveguide interface 914. The medium should have an electric-field-dependent index of refraction that ranges from a lower level that is below $n_{rs}^{(microsphere)}$ to an upper level that is at least equal to $n_{rs}^{(microsphere)}$ and the medium should not be a conductor.

When the $n_{rs}^{(microsphere)}$ substantially equals $n_{medium}$ at a resonate structure-waveguide interface 914, the microsphere S, at that resonate structure waveguide interface 914, is effectively medium and transparent to all signals. When the $n_{rs}^{(microsphere)}$ does not substantially equal the $n_{medium}$, the microsphere S is distinct from the medium and signals can be filtered from the signals within the input waveguide 911 to the secondary structure 912.

The filter 9000 may be either "on" or "off" in its default state. A default "on" filter is achieved when the $n_{rs}^{(microsphere)}$ is distinct from the $n_{medium}$ at or near the resonate structure-waveguide interfaces 914 and coupling of signal to or from the microsphere is encouraged. The coupling of signal to or from the microsphere S at the input wave guide 911 or at the secondary structure 912 can be interrupted by the application of an electro optic effect via an electrode pair E & E' to cause the $n_{rs}^{(microsphere)}$ to become substantially equal to the $n_{medium}$ at the region of a resonate structure-waveguide interface 914.

Conversely a default "off" optical switch is achieved when $n_{rs}^{(microsphere)}$ substantially equals the index of refraction of the medium $n_{medium}$, at the region of at least one of the resonate structure-waveguide interfaces 914.

The microsphere S within the electronically controlled filter 9000 may also be coated with an optically active material 916 such as molecules of liquid crystal, organic photorefractive polymers, GaAs, Nitrabenzene and LiNbO$_3$ in which case the voltage or current passed between the electrode pair 915 and across the microsphere S can be used to polarize the coating material 916 and change its dielectric constant $\epsilon_1^{(coated\ microsphere)}$ and thereby adjust its index of refraction "$n^{rs(coated\ microsphere)}$". Application of the WGM controls can therefore be applied to the microsphere via adjustment of the $n_{rs}^{(coated\ microsphere)}$.

Figure 23:
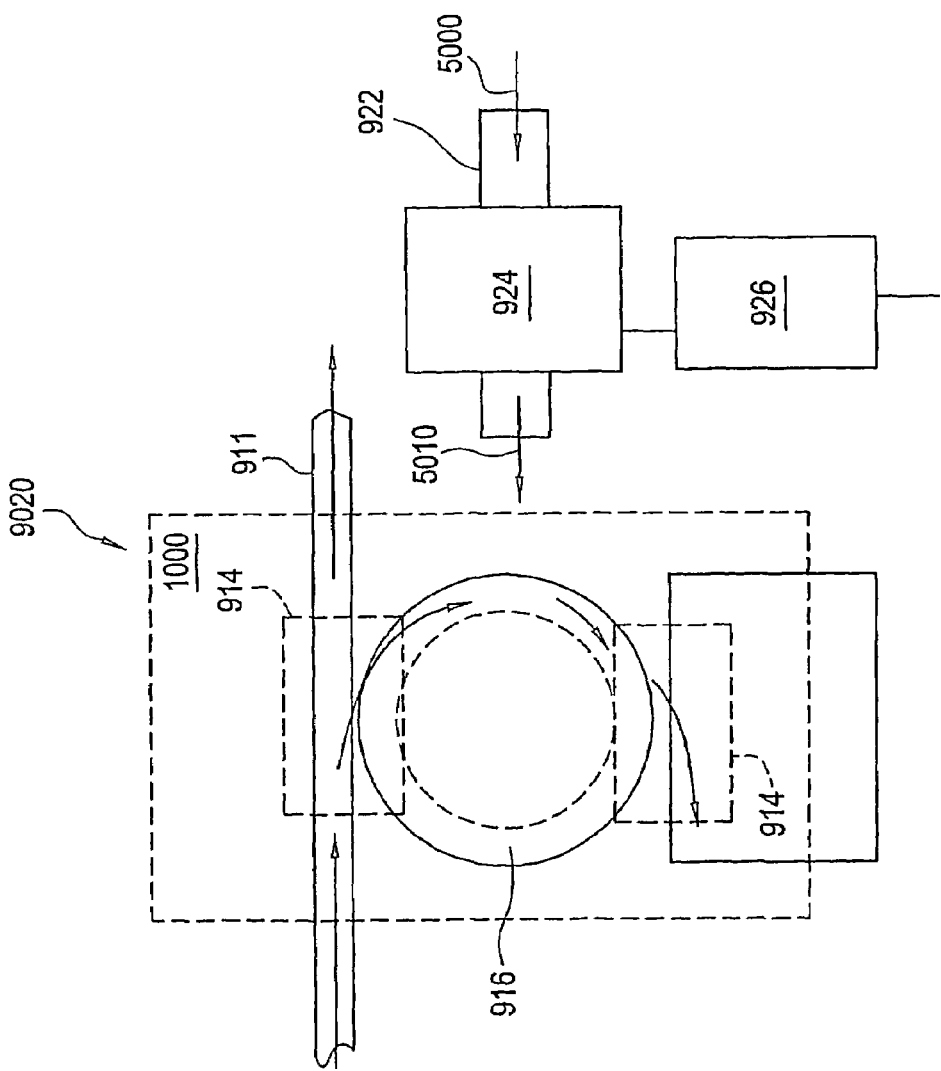
FIG. 23 illustrates a component view of an optically gated optical filter.

A filter 9020 with an optical control is shown in FIG. 23. As described in reference to FIG. 22, a microsphere "S" which resonates in WGM for a group of RS ($\lambda rs_0, \lambda rs_1, \lambda rs_2$) is fixed proximate to the input waveguide 911 and the secondary structure 912. In this embodiment the WGM control to switch "on/off" the filter remains the polarization of the microsphere S. However, polarization results from applying an intense beam of light to the microsphere S.

An optical control is used to selectively direct an intense beam of light at the microsphere S. A laser beam 5000, directed through an illuminating fiber 922 into a Mach-Zender interferometer 924 to produce a modified laser beam 5010 exiting the Mach-Zender interferometer 924, can pulse the intense beam of light in "optical real time".

The Mach-Zender interferometer 924 is used to either intensify the laser beam 5000 through constructive interference or to weaken the laser beam 5000 through destructive interference. The Mach-Zender interferometer 924 operates in the picoseconds range and the modified laser beam 5010 directed at the microsphere S can occur or terminate in a similar time interval. A computer 926 is used to control the Mach-Zender interferometer 924. The modified laser beam 5010 polarizes the microsphere S by effecting the "real" portion "$\epsilon_1$" of its dielectric constant "$\epsilon^{(microsphere)}$" and as previously described, the polarization can be used to adjust the $n_{rs}^{(microsphere)}$ to substantially match $n_{medium}$ and switch off the filter by creating a condition whereby the microsphere blends into the medium, or the $n_{rs}^{(microsphere)}$ can be adjusted to switch "on" the filter by creating a condition whereby the microsphere S is distinct from the medium 1000.

The microsphere S within the optically controlled filter 9020 may also be coated with an optically active material 916 in which case the optical effect can be used to adjust the $n^{rs(coated\ microsphere)}$ as described in reference to FIG. 23.

Figure 24:
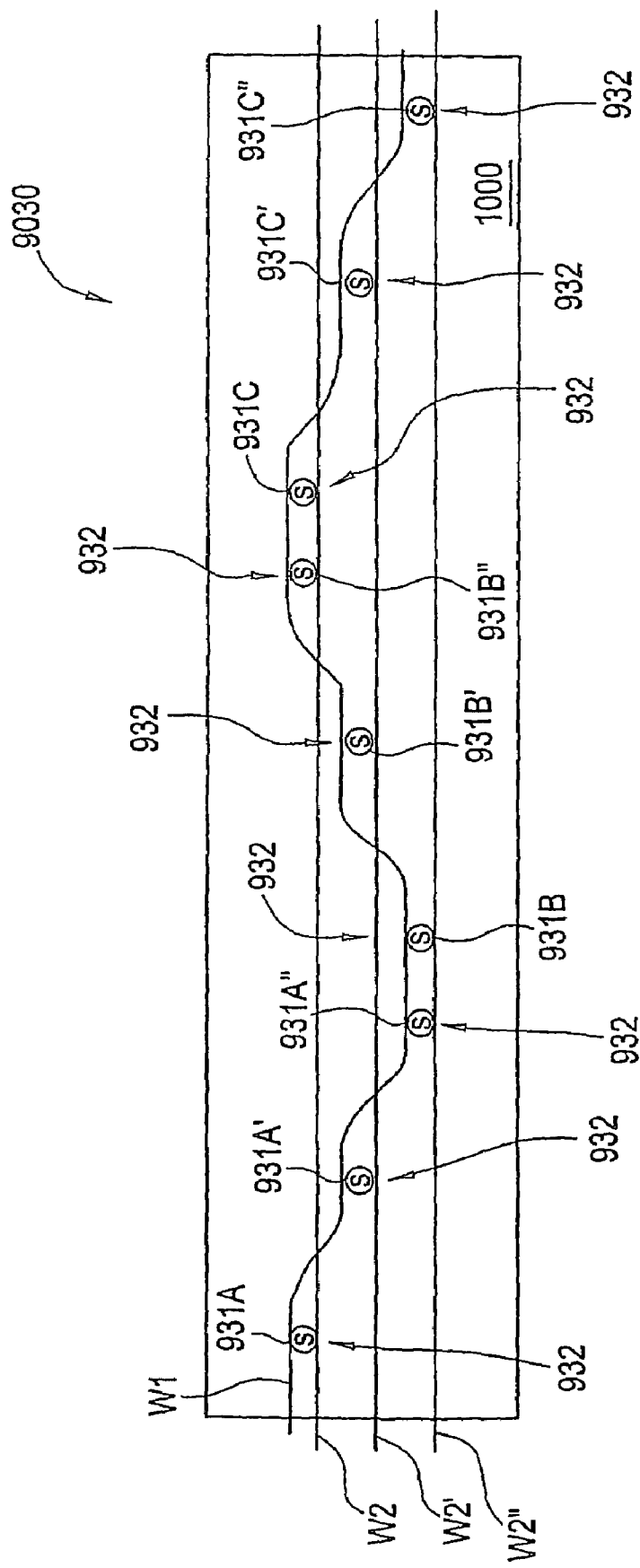
FIG. 24 illustrates a component view of a demultiplexing system.

A system comprised of a group of optical filters which optically cross connect waveguides and demultiplex (DEMUX) optical signals is shown in FIG. 24. The DEMUX system 9030 is constructed of "n" groups of wavelength specific optical filters. Each of the "n" groups of filters contains "m" redundant optical filters 931A, 913A' and 931A", 931B, 931B' and 931B", and 931C, 931C' and 931C". Each group of the "m" redundant filters 931A, 931A', 931A", 931B, 931B', 931B", or 931C, 931C' and 931C" resonates for the same RS. Each of the "m" redundant filters is fixed proximate to the input waveguide W1 through which optical signals of a different wavelength ($\lambda rs_0, \lambda rs_1, \lambda rs_2, \lambda rs_3 \ldots \lambda rs_n$) are supplied. One of the "m" redundant filters from each of the "n" groups is also fixed at a region proximate to one of "m" output waveguides W2, W2' and W2", whereby the optical signals can be multiplexed (MUX) into the output waveguides W2, W2' and W2". The entire DEMUX system is placed in a medium 1000 with a known index of refraction.

The WGM resonance of the microspheres "S" within each of the filters 931A, 931A', 931A", 931B, 931B', 931B", 931C, 931C' and 931C" can be electronically or optically controlled (as described more fully in reference to FIG. 22 or 23) by application of a polarizing energy which is used to switch "off" a filter by adjusting the index of refraction of the microsphere $n_{rs}^{(microsphere)}$ to substantially match the index of refraction of the medium $n_{medium}$.

Figure 25:
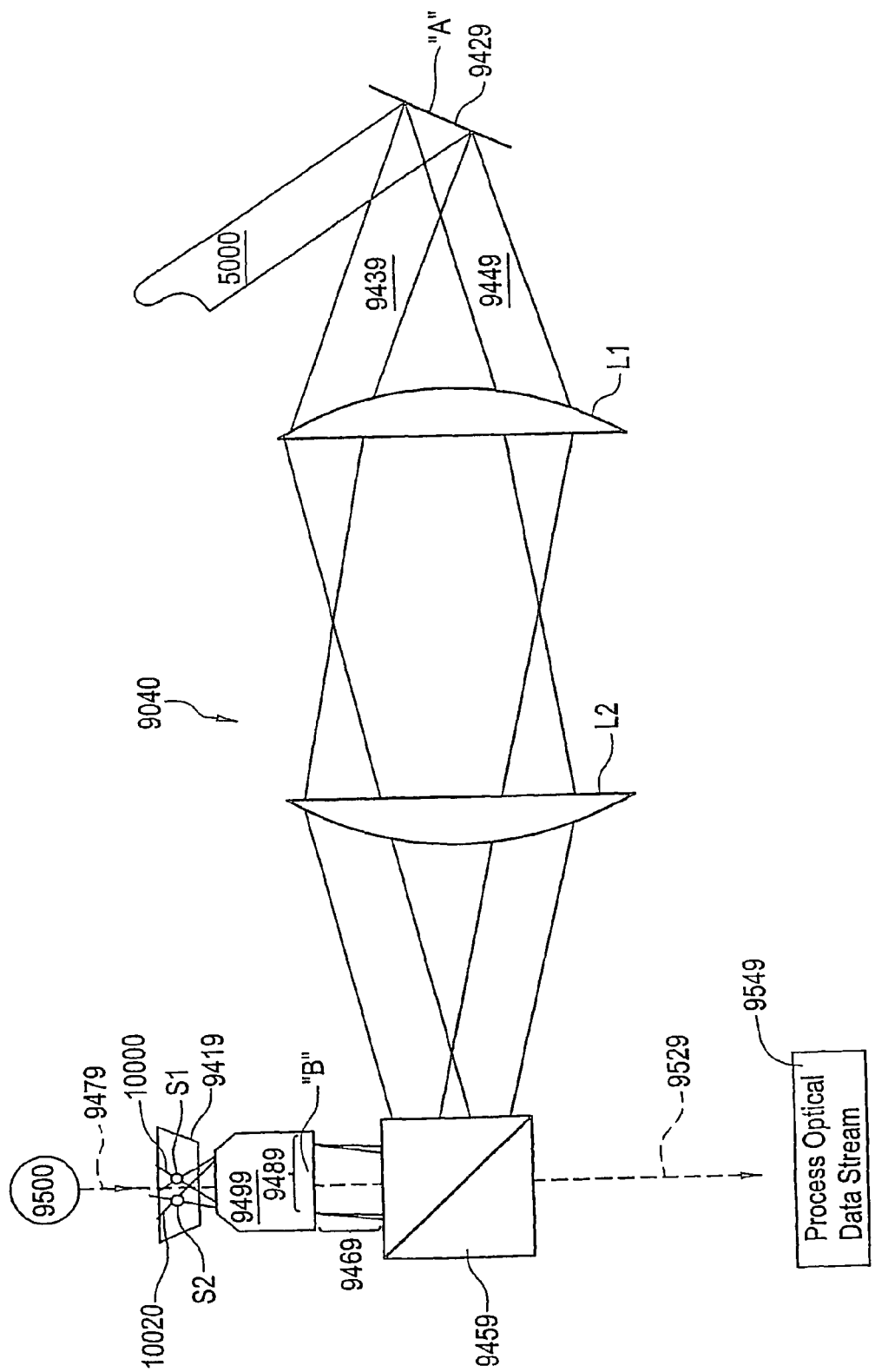
FIG. 25 illustrates an optical trapping system to manipulate optical switch components.

Illustrated in FIG. 25 is an overview of a system and method, generally designated 9040 to construct an optical switch, or a group of optical filters such as those described in reference to FIG. 26, by using one or more optical traps to place and/or hold the WGM microspheres.

To fabricate an optical filter, movable optical traps 10000 & 10020 are generated within an assembly vessel 9419. The assembly vessel should be constructed of a material which is at least partially transparent, and which allows the light used to form optical traps to pass through in the desired location.

The optical traps 10000 & 10020 are used to manipulate small microspheres S1 & S2 and position them to construct an optical filter. Optical traps 10000 & 10020 can be formed by passing a collimated light, preferably a laser beam 5000, to area "A" to a phase patterning optical element 9429 which generates beamlets 9439 & 9449. Each beamlet 9439 & 9449 created by the phase patterning optical element 9429 then passes through transfer optics L1 & L2 onward to a beam splitter 9459.

The beam splitter 9459 provides two streams of light 9469 & 9479 oriented in different directions. The first light streams 9469 originates from the phase patterning optical element 9429 as beamlets 9439 & 9449 which are redirected by the beam splitter 9459 through area "B" at the back aperture 9489 of a focusing lens 9499 thereby overlapping the beamlets 9449 & 9459 at the back aperture 9489 of the focusing lens. In those embodiments in which the intensity of the beamlets 9439 & 9449 is less intense at the periphery and more intense at regions inward from the periphery, overfilling the back aperture 9489 by less than about 15 percent is useful to form optical traps with greater intensity at the periphery of the optical traps than without overfilling the back aperture 9489.

The beamlets 9439 & 9449 are converged as they pass through the focusing lens 9499 to form the optical traps 10000 & 10020 by producing the gradient conditions necessary to contain and manipulate the microspheres S1 & S2 in three dimensions. Only two sets of microspheres, beamlets, and optical traps are shown for clarity, but it should be understood that a greater or lesser number can be provided depending on the nature, scope, and other parameters of the assay and the capabilities of the system generating the optical traps. Altering the phase patterning optical element alters the phase profile of the beam, which can alter the position of the optical traps.

Any suitable laser can be used as the source of the laser beam 5000. Useful lasers include solid state lasers, diode pumped lasers, gas lasers, dye lasers, alexanderite lasers, free electron lasers, VCSEL lasers, diode lasers, Ti-Sapphire lasers, doped YAG lasers, doped YLF lasers, diode pumped YAG lasers, and flash lamp-pumped YAG lasers. Diode-pumped Nd:YAG lasers operating between 10 mW and 5 W are preferred.

When the laser beam 5000 reflects off the phase patterning optical element 9629, the phase patterning optical element produces the beamlets 9439 & 9449, each having a phase profile. Depending on the number and type of optical traps desired, the phase profile may be altered, the alteration may include diffraction, wavefront shaping, phase shifting, steering, diverging and converging. Based upon the phase profile chosen, the phase patterning optical element can be used to generate optical traps in the form of optical tweezers, optical vortices, optical bottles, optical rotators, light cages, and combinations of two or more of these forms.

Suitable phase patterning optical elements are characterized as transmissive or reflective depending on how they direct the focused beam of light or other source of energy. Transmissive diffractive optical elements transmit the beam of light or other source of energy, while reflective diffractive optical elements reflect the beam.

The phase patterning optical element can also be categorized as having a static or a dynamic surface. Examples of suitable static phase patterning optical elements include those with one or more fixed surface regions, such as gratings, including diffraction gratings, reflective gratings, and transmissive gratings, holograms, including polychromatic holograms, stencils, light shaping holographic filters, polychromatic holograms, lenses, mirrors, prisms, waveplates and the like.

Examples of suitable dynamic phase patterning optical elements having a time dependent aspect to their function include computer generated diffractive patterns, phase shifting materials, liquid crystal phase shifting arrays, micromirror arrays, including piston mode micro-mirror arrays, spatial light modulators, electro-optic deflectors, accousto-optic modulators, deformable mirrors, reflective MEMS arrays and the like. With a dynamic phase patterning optical element, the medium which comprises the phase patterning optical element can be altered, to impart a patterned phase shift to the focused beam of light which results in a corresponding change in the phase profile of the focused beam of light, such as diffraction or convergence. Additionally, the medium which comprises the phase patterning optical element can be altered to produce a change in the location of the optical traps. It is an advantage of dynamic phase patterning optical elements, that the medium can be altered to independently move each optical trap.

Preferred dynamic optical elements include phase-only spatial light modulators such as the "PAL-SLM series X7665", manufactured by Hamamatsu, of Japan or the "SLM 512SA7," and "SLM512SA15" both manufactured by Boulder Nonlinear Systems of Lafayette Colo. These phase patterning optical elements are computer controlled, by encoding a hologram within the medium, to generate the beamlets 10000 & 10020.

The phase patterning optical element is also useful to impart a particular topological mode to the laser light. Accordingly, one beamlet may be formed into a Gauss-Laguerre mode while another beamlet may be formed in a gaussian mode.

Returning to the beam splitter, the beam splitter 9459 also provides a second light stream 9479 originating from an imaging illumination source 9500. The second light stream 9479 passes through the working region 9419 and forms an optical data stream 9529 which provides information on the position of the microspheres S1 & S2 in the working region 9419. The optical data stream can be converted to a video signal, monitored, or analyzed by visual inspection of an operator, spectroscopically, and/or video monitoring. The optical data stream 9529 may also be processed 9549 by a photodectector to monitor intensity, or any suitable device to convert the optical data stream to a digital data stream adapted for use by a computer.

To contain, position and hold a microsphere in a selected location, an operator and/or the computer can adjust the phase patterning optical element 9429 to direct the movement of the optical traps 10000 & 10020 to first acquire the selected microsphere and contain it within an optical trap. An optical trap with a contained microsphere may then be reconfigured as to the position of the microsphere. The optical data stream 9529 can be used to identify and/or monitor the position of one or more of the trapped. Based on the positional and identity information the holograph encoded in the medium of the phase patterning optical element 9429 can be altered. Such alteration of the holograph can be used to change the type of optical trap as well as the position of the optical trap and a microsphere contained thereby.

The above inventions may be employed in any application where the signal transmitted by the resonant structure is to be controlled thereby. For example, in an assay format, the resonant structure may be manufactured or modified post-manufacture by coating with a binding agent which binds to an analyte to be detected in a sample. In this invention, the presence of the analyte is detected by a change in frequency, attenuation or destruction of the resulting signal which comes about because of the binding of the analyte to the binding agent on the resonant structure upon exposure to the sample. Such a change in frequency, attenuation or destruction of the resulting signal may also be accomplished in a biological assay by competing away an analyte bound to a binding agent on the resonant structure prior to exposure to the sample. Examples of binding agent/analyte pairs include antigen/antibody, antibody/antigen, ligand/receptor, receptor/ligand, and nucleic acid/nucleic acid. Complexing agents, chelating agents and chemical bonding agents may also be employed. Techniques for preparing resonant structures, such as microspheres, are known to those skilled in the art and such preparation is available by contract manufacture, e.g. by Bangs Laboratories, Fishers, Ind.

Particular embodiments of the invention are described above in considerable detail for the purpose of illustrating its principles and operation. However, various modifications may be made, and the scope of the invention is not limited to the exemplary embodiments described above.

What is claimed is:

1. An optical filter comprising:
   an input waveguide;
   a first subfilter containing a first microsphere, said first subfilter being fixed proximate to said input waveguide;
   a second subfilter containing a second microsphere, said second subfilter which is fixed proximate to said first subfilter;
   an output waveguide fixed proximate to said second subfilter;
   a resonate structure-waveguide interface formed in an area of reduced cladding of said input waveguide and said output waveguide;
   a direct subfilter interface, which places said first microsphere and said second microsphere in contact with one another;
   wherein said first microsphere resonates in WGM for a first group of resonate signals, and said second microsphere resonates in WGM for a second group of resonate signals, such that said first subfilter and said second subfilter have a resonate signal in common among said first group and second group of resonate signals; and
   wherein due to said resonate signal in common, a light signal from said input waveguide to said first microsphere and said second microsphere, is passed to said output waveguide; and
   an electronic gate which provides on/off control by one of two WGM controls;
   wherein polarization is applied to one of said first microsphere and said second microsphere to produce a linear electro-optic effect to accomplish said electronic control.

2. The optical filter according to claim 1, wherein said resonate signal is coupled to a secondary structure which can receive and process an optical signal.

3. The optical filter according to claim 1, wherein said secondary structure is an additional subfilter.

4. The optical filter according to claim 1, wherein said resonate signal acts as an add switch.

5. The optical filter according to claim 1, further comprising:
  a pair of conductively linked electrodes disposed on opposing surfaces of one of said subfilters;
  wherein said polarization is applied by applying electric power across said electrodes.

6. The optical filter according to claim 1, wherein said one of two WGM controls can switch one of said first and second subfilters based on an adjustment of an index of refraction of one of said microspheres.

7. The optical filter according to claim 6, wherein said adjustment results in an "off" switch where said index of refraction does not support WGM resonance for a specific resonate signal, and results in an "o" switch where said index of refraction supports WGM for a specific resonate signal within said input waveguide for which switching is desired.

8. The optical filter according to claim 6, wherein said adjustment is used to tune one of said microspheres and select from a range of different specific resonate signals for switching.

9. The optical filter according to claim 1, wherein said adjustment of said index of refraction is through polarization or through an interruption in polarization at one of said resonate structure-waveguide interface or said direct subfilter interface.

10. The optical filter according to claim 1, wherein said one of said microspheres is coated with an optically active material.

11. The optical filter according to claim 1, further comprising:
  an intermediary waveguide fixed proximate to said first and said second subfilters;
  wherein said first microsphere is fixed to said intermediary waveguide upstream from said second microsphere; and
  wherein said resonate signal travels from said first subfilter to said intermediary waveguide and to said second subfilter.

12. An optical filter according comprising:
  an input waveguide:
  a first subfilter containing a first microsphere, said first subfilter being fixed proximate to said input waveguide;
  a second subfilter containing a second microsphere, said second subfilter which is fixed proximate to said first subfilter;
  an output waveguide fixed proximate to said second subfilter;
  a resonate structure-waveguide interface formed in an area of reduced cladding of said input waveguide and said output waveguide;
  a direct subfilter interface, which places said first microsphere and said second microsphere in contact with one another;
  wherein said first microsphere resonates in WGM for a first group of resonate signals, and said second microsphere resonates in WGM fur a second group of resonate signals, such that said first subfilter and said second subfilter have a resonate signal in common among said first group and said second group of resonate signals; and
  wherein due to said resonate signal in common, a light signal from said input waveguide to said first microsphere and said second microsphere, is passed to said output waveguide; and
  an electronic gate which provides on/off control by one of two WGM controls; and further comprising an optical gate, including:
  a Mach-Zender interferometer which emits a light beam at one of said microspheres to cause its polarization; and
  a computer which controls said interferometer.

13. The optical filter according to claim 12, wherein said one of said microspheres is coated with an optically active material.

14. The optical filter according to claim 13, wherein said material is a signal absorbing material which causes signal loss.

15. An optical filter comprising:
  an input waveguide;
  a first subfilter containing a first microsphere, said first subfilter being fixed proximate to said input waveguide;
  a second subfilter containing a second microsphere, said second subfilter which is fixed proximate to said first subfilter;
  an output waveguide fixed proximate to said second subfilter;
  a resonate structure-waveguide interface formed in an area of reduced cladding of said input waveguide and said output waveguide;
  a direct subfilter interface, which places said first microsphere and said second microsphere in contact with one another;
  wherein said first microsphere resonates in WGM for a first group of resonate signals, and said second microsphere resonates in WGM for a second group of resonate signals, such that said first subfilter and said second subfilter have a resonate signal in common among said first group and said second group of resonate signals; and
  wherein due to said resonate signal in common, a light signal from said input waveguide to said first microsphere and said second microsphere, is passed to said output waveguide; and
  a pair of conductively linked electrodes disposed on opposing surfaces of one of said subfilters;
  wherein polarization is applied to one of said first microsphere and said second microsphere by applying electric power across said electrodes, to produce a linear electro-optic effect to accomplish electronic on/off control.

* * * * *